US012322069B2

(12) United States Patent
Nishio et al.

(10) Patent No.: US 12,322,069 B2
(45) Date of Patent: Jun. 3, 2025

(54) IMAGING SUPPORT APPARATUS, IMAGING APPARATUS, IMAGING SUPPORT METHOD, AND PROGRAM

(71) Applicant: FUJIFILM CORPORATION, Tokyo (JP)

(72) Inventors: Yuya Nishio, Saitama (JP); Kosuke Irie, Saitama (JP)

(73) Assignee: FUJIFILM CORPORATION, Tokyo (JP)

(*) Notice: Subject to any disclaimer, the term of this patent is extended or adjusted under 35 U.S.C. 154(b) by 202 days.

(21) Appl. No.: 17/954,339

(22) Filed: Sep. 28, 2022

(65) Prior Publication Data
US 2023/0020060 A1    Jan. 19, 2023

Related U.S. Application Data

(63) Continuation of application No. PCT/JP2021/047377, filed on Dec. 21, 2021.

(30) Foreign Application Priority Data

Dec. 28, 2020 (JP) .................................. 2020-219153

(51) Int. Cl.
G06T 5/60           (2024.01)
(52) U.S. Cl.
CPC ...................................... *G06T 5/60* (2024.01)
(58) Field of Classification Search
CPC ................................ G06T 5/60; G06T 3/4046
See application file for complete search history.

(56) References Cited

U.S. PATENT DOCUMENTS 8,364,613 B1 * 1/2013 Lin .......................... G06N 7/01
                                                    700/65
11,983,853 B1 * 5/2024 Zhu .......................... G06T 5/70
(Continued)

FOREIGN PATENT DOCUMENTS

JP    2003-255428 A    9/2003
JP    2005-347985 A    12/2005
(Continued)

OTHER PUBLICATIONS

International Search Report issued in International Application No. PCT/JP2021/047377, on Mar. 22, 2022.
(Continued)

*Primary Examiner* — Frank Johnson
(74) *Attorney, Agent, or Firm* — SOLARIS Intellectual Property Group, PLLC

(57) ABSTRACT

There is provided an imaging support apparatus including a processor, and a memory in which the memory stores a first trained model, the first trained model is a trained model used for control related to imaging performed by an imaging apparatus, and the processor is configured to generate a second trained model used for the control by performing learning processing in which a first image, which is acquired by being captured by the imaging apparatus, and a set value, which is applied to the imaging apparatus in a case where the first image is acquired, are used as teacher data, and perform specific processing based on a first set value, which is output from the first trained model in a case where a second image is input to the first trained model, and a second set value, which is output from the second trained model in a case where the second image is input to the second trained model.

41 Claims, 49 Drawing Sheets

(56) References Cited

U.S. PATENT DOCUMENTS

| | | | | |
|---|---|---|---|---|
| 2016/0284095 | A1* | 9/2016 | Chalom | G06V 10/56 |
| 2018/0114294 | A1* | 4/2018 | Yang | G06T 7/90 |
| 2019/0171897 | A1* | 6/2019 | Merai | G06N 5/048 |
| 2019/0295261 | A1* | 9/2019 | Kang | G06V 10/764 |
| 2019/0370602 | A1 | 12/2019 | Haneda et al. | |
| 2020/0089994 | A1 | 3/2020 | Sato | |
| 2020/0387750 | A1* | 12/2020 | Shcherbinin | G06T 5/73 |
| 2021/0084238 | A1* | 3/2021 | Kashiwagi | H04N 23/617 |
| 2021/0166369 | A1* | 6/2021 | Baek | G06T 5/60 |
| 2021/0319537 | A1* | 10/2021 | Hiasa | G06T 7/70 |
| 2021/0368094 | A1* | 11/2021 | Li | G06V 10/255 |

FOREIGN PATENT DOCUMENTS

| | | |
|---|---|---|
| JP | 2013-207471 A | 10/2013 |
| JP | 2019-211969 A | 12/2019 |
| JP | 2020-030750 A | 2/2020 |
| JP | 2020-046928 A | 3/2020 |

OTHER PUBLICATIONS

Written Opinion of the ISA issued in International Application No. PCT/JP2021/047377, on Mar. 22, 2022.

* cited by examiner

FIG. 40A
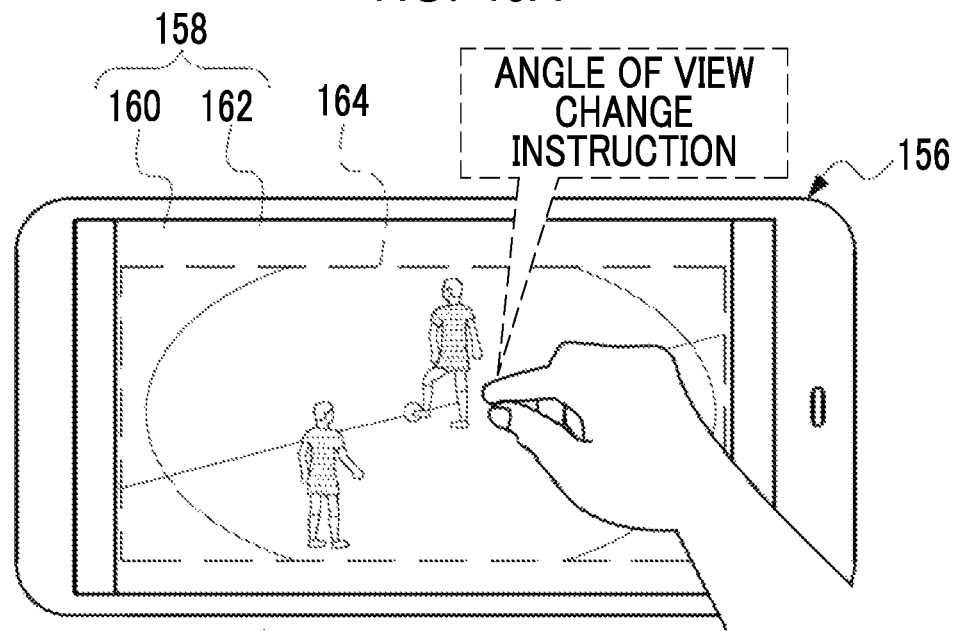
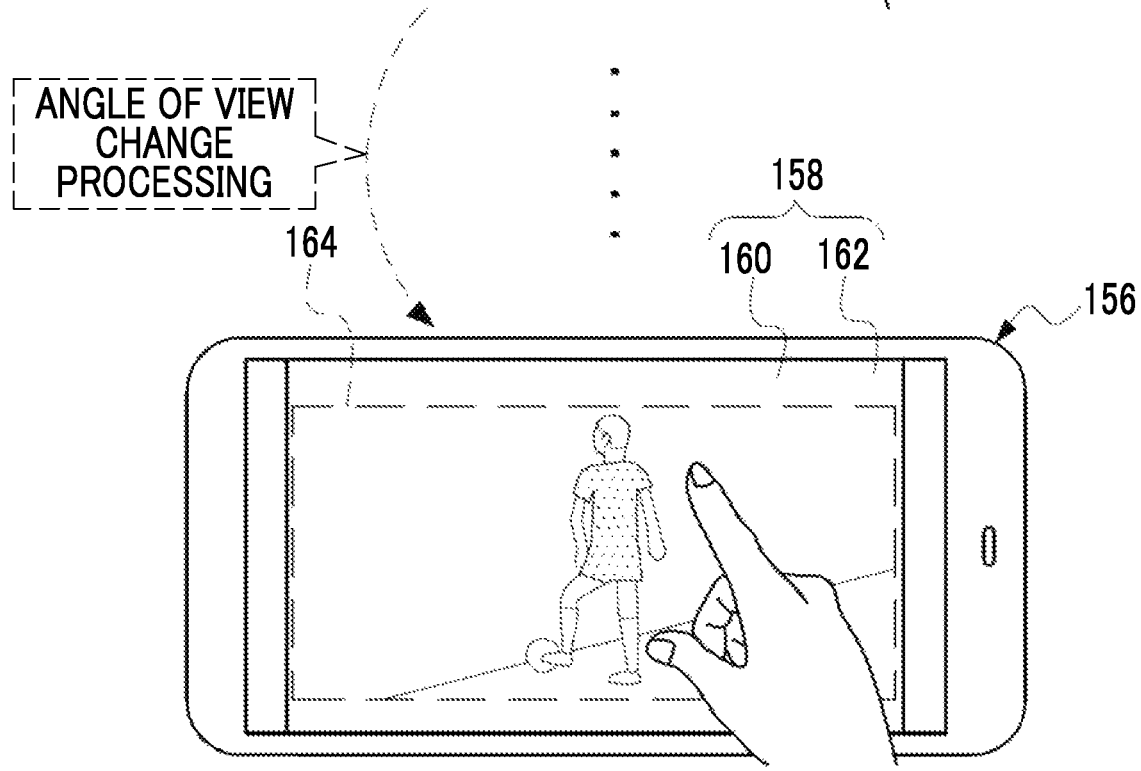

IMAGING SUPPORT APPARATUS, IMAGING APPARATUS, IMAGING SUPPORT METHOD, AND PROGRAM

CROSS-REFERENCE TO RELATED APPLICATIONS

This application is a continuation application of International Application No. PCT/JP2021/047377, filed Dec. 21, 2021, the disclosure of which is incorporated herein by reference in its entirety. Further, this application claims priority from Japanese Patent Application No. 2020-219153, filed Dec. 28, 2020, the disclosure of which is incorporated herein by reference in its entirety.

BACKGROUND

1. Technical Field

The present invention relates to an imaging support apparatus, an imaging apparatus, an imaging support method, and a program.

2. Related Art

JP2013-207471A discloses a digital camera including an imaging unit that captures a subject image, an imaging control unit that controls imaging processing by the imaging unit by using an imaging processing set value, an image processing unit that performs image processing on image data imaged by the imaging unit by using an image processing set value, a storage unit that stores a table in which a feature amount of an imaging scene is associated with the imaging processing set value and/or the image processing set value in the past imaging processing and/or image processing, a feature amount calculation unit that calculates the feature amount of the imaging scene in the current imaging, and a set value acquisition unit that acquires the imaging processing set value and/or the image processing set value based on the feature amount of the imaging scene calculated by the feature amount calculation unit and the table stored in the storage unit. The digital camera described in JP2013-207471A further includes a learning unit that learns the feature amount of the imaging scene registered in the table and the imaging processing set value and/or the image processing set value by using a neural network, in which the set value acquisition unit acquires the imaging processing set value and/or the image processing set value based on the learning result by the learning unit.

JP2005-347985A discloses a digital camera including an imaging processing execution unit that generates image data by executing imaging processing and an execution control unit that controls the imaging processing according to a control set value of each of one or more setting items, in which the execution control unit includes a priority order determination unit that determines a priority order with respect to at least a part of a plurality of candidate set value sets among the plurality of available set value sets based on history information related to the set value set used in a plurality of times of imaging processing regarding a setting item set including at least one setting item among the setting items and a setting condition determination unit that determines a control set value set of a setting item set by using the priority order. The digital camera described in JP2005-347985A further includes a memory slot that attachably and detachably holds the memory, and the priority order determination unit acquires the history information from the memory via the memory slot and has an attachable and detachable memory history mode for determining the priority order by using the acquired history information.

JP2003-255428A discloses a camera including a count unit that counts the number of imaging operations, when imaging is performed on the camera that is capable of performing the imaging under a plurality of predetermined imaging conditions related to at least brightness under any of imaging conditions among the plurality of the imaging conditions, for each imaging condition, a calculation unit that obtains distribution of count values based on the count values and obtains a main imaging condition range as a tendency of imaging conditions from the obtained distribution, and a control unit that defines a specific imaging condition within a main imaging condition range and other than a plurality of predetermined imaging conditions, and controls the defined specific imaging condition as the imaging condition so as to be capable of performing the imaging.

SUMMARY

One embodiment according to the present disclosed technology provides an imaging support apparatus, an imaging apparatus, an imaging support method, and a program that can contribute to the reduction of the load.

An imaging support apparatus according to a first aspect of the present invention comprises: a processor; and a memory connected to or built into the processor, wherein the memory stores a first trained model, the first trained model is a trained model used for control related to imaging performed by an imaging apparatus, and the processor is configured to generate a second trained model used for the control by performing learning processing in which a first image, which is acquired by being captured by the imaging apparatus, and a set value, which is applied to the imaging apparatus in a case where the first image is acquired, are used as teacher data, and perform specific processing based on a first set value, which is output from the first trained model in a case where a second image is input to the first trained model, and a second set value, which is output from the second trained model in a case where the second image is input to the second trained model.

In the imaging support apparatus of the first aspect according to a second aspect of the present invention, the second image is stored in the memory.

In the imaging support apparatus of the first or the second aspect according to a third aspect of the present invention, the processor is configured to generate the second trained model by performing the learning processing in a case where a condition that the number of the first images reaches a first threshold value is satisfied.

In the imaging support apparatus of the third aspect according to a fourth aspect of the present invention, the teacher data is data that includes a plurality of images, which are acquired by being captured by the imaging apparatus during a period from specific time until the condition is satisfied, and a plurality of set values, which are related to the plurality of images and applied to the imaging apparatus.

In the imaging support apparatus of the third or the fourth aspect according to a fifth aspect of the present invention, the processor is configured to perform the specific processing based on the first set value and the second set value in a case where the condition is satisfied.

In the imaging support apparatus of any one of the first to the fifth aspects according to a sixth aspect of the present invention, the processor is configured to perform the specific processing in a case where a degree of difference between the first set value and the second set value is equal to or greater than a second threshold value.

In the imaging support apparatus of any one of the first to the sixth aspects according to a seventh aspect of the present invention, the processor is configured to perform predetermined processing under a condition that the number of the first images reaches a third threshold value.

In the imaging support apparatus of any one of the first to the sixth aspects according to an eighth aspect of the present invention, the processor is configured to perform predetermined processing in a case where the number of the first images, which are acquired by performing the imaging under a first environment and used as the teacher data, is equal to or greater than a fourth threshold value and the number of the first images, which are obtained by performing the imaging under a second environment different from the first environment and used as the teacher data, is equal to or less than a fifth threshold value.

In the imaging support apparatus of any one of the first to the eighth aspects according to a ninth aspect of the present invention, the imaging apparatus is a lens-interchangeable imaging apparatus, and the processor is configured to generate a plurality of the second trained models by performing the learning processing for each type of interchangeable lens used in the imaging related to the first image.

In the imaging support apparatus of the ninth aspect according to a tenth aspect of the present invention, the processor is configured to, in a case where the interchangeable lens is attached to the imaging apparatus, perform processing of using a second trained model generated by using an image, which is acquired by being captured by the imaging apparatus where the interchangeable lens is attached, in the learning processing as the first image among the plurality of second trained model.

In the imaging support apparatus of any one of the first to the tenth aspects according to an eleventh aspect of the present invention, the imaging apparatus includes a plurality of imaging systems, and the processor is configured to generate a plurality of the second trained models by performing the learning processing for each of the imaging systems used in the imaging related to the first image.

In the imaging support apparatus of the eleventh aspect according to a twelfth aspect of the present invention, the processor is configured to, in a case where an imaging system used in the imaging is selected from the plurality of imaging systems, perform processing of using a second trained model generated by using an image, which is acquired by being captured by the imaging apparatus using the selected imaging system, in the learning processing as the first image among the plurality of second trained model.

In the imaging support apparatus of the twelfth aspect according to a thirteenth aspect of the present invention, the processor is configured to receive an instruction of a switch of the plurality of imaging systems in a step-less manner, and continue to use the second trained model, which is assigned to the imaging system before the switch, in the imaging system after the switch, in a case where the instruction is received.

In the imaging support apparatus of the twelfth or the thirteenth aspect according to a fourteenth aspect of the present invention, the processor is configured to use a scene, which is used in a case where the first image is acquired by the imaging apparatus, and information, which is related to the selected imaging system, in the learning processing as the set values, and cause the imaging apparatus to selectively use the plurality of imaging systems at an activation timing of the imaging apparatus based on the second set value.

In the imaging support apparatus of any one of the first to the fourteenth aspects according to a fifteenth aspect of the present invention, the specific processing is processing that includes first processing of reflecting the second set value on the control.

In the imaging support apparatus of any one of the first to the fifteenth aspects according to a sixteenth aspect of the present invention, the specific processing is processing that includes second processing of storing the second trained model in a default storage device.

In the imaging support apparatus of any one of the first to the sixteenth aspects according to a seventeenth aspect of the present invention, the specific processing is processing that includes third processing of reflecting an output of a trained model, which is selected according to the instruction received by the processor among the first trained model and the second trained model, on the control.

In the imaging support apparatus of any one of the first to seventeenth aspects according to an eighteenth aspect of the present invention, the specific processing is processing that includes fourth processing of outputting first data for displaying a fourth image corresponding to an image obtained by applying a first output result, which is output from the first trained model by inputting a third image to the first trained model, to the third image, and a sixth image corresponding to an image obtained by applying a second output result, which is output from the second trained model by inputting a fifth image to the second trained model, to the fifth image, on a first display.

In the imaging support apparatus of the eighteenth aspect according to a nineteenth aspect of the present invention, the first data includes data for displaying the fourth image and the sixth image on the first display in a distinguishable manner.

In the imaging support apparatus of the eighteenth or the nineteenth aspect according to a twentieth aspect of the present invention, the first data includes data for displaying the fourth image and first trained model specification information, which enables specification of the first trained model, on the first display in a state of being associated with each other, and for displaying the sixth image and second trained model specification information, which enables specification of the second trained model, on the first display in a state of being associated with each other.

In the imaging support apparatus of any one of the eighteenth to the twentieth aspects according to a twenty-first aspect of the present invention, the fourth processing is processing that includes processing of reflecting an output of the first trained model on the control in a case where the fourth image is selected according to the instruction received by the processor among the fourth image and the sixth image displayed on the first display, and reflecting an output of the second trained model on the control in a case where the sixth image is selected.

In the imaging support apparatus of any one of the first to the twenty-first aspects according to a twenty-second aspect of the present invention, the specific processing is processing that includes fifth processing of outputting second data for displaying time specification information, which enables specification of time when the second trained model is generated, on a second display.

In the imaging support apparatus of the twenty-second aspect according to a twenty-third aspect of the present invention, the second data includes data for displaying the time specification information on the second display in a state of being associated with a seventh image obtained in a case where an output of the second trained model is reflected.

In the imaging support apparatus of any one of the first to the twenty-third aspects according to a twenty-fourth aspect of the present invention, the specific processing is processing that includes sixth processing of associating time specification information, which enables specification of time when the second trained model is generated, with the second trained model.

In the imaging support apparatus of any one of the first to the twenty-fourth aspects according to a twenty-fifth aspect of the present invention, the specific processing is processing that includes seventh processing of reflecting an output of the second trained model on the control at a predetermined timing.

In the imaging support apparatus of the twenty-fifth aspect according to a twenty-sixth aspect of the present invention, the predetermined timing is a timing when the imaging apparatus is activated, a timing when the number of captured images acquired by being captured by the imaging apparatus is equal to or greater than a sixth threshold value, a timing when charging of the imaging apparatus is started, a timing when an operation mode of the imaging apparatus transitions from a playback mode to a setting mode, or a timing when rating is performed on the captured images in the playback mode.

In the imaging support apparatus of any one of the first to the twenty-sixth aspects according to a twenty-seventh aspect of the present invention, the specific processing is processing that includes eighth processing of, in a case where the second trained model is applied to a different apparatus that is an imaging apparatus different from the imaging apparatus, correcting at least one of data input to the second trained model or the output from the second trained model, based on characteristics of the imaging apparatus and characteristics of the different apparatus.

In the imaging support apparatus of the twenty-seventh aspect according to a twenty-eighth aspect of the present invention, image sensor information, which includes at least one of characteristic information indicating characteristics of each of different image sensors involved in the second trained model or individual difference information indicating an individual difference between the different image sensors, is appended to the second trained model, and the processor is configured to specify the characteristics of the imaging apparatus and the characteristics of the different apparatus by using the image sensor information.

In the imaging support apparatus of any one of the first to the twenty-eighth aspects according to a twenty-ninth aspect of the present invention, the specific processing is processing that includes ninth processing of outputting third data for displaying a first processed image corresponding to an image obtained by applying a third output result, which is output from the second trained model by inputting an eighth image to the second trained model, to the eighth image, and an unprocessed image obtained without applying the third output result to the eighth image, on a third display.

In the imaging support apparatus of any one of the first to the twenty-ninth aspects according to a thirtieth aspect of the present invention, the specific processing is processing that includes tenth processing of outputting fourth data for displaying a brightness adjusted image obtained by applying a fourth output result, which is output from the second trained model by inputting a ninth image to the second trained model, to the ninth image and adjusting brightness, and an unprocessed image obtained without applying the fourth output result to the ninth image, on a fourth display.

In the imaging support apparatus of any one of the first to the thirtieth aspects according to a thirty-first aspect of the present invention, first appended information, which is appended to a third processed image obtained by being captured with the output of the second trained model reflected on the control, is added to the third processed image, and the specific processing is processing that includes eleventh processing of including information, which enables specification of the second trained model, in the first appended information.

In the imaging support apparatus of any one of the first to the thirty-first aspects according to a thirty-second aspect of the present invention, second appended information, which is appended to a fourth processed image obtained by being captured with the output of the first trained model reflected on the control, is added to the fourth processed image, and the specific processing is processing that includes twelfth processing of including information, which enables specification of the first trained model, in the second appended information.

In the imaging support apparatus of any one of the first to the thirty-second aspects according to a thirty-third aspect of the present invention, the set value is at least one of a set value related to white balance used in the imaging, a set value related to exposure used in the imaging, a set value related to focus used in the imaging, a set value related to saturation used in the imaging, or a set value related to gradation used in the imaging.

An imaging support apparatus according to a thirty-fourth aspect of the present invention comprises: a processor; and a memory connected to or built into the processor, in which the memory stores a first trained model, the first trained model is a trained model used for control related to imaging performed by an imaging apparatus, and the processor is configured to generate a second trained model used for the control by performing learning processing in which a first image, which is acquired by being captured by the imaging apparatus, and a set value, which is applied to the imaging apparatus in a case where the first image is acquired, are used as teacher data, and perform specific processing based on a degree of difference between the first trained model and the second trained model.

An imaging apparatus according to a thirty-fifth aspect of the present invention comprises: a processor; a memory connected to or built into the processor; and an imaging apparatus main body, in which the memory stores a first trained model, the first trained model is a trained model used for control related to imaging performed by the imaging apparatus main body, and the processor is configured to generate a second trained model used for the control by performing learning processing in which a first image, which is acquired by being captured by the imaging apparatus main body, and a set value, which is applied to the imaging apparatus main body in a case where the first image is acquired, are used as teacher data, and perform specific processing based on a first set value, which is output from the first trained model in a case where a second image is input to the first trained model, and a second set value, which is output from the second trained model in a case where the second image is input to the second trained model.

An imaging support method according to a thirty-sixth aspect of the present invention comprises: generating a second trained model used for control related to imaging performed by an imaging apparatus, by performing learning processing in which a first image, which is acquired by being captured by the imaging apparatus, and a set value, which is applied to the imaging apparatus in a case where the first image is acquired, are used as teacher data; and performing specific processing based on a first set value, which is output from a first trained model in a case where a second image is input to the first trained model, and a second set value, which is output from the second trained model in a case where the second image is input to the second trained model.

A program according to a thirty-seventh aspect of the present invention that causes a computer to execute a process including: generating a second trained model used for control related to imaging performed by an imaging apparatus, by performing learning processing in which a first image, which is acquired by being captured by the imaging apparatus, and a set value, which is applied to the imaging apparatus in a case where the first image is acquired, are used as teacher data; and performing specific processing based on a first set value, which is output from a first trained model in a case where a second image is input to the first trained model, and a second set value, which is output from the second trained model in a case where the second image is input to the second trained model.

BRIEF DESCRIPTION OF THE DRAWINGS

Exemplary embodiments of the technology of the disclosure will be described in detail based on the following figures, wherein:

FIG. 40A is a conceptual diagram showing an example of an aspect in which an angle of view change instruction is provided to the smart device;

DETAILED DESCRIPTION

Hereinafter, an example of an embodiment of an imaging support apparatus, an imaging apparatus, an imaging support method, and a program according to the present disclosed technology will be described with reference to the accompanying drawings.

First, the wording used in the following description will be described.

CPU refers to an abbreviation of a "Central Processing Unit". GPU refers to an abbreviation of a "Graphics Processing Unit". TPU refers to an abbreviation of a "Tensor processing unit". NVM refers to an abbreviation of a "Non-volatile memory". RAM refers to an abbreviation of a "Random Access Memory". IC refers to an abbreviation of an "Integrated Circuit". ASIC refers to an abbreviation of an "Application Specific Integrated Circuit". PLD refers to an abbreviation of a "Programmable Logic Device". FPGA refers to an abbreviation of a "Field-Programmable Gate Array". SoC refers to an abbreviation of a "System-on-a-chip". SSD refers to an abbreviation of a "Solid State Drive". USB refers to an abbreviation of a "Universal Serial Bus". HDD refers to an abbreviation of a "Hard Disk Drive". EEPROM refers to an abbreviation of an "Electrically Erasable and Programmable Read Only Memory". EL refers to an abbreviation of "Electro-Luminescence". I/F refers to an abbreviation of an "Interface". UI refers to an abbreviation of a "User Interface". fps refers to an abbreviation of a "frame per second". MF refers to an abbreviation of "Manual Focus". AF refers to an abbreviation of "Auto Focus". CMOS refers to an abbreviation of a "Complementary Metal Oxide Semiconductor". CCD refers to an abbreviation of a "Charge Coupled Device". LAN refers to an abbreviation of a "Local Area Network". WAN refers to an abbreviation of a "Wide Area Network". CNN refers to an abbreviation of a "Convolutional Neural Network". AI refers to an abbreviation of "Artificial Intelligence". Exif refers to an abbreviation of an "exchange image file format".

Figure 1:
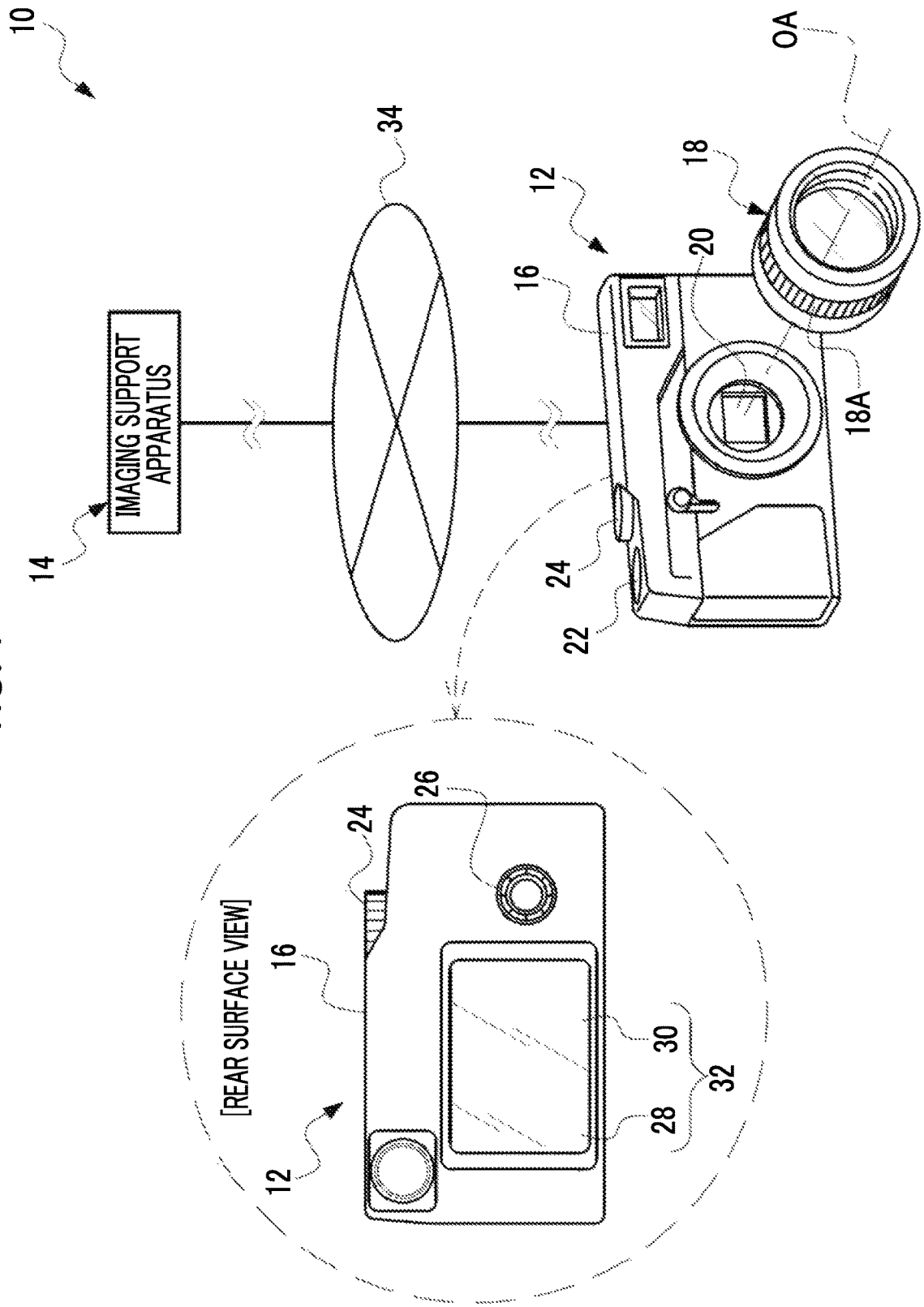
FIG. 1 is a schematic configuration diagram showing an example of a configuration of an entire imaging system.

As an example shown in FIG. 1, the imaging system 10 includes an imaging apparatus 12 and an imaging support apparatus 14. The imaging apparatus 12 is an apparatus that images a subject. In the example shown in FIG. 1, a lens-interchangeable digital camera is shown as an example of the imaging apparatus 12. The imaging apparatus 12 includes an imaging apparatus main body 16 and an interchangeable lens 18. The interchangeable lens 18 is interchangeably attached to the imaging apparatus main body 16. The interchangeable lens 18 is provided with a focus ring 18A. In a case where a user or the like of the imaging apparatus 12 (hereinafter, simply referred to as the "user") manually adjusts the focus on the subject by the imaging apparatus 12, the focus ring 18A is operated by the user or the like.

In the present embodiment, although the lens-interchangeable digital camera is exemplified as the imaging apparatus 12, this is only an example, and a digital camera with a fixed lens may be used or a digital camera, which is built into various electronic devices such as a smart device, a wearable terminal, a cell observation device, an ophthalmologic observation device, or a surgical microscope may be used.

An image sensor 20 is provided in the imaging apparatus main body 16. The image sensor 20 is a CMOS image sensor. The image sensor 20 captures an imaging range including at least one subject. In a case where the interchangeable lens 18 is attached to the imaging apparatus main body 16, subject light indicating the subject is transmitted through the interchangeable lens 18 and imaged on the image sensor 20, and then image data indicating an image of the subject is generated by the image sensor 20.

In the present embodiment, although the CMOS image sensor is exemplified as the image sensor 20, the present disclosed technology is not limited to this, for example, the present disclosed technology is established even in a case where the image sensor 20 is another type of image sensor such as a CCD image sensor.

A release button 22 and a dial 24 are provided on an upper surface of the imaging apparatus main body 16. The dial 24 is operated in a case where an operation mode of the imaging system, an operation mode of a playback system, and the like are set, and by operating the dial 24, an imaging mode, a playback mode, and a setting mode are selectively set as the operation mode in the imaging apparatus 12. The imaging mode is an operation mode in which the imaging is performed with respect to the imaging apparatus 12. The playback mode is an operation mode for playing the image (for example, a still image and/or a moving image) obtained by the performance of the imaging for recording in the imaging mode. The setting mode is an operation mode in which various set values 102 (see FIG. 5) and the like, which will be described later, are set for the imaging apparatus 12.

The release button 22 functions as an imaging preparation instruction unit and an imaging instruction unit, and is capable of detecting a two-step pressing operation of an imaging preparation instruction state and an imaging instruction state. The imaging preparation instruction state refers to a state in which the release button 22 is pressed, for example, from a standby position to an intermediate position (half pressed position), and the imaging instruction state refers to a state in which the release button 22 is pressed to a final pressed position (fully pressed position) beyond the intermediate position. In the following, the "state of being pressed from the standby position to the half pressed position" is referred to as a "half pressed state", and the "state of being pressed from the standby position to the full pressed position" is referred to as a "fully pressed state". Depending on the configuration of the imaging apparatus 12, the imaging preparation instruction state may be a state in which the user's finger is in contact with the release button 22, and the imaging instruction state may be a state in which the operating user's finger is moved from the state of being in contact with the release button 22 to the state of being away from the release button 22.

A touch panel display 32 and an instruction key 26 are provided on a rear surface of the imaging apparatus main body 16.

Figure 2:
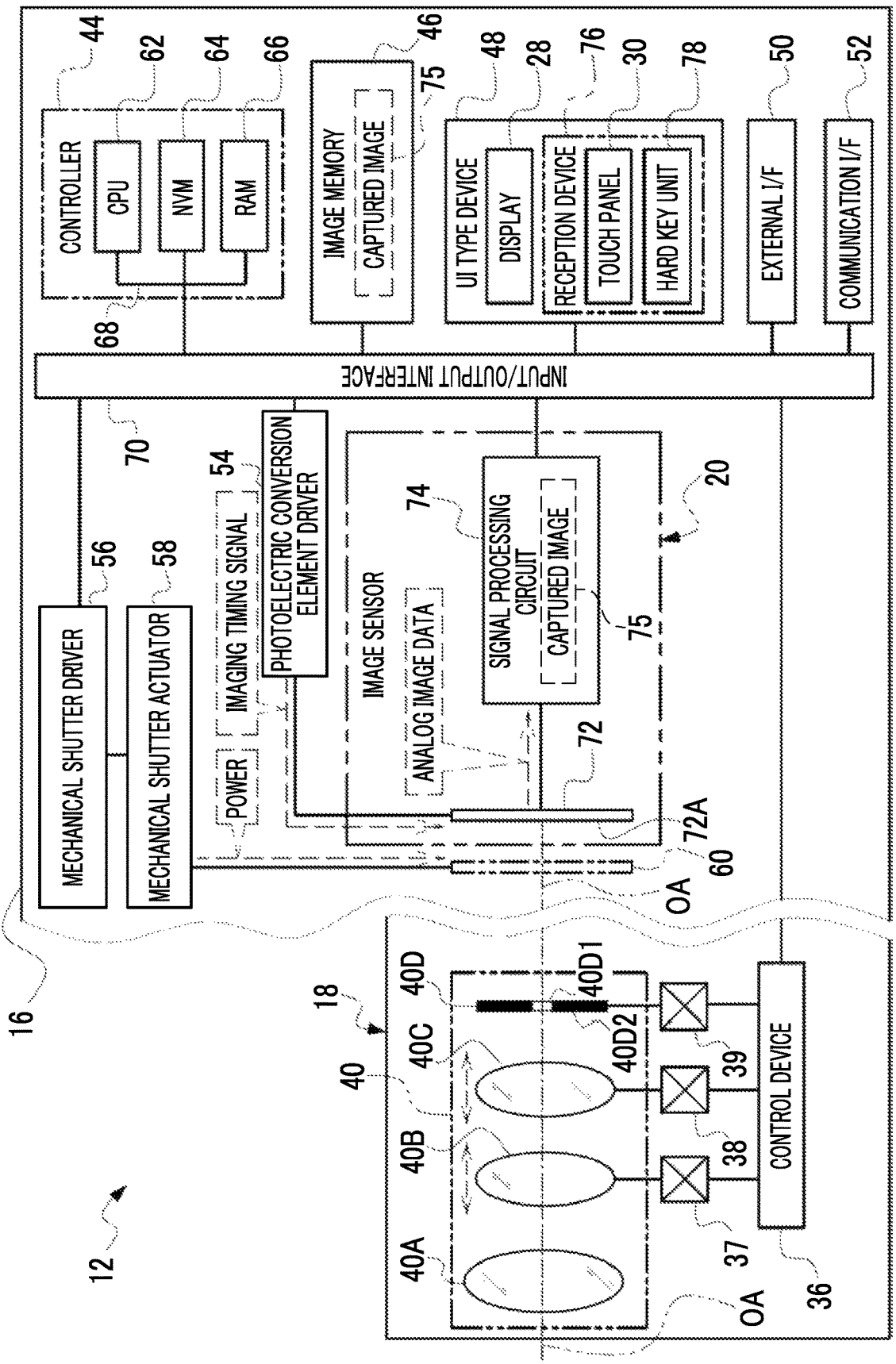
FIG. 2 is a schematic configuration diagram showing an example of hardware configurations of an optical system and an electrical system of an imaging apparatus included in the imaging system.

The touch panel display 32 includes a display 28 and a touch panel 30 (see also FIG. 2). Examples of the display 28 include an EL display (for example, an organic EL display or an inorganic EL display). The display 28 may not be an EL display but may be another type of display such as a liquid crystal display.

The display 28 displays image and/or character information and the like. The display 28 is used for imaging for a live view image, that is, for displaying a live view image obtained by performing the continuous imaging in a case where the imaging apparatus 12 is in the imaging mode. The imaging, which is performed to obtain the live view image (hereinafter, also referred to as "imaging for a live view image"), is performed according to, for example, a frame rate of 60 fps. 60 fps is only an example, and a frame rate of fewer than 60 fps may be used, or a frame rate of more than 60 fps may be used.

Here, the "live view image" refers to a moving image for display based on the image data obtained by being imaged by the image sensor 20. The live view image is also commonly referred to as a through image.

The display 28 is also used for displaying a still image obtained by the performance of the imaging for a still image in a case where an instruction for performing the imaging for a still image is provided to the imaging apparatus 12 via the release button 22. The display 28 is also used for displaying a playback image or the like in a case where the imaging apparatus 12 is in the playback mode. Further, the display 28 is also used for displaying a menu screen where various menus can be selected and displaying a setting screen for setting the various set values 102 (see FIG. 5) used in control related to the imaging in a case where the imaging apparatus 12 is in the setting mode.

The touch panel 30 is a transmissive touch panel and is superimposed on a surface of a display region of the display 28. The touch panel 30 receives the instruction from the user by detecting contact with an indicator such as a finger or a stylus pen. In the following, for convenience of explanation, the above-mentioned "fully pressed state" includes a state in which the user turns on a softkey for starting the imaging via the touch panel 30.

In the present embodiment, although an out-cell type touch panel display in which the touch panel 30 is superimposed on the surface of the display region of the display 28 is exemplified as an example of the touch panel display 32, this is only an example. For example, as the touch panel display 32, an on-cell type or in-cell type touch panel display can be applied.

The instruction key 26 receives various instructions. Here, the "various instructions" refer to, for example, various instructions such as an instruction for displaying the menu screen, an instruction for selecting one or a plurality of menus, an instruction for confirming a selected content, an instruction for erasing the selected content, zooming in, zooming out, frame forwarding, and the like. Further, these instructions may be provided by the touch panel 30.

As will be described in detail later, the imaging apparatus main body 16 is connected to the imaging support apparatus 14 via a network 34. The network 34 is, for example, the Internet. The network 34 is not limited to the Internet and may be a WAN and/or a LAN such as an intranet. Further, in the present embodiment, the imaging support apparatus 14 is a server that provides the imaging apparatus 12 with a service in response to a request from the imaging apparatus 12. The server may be a mainframe used on-premises together with the imaging apparatus 12 or may be an external server implemented by cloud computing. Further, the server may be an external server implemented by network computing such as fog computing, edge computing, or grid computing. Here, although a server is exemplified as an example of the imaging support apparatus 14, this is only an example, and at least one personal computer or the like may be used as the imaging support apparatus 14 instead of the server.

As an example shown in FIG. 2, the image sensor 20 includes photoelectric conversion elements 72. The photoelectric conversion elements 72 have a light receiving surface 72A. The photoelectric conversion elements 72 are disposed in the imaging apparatus main body 16 such that the center of the light receiving surface 72A and an optical axis OA coincide with each other (see also FIG. 1). The photoelectric conversion elements 72 have a plurality of photosensitive pixels arranged in a matrix shape, and the light receiving surface 72A is formed by the plurality of photosensitive pixels. The photosensitive pixel is a physical pixel having a photodiode (not shown), which photoelectrically converts the received light and outputs an electric signal according to the light receiving amount.

The interchangeable lens 18 includes an imaging lens 40. The imaging lens 40 has an objective lens 40A, a focus lens 40B, a zoom lens 40C, and a stop 40D. The objective lens 40A, the focus lens 40B, the zoom lens 40C, and the stop 40D are disposed in the order of the objective lens 40A, the focus lens 40B, the zoom lens 40C, and the stop 40D along the optical axis OA from the subject side (object side) to the imaging apparatus main body 16 side (image side).

Further, the interchangeable lens 18 includes a control device 36, a first actuator 37, a second actuator 38, and a third actuator 39. The control device 36 controls the entire interchangeable lens 18 according to the instruction from the imaging apparatus main body 16. The control device 36 is a device having a computer including, for example, a CPU, an NVM, a RAM, and the like. Although a computer is exemplified here, this is only an example, and a device including an ASIC, FPGA, and/or PLD may be applied. Further, as the control device 36, for example, a device implemented by a combination of a hardware configuration and a software configuration may be used.

The first actuator 37 includes a slide mechanism for focus (not shown) and a motor for focus (not shown). The focus lens 40B is attached to the slide mechanism for focus so as to be slidable along the optical axis OA. Further, the motor for focus is connected to the slide mechanism for focus, and the slide mechanism for focus operates by receiving the power of the motor for focus to move the focus lens 40B along the optical axis OA.

The second actuator 38 includes a slide mechanism for zoom (not shown) and a motor for zoom (not shown). The zoom lens 40C is attached to the slide mechanism for zoom so as to be slidable along the optical axis OA. Further, the motor for zoom is connected to the slide mechanism for zoom, and the slide mechanism for zoom operates by receiving the power of the motor for zoom to move the zoom lens 40C along the optical axis OA.

The third actuator 39 includes a power transmission mechanism (not shown) and a motor for stop (not shown). The stop 40D has an opening 40D1 and is a stop in which the size of the opening 40D1 is variable. The opening 40D1 is formed by a plurality of stop leaf blades 40D2. The plurality of stop leaf blades 40D2 are connected to the power transmission mechanism. Further, the motor for stop is connected to the power transmission mechanism, and the power transmission mechanism transmits the power of the motor for stop to the plurality of stop leaf blades 40D2. The plurality of stop leaf blades 40D2 receives the power that is transmitted from the power transmission mechanism and changes the size of the opening 40D1 by being operated. The stop 40D adjusts the exposure by changing the size of the opening 40D1.

The motor for focus, the motor for zoom, and the motor for stop are connected to the control device 36, and the control device 36 controls each drive of the motor for focus, the motor for zoom, and the motor for stop. In the present embodiment, a stepping motor is adopted as an example of the motor for focus, the motor for zoom, and the motor for stop. Therefore, the motor for focus, the motor for zoom, and the motor for stop operate in synchronization with a pulse signal in response to a command from the control device 36. Although an example in which the motor for focus, the motor for zoom, and the motor for stop are provided in the interchangeable lens 18 has been described here, this is only an example, and at least one of the motor for focus, the motor for zoom, or the motor for stop may be provided in the imaging apparatus main body 16. The constituent and/or operation method of the interchangeable lens 18 can be changed as needed.

In the imaging apparatus 12, in the case of the imaging mode, an MF mode and an AF mode are selectively set according to the instructions provided to the imaging apparatus main body 16. The MF mode is an operation mode for manually focusing. In the MF mode, for example, by operating the focus ring 18A or the like by the user, the focus lens 40B is moved along the optical axis OA with the movement amount according to the operation amount of the focus ring 18A or the like, thereby the focus is adjusted.

In the AF mode, the imaging apparatus main body 16 calculates a focusing position according to a subject distance and adjusts the focus by moving the focus lens 40B toward the calculated focusing position. Here, the focusing position refers to a position of the focus lens 40B on the optical axis OA in a state of being in focus. In the following, for convenience of explanation, the control for aligning the focus lens 40B with the focusing position is also referred to as "AF control".

The imaging apparatus main body 16 includes the image sensor 20, a controller 44, an image memory 46, a UI type device 48, an external I/F 50, a communication I/F 52, a photoelectric conversion element driver 54, a mechanical shutter driver 56, a mechanical shutter actuator 58, a mechanical shutter 60, and an input/output interface 70. Further, the image sensor 20 includes the photoelectric conversion elements 72 and a signal processing circuit 74.

The controller 44, the image memory 46, the UI type device 48, the external I/F 50, the photoelectric conversion element driver 54, the mechanical shutter driver 56, and the signal processing circuit 74 are connected to the input/output interface 70. Further, the control device 36 of the interchangeable lens 18 is also connected to the input/output interface 70.

The controller 44 includes a CPU 62, an NVM 64, and a RAM 66. The CPU 62, the NVM 64, and the RAM 66 are connected via a bus 68, and the bus 68 is connected to the input/output interface 70.

In the example shown in FIG. 2, one bus is shown as the bus 68 for convenience of illustration, but a plurality of buses may be used. The bus 68 may be a serial bus or may be a parallel bus including a data bus, an address bus, a control bus, and the like.

The NVM 64 is a non-temporary storage medium that stores various parameters and various programs. For example, the NVM 64 is an EEPROM. However, this is only an example, and an HDD and/or SSD or the like may be applied as the NVM 64 instead of or together with the EEPROM. Further, the RAM 66 temporarily stores various information and is used as a work memory.

The CPU 62 reads a necessary program from the NVM 64 and executes the read program in the RAM 66. The CPU 62 controls the entire imaging apparatus 12 according to the program executed on the RAM 66. In the example shown in FIG. 2, the image memory 46, the UI type device 48, the external I/F 50, the communication I/F 52, the photoelectric conversion element driver 54, the mechanical shutter driver 56, and the control device 36 are controlled by the CPU 62.

The photoelectric conversion element driver 54 is connected to the photoelectric conversion elements 72. The photoelectric conversion element driver 54 supplies an imaging timing signal, which defines the timing of the imaging performed by the photoelectric conversion elements 72, to the photoelectric conversion elements 72 according to an instruction from the CPU 62. The photoelectric conversion elements 72 perform reset, exposure, and output of an electric signal according to the imaging timing signal supplied from the photoelectric conversion element driver 54. Examples of the imaging timing signal include a vertical synchronization signal, and a horizontal synchronization signal.

In a case where the interchangeable lens 18 is attached to the imaging apparatus main body 16, the subject light incident on the imaging lens 40 is imaged on the light receiving surface 72A by the imaging lens 40. Under the control of the photoelectric conversion element driver 54, the photoelectric conversion elements 72 photoelectrically convert the subject light, which is received from the light receiving surface 72A and output the electric signal corresponding to the amount of light of the subject light to the signal processing circuit 74 as analog image data indicating the subject light. Specifically, the signal processing circuit 74 reads the analog image data from the photoelectric conversion elements 72 in units of one frame and for each horizontal line by using an exposure sequential reading method.

The signal processing circuit 74 generates digital image data by digitizing the analog image data. In the following, for convenience of explanation, in a case where it is not necessary to distinguish between digital image data to be internally processed in the imaging apparatus main body 16 and an image indicated by the digital image data (that is, an image that is visualized based on the digital image data and displayed on the display 28 or the like), it is referred to as a "captured image 75".

The mechanical shutter 60 is a focal plane shutter and is disposed between the stop 40D and the light receiving surface 72A. The mechanical shutter 60 includes a front curtain (not shown) and a rear curtain (not shown). Each of the front curtain and the rear curtain includes a plurality of leaf blades. The front curtain is disposed closer to the subject side than the rear curtain.

The mechanical shutter actuator 58 is an actuator having a link mechanism (not shown), a solenoid for a front curtain (not shown), and a solenoid for a rear curtain (not shown). The solenoid for a front curtain is a drive source for the front curtain and is mechanically connected to the front curtain via the link mechanism. The solenoid for a rear curtain is a drive source for the rear curtain and is mechanically connected to the rear curtain via the link mechanism. The mechanical shutter driver 56 controls the mechanical shutter actuator 58 according to the instruction from the CPU 62.

The solenoid for a front curtain generates power under the control of the mechanical shutter driver 56 and selectively performs winding up and pulling down the front curtain by applying the generated power to the front curtain. The solenoid for a rear curtain generates power under the control of the mechanical shutter driver 56 and selectively performs winding up and pulling down the rear curtain by applying the generated power to the rear curtain. In the imaging apparatus 12, the exposure amount with respect to the photoelectric conversion elements 72 is controlled by controlling the opening and closing of the front curtain and the opening and closing of the rear curtain by the CPU 62.

In the imaging apparatus 12, the imaging for a live view image and the imaging for a recorded image for recording the still image and/or the moving image are performed by using the exposure sequential reading method (rolling shutter method). The image sensor 20 has an electronic shutter function, and the imaging for a live view image is implemented by achieving an electronic shutter function without operating the mechanical shutter 60 in a fully open state.

In contrast to this, the imaging accompanied by the main exposure, that is, the imaging for a still image is implemented by achieving the electronic shutter function and operating the mechanical shutter 60 so as to shift the mechanical shutter 60 from a front curtain closed state to a rear curtain closed state.

The image memory 46 stores the captured image 75 generated by the signal processing circuit 74. That is, the signal processing circuit 74 stores the captured image 75 in the image memory 46. The CPU 62 acquires a captured image 75 from the image memory 46 and executes various processes by using the acquired captured image 75.

The UI type device 48 includes a display 28, and the CPU 62 displays various information on the display 28. Further, the UI type device 48 includes a reception device 76. The reception device 76 includes a touch panel 30 and a hard key unit 78. The hard key unit 78 is a plurality of hard keys including an instruction key 26 (see FIG. 1). The CPU 62 operates according to various instructions received by using the touch panel 30. Here, although the hard key unit 78 is included in the UI type device 48, the present disclosed technology is not limited to this, for example, the hard key unit 78 may be connected to the external I/F 50.

The external I/F 50 controls the exchange of various information between the imaging apparatus 12 and an apparatus existing outside the imaging apparatus 12 (hereinafter, also referred to as an "external apparatus"). Examples of the external I/F 50 include a USB interface. The external apparatus (not shown) such as a smart device, a personal computer, a server, a USB memory, a memory card, and/or a printer is directly or indirectly connected to the USB interface.

The communication I/F 52 controls the exchange of information between the CPU 62 and the imaging support apparatus 14 (see FIG. 1) via the network 34 (see FIG. 1). For example, the communication I/F 52 transmits information according to the request from the CPU 62 to the imaging support apparatus 14 via the network 34. Further, the communication I/F 52 receives the information transmitted from the imaging support apparatus 14 and outputs the received information to the CPU 62 via the input/output interface 70.

Figure 3:
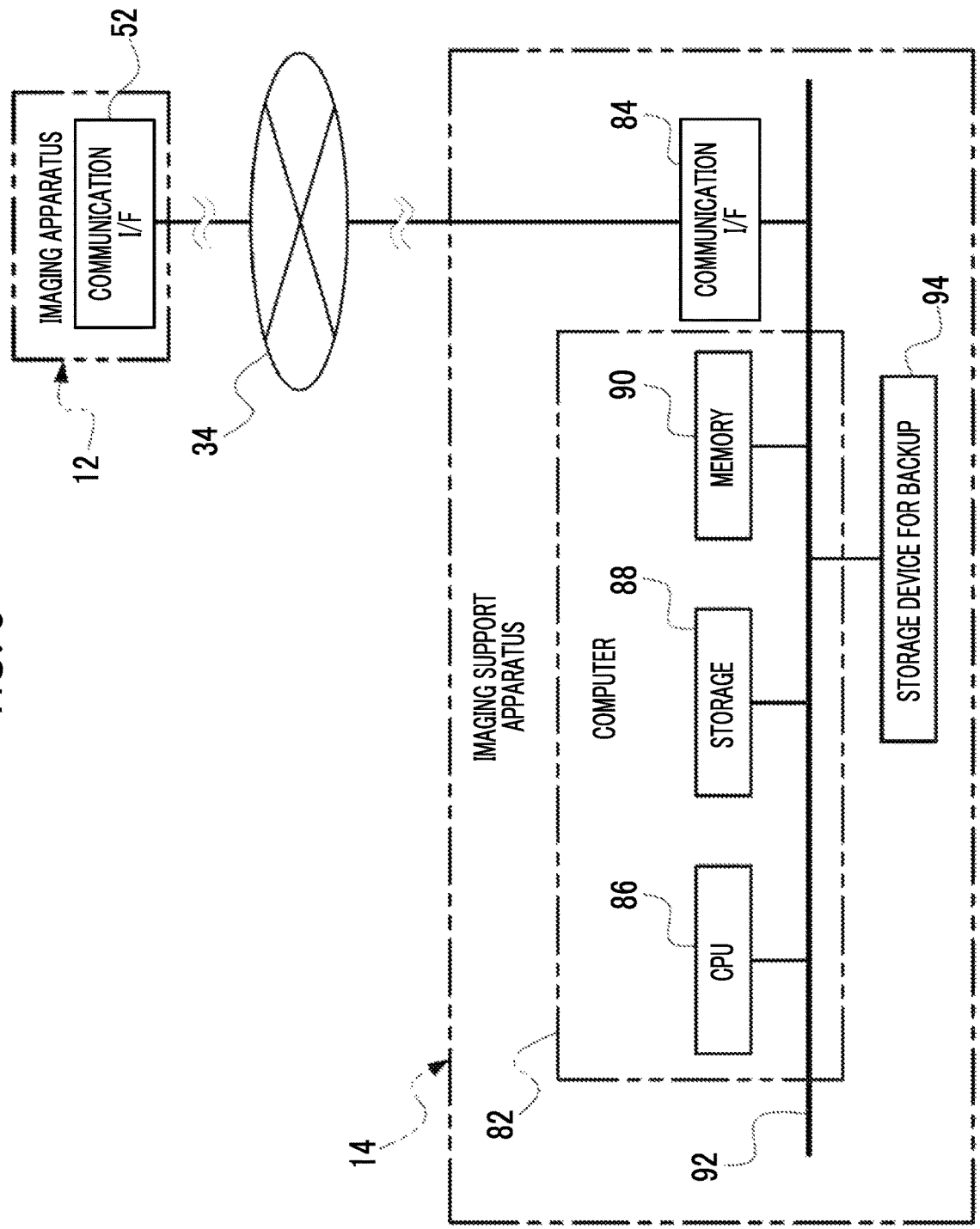
FIG. 3 is a schematic configuration diagram showing an example of a hardware configuration of an electrical system of an imaging support apparatus included in the imaging system.

As an example shown in FIG. 3, the imaging support apparatus 14 includes a computer 82 and a communication I/F 84. The computer 82 includes a CPU 86, a storage 88, and a memory 90. Here, the computer 82 is an example of a "computer" according to the present disclosed technology, the CPU 86 is an example of a "processor" according to the present disclosed technology, and the storage 88 is an example of a "memory" according to the present disclosed technology.

The CPU 86, the storage 88, the memory 90, and the communication I/F 84 are connected to a bus 92. In the example shown in FIG. 3, one bus is shown as the bus 92 for convenience of illustration, but a plurality of buses may be used. The bus 92 may be a serial bus or may be a parallel bus including a data bus, an address bus, a control bus, and the like.

The CPU 86 controls the entire imaging support apparatus 14. The storage 88 is a non-volatile storage device that stores various programs, various parameters, and the like. Examples of the storage 88 include a non-temporary storage medium such as an EEPROM, an SSD, and/or an HDD. The memory 90 is a memory in which information is temporarily stored and is used as a work memory by the CPU 86. Examples of the memory 90 include a RAM.

The communication I/F 84 is connected to the communication I/F 52 of the imaging apparatus 12 via the network 34. The communication I/F 84 controls the exchange of the information between the CPU 86 and the imaging apparatus 12. For example, the communication I/F 84 receives the information transmitted from the imaging apparatus 12 and outputs the received information to the CPU 86. Further, the information according to the request from the CPU 86 is transmitted to the imaging apparatus 12 via the network 34.

The imaging support apparatus 14 includes a storage device 94 for backup. The storage device for backup 94 is an example of a "default storage device" according to the present disclosed technology. The storage device 94 for backup is a non-volatile storage device that stores a second trained model 118 (see FIG. 8) and the like, which will be described later. Examples of the storage device 94 for backup include a non-temporary storage medium such as an EEPROM, an SSD, and/or an HDD. The storage device 94 for backup is connected to the bus 92, and the CPU 86 stores the second trained model 118 and the like, which will be described later, in the storage device 94 for backup and reads the second trained model 118 and the like, which will be described later, from the storage device 94 for backup.

As one of the known imaging apparatuses in the related art, an imaging apparatus equipped with an automatic setting function, in which various parameters (for example, a parameter used for correction of exposure, a parameter used for AF control, a parameter used for correction of gradation, or the like) used in the control related to the imaging are set according to various conditions, is known. However, the various parameters used in this type of imaging apparatus are merely parameters determined by the manufacturer based on the manufacturer's criteria, and it is difficult to mention that the parameters reflect the preferences of each user.

Therefore, in the present embodiment, the imaging support apparatus 14 performs a machine learning on a learning model with a relationship between the set value, which is actually used in the imaging using the imaging apparatus 12, and the captured image 75, which is acquired by being captured by the imaging apparatus 12, and uses the trained model to provide support for setting parameters in the imaging apparatus 12 as close to the user's preference as possible. Further, in the imaging support apparatus 14, processing is performed in consideration of the timing of performing processing by using a learning result. Hereinafter, a specific example will be described.

Figure 4:
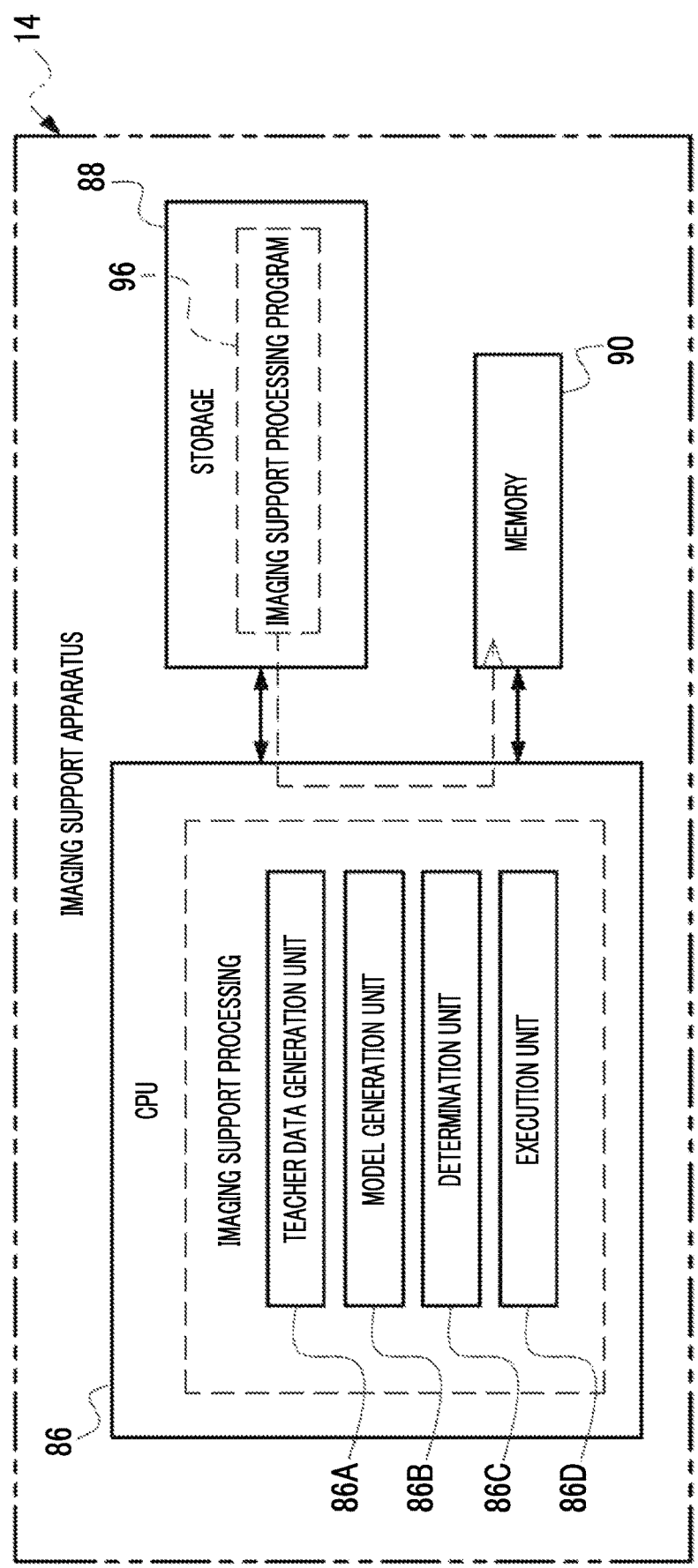
FIG. 4 is a block diagram showing an example of main functions of a CPU included in the imaging support apparatus.

As an example shown in FIG. 4, the storage 88 of the imaging support apparatus 14 stores an imaging support processing program 96. The imaging support processing program 96 is an example of a "program" according to the present disclosed technology.

The CPU 86 reads the imaging support processing program 96 from the storage 88 and executes the read imaging support processing program 96 on the memory 90. The CPU 86 performs imaging support processing according to the imaging support processing program 96 executed on the memory 90 (see also FIGS. 29A and 29B). The imaging support processing is implemented by operating the CPU 86 as a teacher data generation unit 86A, a model generation unit 86B, a determination unit 86C, and an execution unit 86D.

Hereinafter, an example of the content of specific processing by the teacher data generation unit 86A, the model generation unit 86B, the determination unit 86C, and the execution unit 86D will be described with reference to FIGS. 5 to 28.

Figure 5:
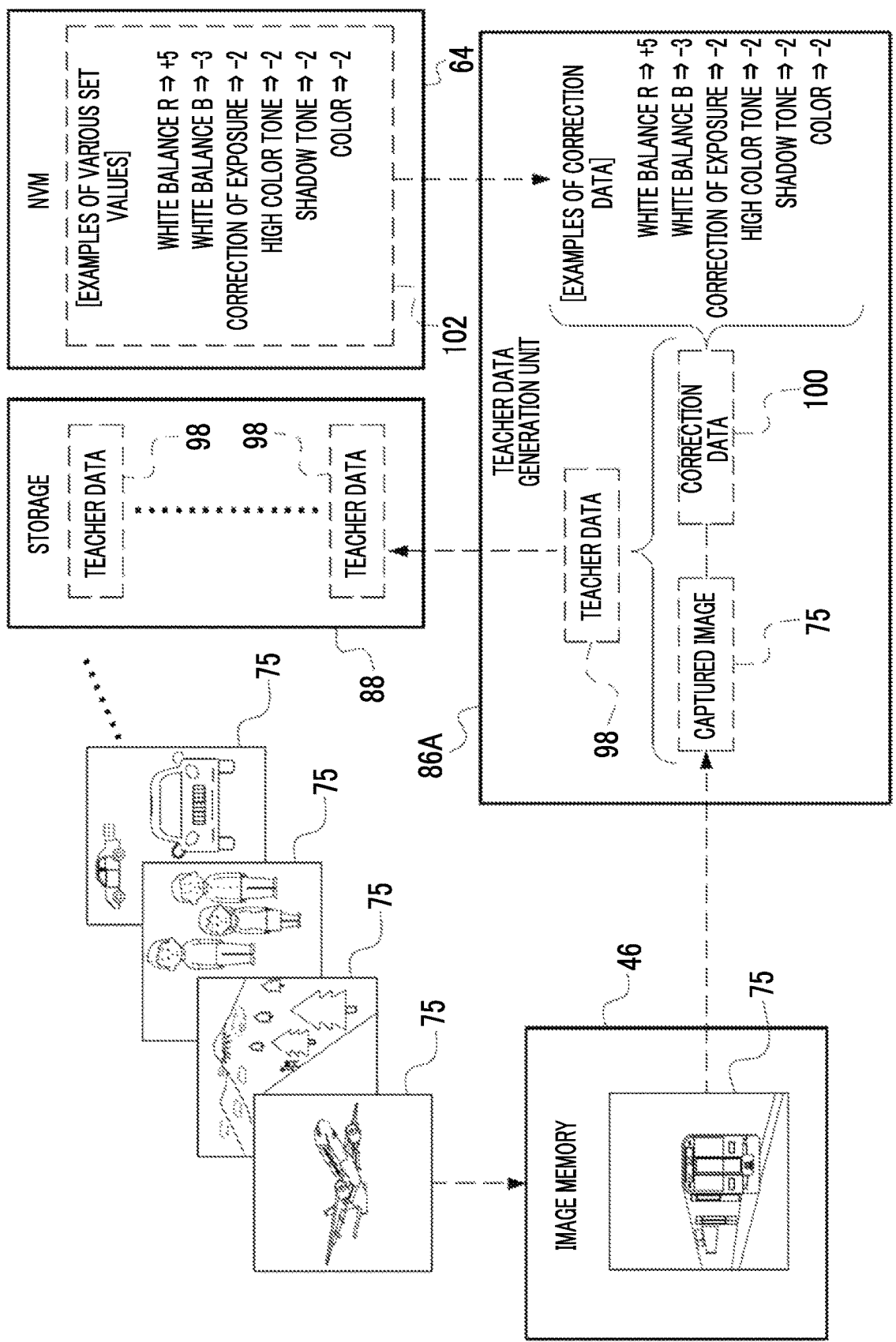
FIG. 5 is a conceptual diagram showing an example of the content of processing of a teacher data generation unit.

As an example shown in FIG. 5, the teacher data generation unit 86A generates teacher data 98. The teacher data 98 is labeled data used in the machine learning. In the present embodiment, the teacher data 98 is used in learning processing with respect to a CNN 104 (see FIG. 6), a replication model 116 (see FIG. 8), the second trained model 118 (see FIG. 8), and the like. The teacher data 98 has the captured image 75 and correction data 100. The "trained model" according to the present disclosed technology includes a model in which additional learning is possible.

The NVM 64 of the imaging apparatus 12 (see FIG. 2) stores parameters applied to the imaging apparatus 12, that is, the various set values 102 applied to the control related to the imaging performed by the imaging apparatus. In the following, for convenience of explanation, the control related to the imaging performed by the imaging apparatus is also simply referred to as "control related to imaging".

Examples of the various set values 102 include a set value of white balance R (for example, a white balance gain applied to red (R)), a set value of white balance B (for example, a white balance gain applied to blue (B)), a set value used for correction of exposure, a set value used for adjustment of high color tone according to the imaging scene, a set value used for adjustment of shadow tone according to the imaging scene, a set value used for adjustment of color according to the imaging scene, and the like.

Here, the set value of white balance R and the set value of white balance B are examples of "set values related to white balance used in the imaging" according to the present disclosed technology. Further, the set value used for correction of exposure is an example of a "set value related to exposure used in the imaging" according to the present disclosed technology. Further, the set value used for adjustment of high color tone (or also referred to as "highlight tone") according to the imaging scene and the set value used for adjustment of shadow tone according to the imaging scene are examples of "set values related to gradation used in the imaging" according to the present disclosed technology. Further, the set value used for adjustment of color according to the imaging scene is an example of a "set value related to a chroma saturation used in the imaging" according to the present disclosed technology.

The teacher data generation unit 86A acquires the captured image 75 from the image memory 46 of the imaging apparatus 12 (see FIG. 2). Further, the teacher data generation unit 86A acquires the various set values 102 corresponding to the acquired captured image 75, that is, the various set values 102 applied to the control related to the imaging performed to obtain the captured image 75 from the NVM 64. The set value 102 that is applied to the imaging apparatus 12 is a value set by the user.

The teacher data generation unit 86A uses the various set values 102 acquired from the NVM 64, that is, the various set values 102 applied to the imaging apparatus 12 in a case where the captured image 75 is acquired by the imaging apparatus 12 as the correction data 100. The teacher data generation unit 86A generates the teacher data 98 by associating the captured image 75 acquired from the image memory 46 with the correction data 100.

The generation of the teacher data 98 by the teacher data generation unit 86A is performed each time the user performs one imaging, that is, each time the captured image 75 is stored in the image memory 46. In the following, the number of images may be represented as "the number of frames" or "the number of images".

The teacher data generation unit 86A stores the generated teacher data 98 in the storage 88 in units of one image. A plurality of teacher data 98 are stored in the storage 88. That is, the storage 88 stores a plurality of captured images 75 and the plurality of correction data 100 related to the plurality of captured images 75, as the plurality of teacher data 98.

Figure 6:
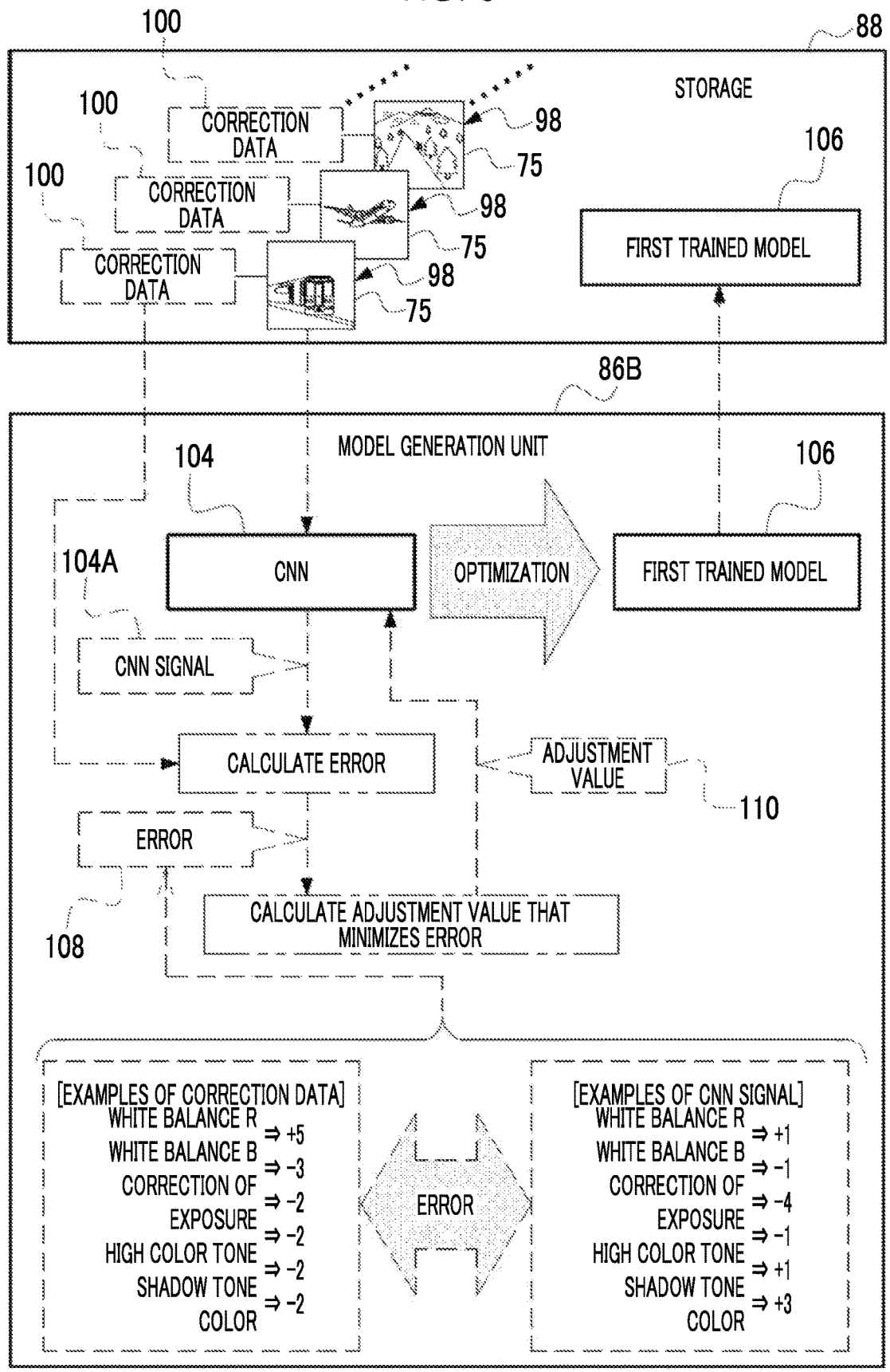
FIG. 6 is a conceptual diagram showing an example of the content of processing of a model generation unit in a case where a first trained model is generated.

As shown in FIG. 6 as an example, the model generation unit 86B has the CNN 104. The model generation unit 86B acquires the teacher data 98 from the storage 88 and inputs the captured image 75 included in the acquired teacher data 98 to the CNN 104. In a case where the captured image 75 is input, the CNN 104 outputs a CNN signal 104A corresponding to the various set values 102. The CNN signal 104A is a signal that indicates the set value of the same items as the various set values 102. The set value of the same items as the various set values 102 refers to, for example, the set value of white balance R, the set value of white balance B, the set value used for correction of exposure, the set value used for adjustment of high color tone according to the imaging scene, the set value used for adjustment of shadow tone according to the imaging scene, the set value used for adjustment of color according to the imaging scene, and the like.

The model generation unit 86B calculates an error 108 between the correction data 100 that is associated with the captured image 75 input to the CNN 104 and the CNN signal 104A. The errors 108 refer to, for example, an error of the set value of white balance R, an error of the set value of white balance B, an error of the set value used for correction of exposure, an error of the set value used for adjustment of high color tone according to the imaging scene, an error of the set value used for adjustment of shadow tone according to the imaging scene, an error of the set value used for adjustment of color according to the imaging scene, and the like.

The model generation unit 86B calculates a plurality of adjustment values 110 that minimize the error 108. Thereafter, the model generation unit 86B adjusts a plurality of optimization variables in the CNN 104 by using the plurality of calculated adjustment values 110. Here, the plurality of optimization variables in the CNN 104 refer to, for example, a plurality of bonding loads and a plurality of offset values included in the CNN 104, and the like.

The model generation unit 86B repeats the learning processing of inputting the captured image 75 to the CNN 104, calculating the error 108, calculating the plurality of adjustment values 110, and adjusting the plurality of optimization variables in the CNN 104, for the number of captured images 75 stored in the storage 88. That is, the model generation unit 86B optimizes the CNN 104 by adjusting the plurality of optimization variables in the CNN 104 by using the plurality of adjustment values 110 calculated so as to minimize the error 108 for each of the plurality of captured images 75 in the storage 88. The model generation unit 86B does not necessarily have to be provided inside the CPU 86 and may be provided outside the CPU 86. That is, the learning processing is not limited to that performed by the CPU 86, and the learning processing includes processing of causing the model generation unit 86B, which is provided outside the CPU 86, to perform the learning processing under the control of the CPU 86 to generate a trained model.

The model generation unit 86B generates a first trained model 106 by optimizing the CNN 104. That is, the CNN 104 is optimized by adjusting the plurality of optimization variables included in the CNN 104, whereby the first trained model 106 is generated. The model generation unit 86B stores the generated first trained model 106 in the storage 88. As will be described in detail later, the first trained model 106 is a trained model used for the control related to the imaging. The control related to this imaging includes not only the control related to the capture of the image by the image sensor 20 (see FIGS. 1 and 2), but also the image processing such as auto white balance, tone, and/or color for the data obtained by being imaged.

Figure 7:
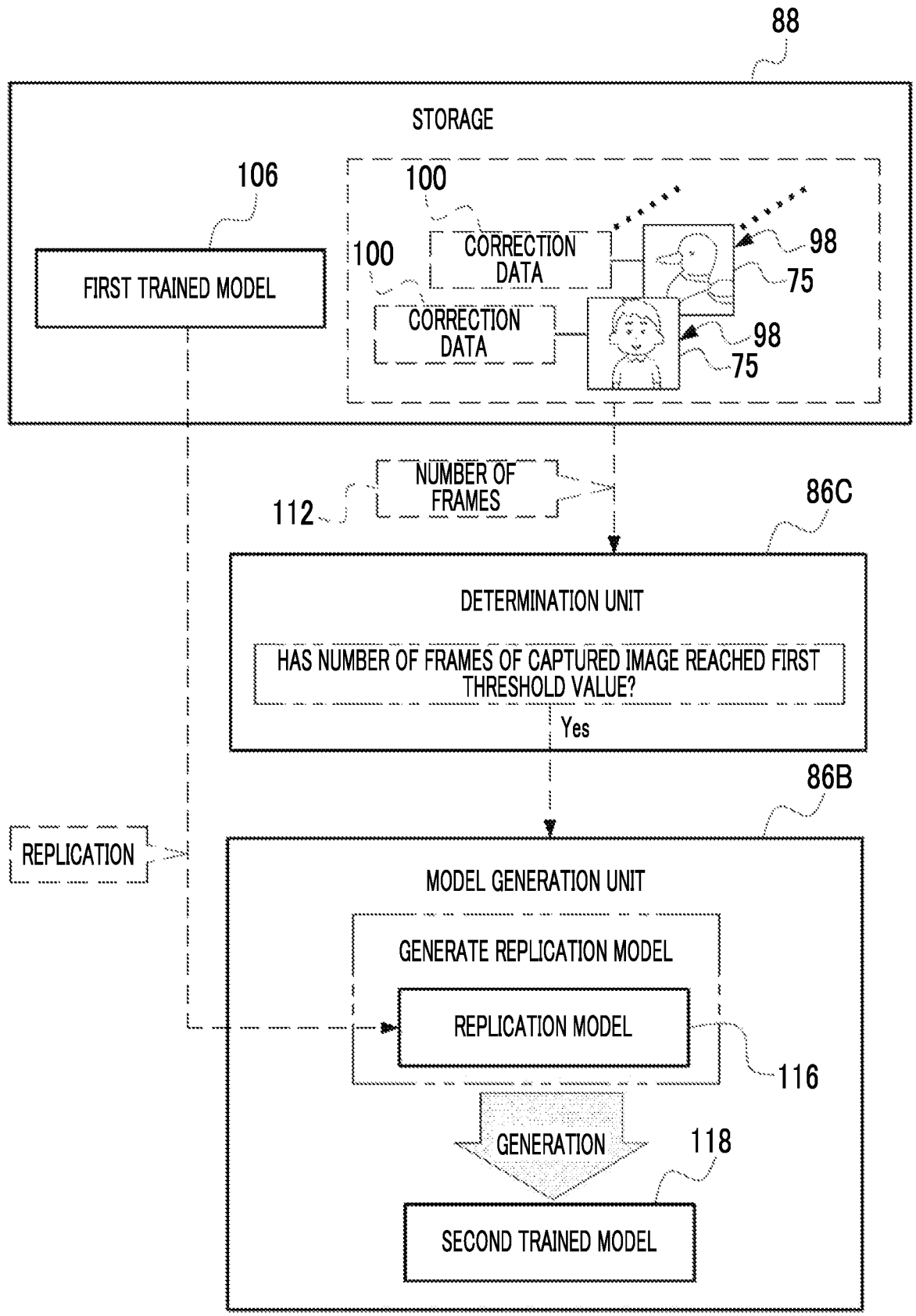
FIG. 7 is a conceptual diagram showing an example of the content of processing of a determination unit and the model generation unit.

As an example shown in FIG. 7, the storage 88 stores the first trained model 106. Further, as described above, each time the captured image 75 is stored in the image memory 46, the teacher data generation unit 86A generates the teacher data 98, and the generated teacher data 98 is stored in the storage 88. After the first trained model 106 is stored in the storage 88, the determination unit 86C determines whether or not the number of captured images 75 of the teacher data 98 stored in the storage 88 has reached a first threshold value (for example, "10000").

The first threshold value is not a fixed value but a variable value that is changed according to the number of captured images 75. For example, at a step where the learning processing is not performed on the CNN 104, the first threshold value is "10000", and in a case where the number of captured images 75 reaches "10000", a value that is counted as the number of captured images 75 is reset to "0", and the first threshold value is set to "1000". Thereafter, each time the number of captured images 75 reaches "1000", the value that is counted as the number of captured images 75 is reset to "0", and the first threshold value is set to "1000". Here, the values "10000" and "1000" shown as the first threshold value are only examples and may be other values.

In a case where the determination unit 86C determines that the number of the captured images 75 of the teacher data 98 stored in the storage 88 has reached the first threshold value, the model generation unit 86B generates a replication model 116. The replication model 116 is a learning model in which the first trained model 106 in the storage 88 is replicated. The model generation unit 86B generates a second trained model 118, which is a trained model used for the control related to the imaging, by performing the learning processing on the replication model 116 by using the teacher data 98 in the storage 88. That is, the model generation unit 86B generates the second trained model 118 by performing the learning processing on the replication model 116 by using the teacher data 98 in the storage 88 under the condition that the number of captured images 75 of the teacher data 98 stored in the storage 88 reaches the first threshold value.

Figure 8:
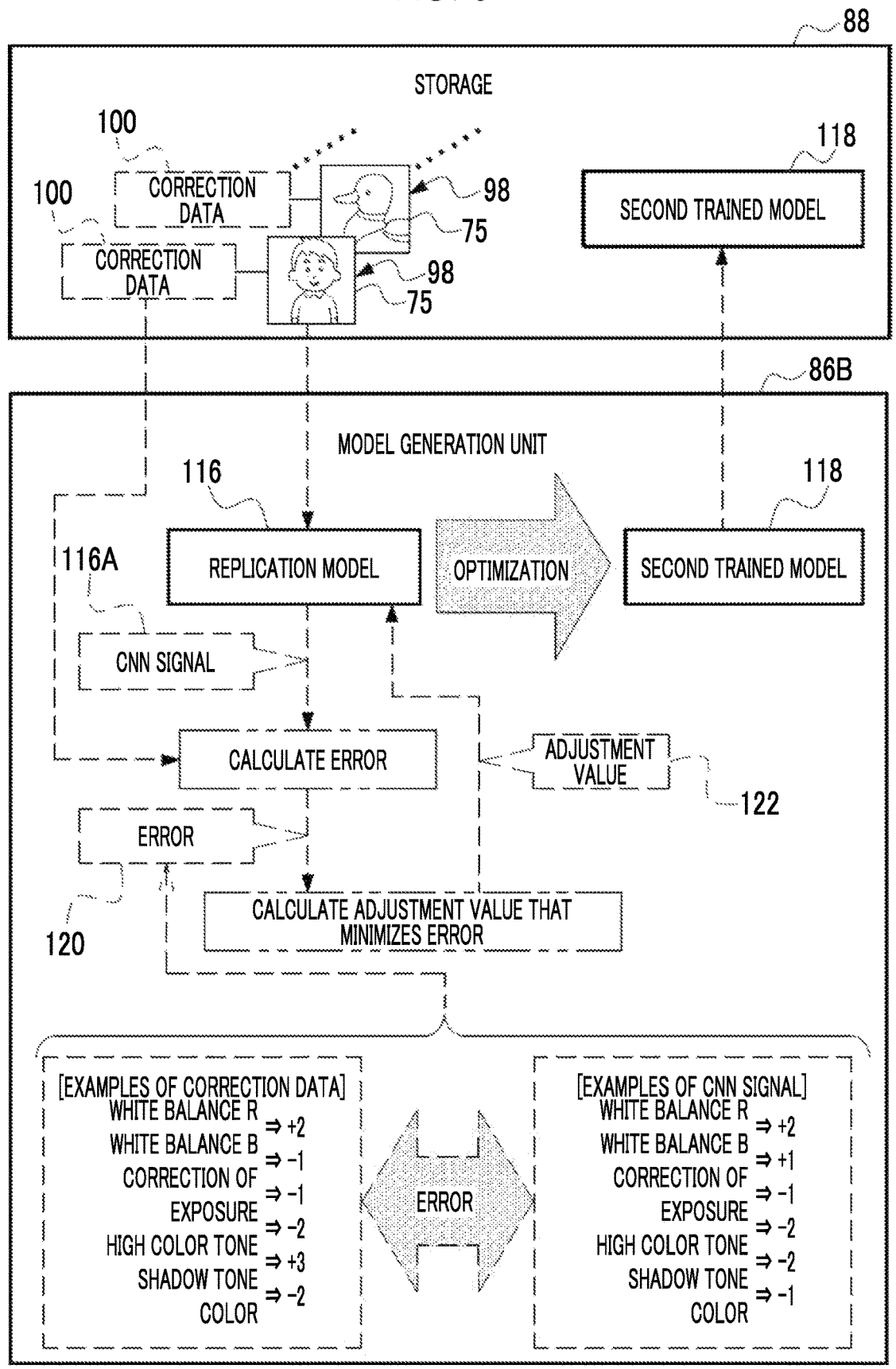
FIG. 8 is a conceptual diagram showing an example of the content of the processing of the model generation unit in a case where a second trained model is generated.

As an example shown in FIG. 8, the model generation unit 86B acquires the teacher data 98 from the storage 88 and inputs the captured image 75 included in the acquired teacher data 98 to the replication model 116. In a case where the captured image 75 is input, the replication model 116 outputs a CNN signal 116A corresponding to the various set values 102. Similar to the CNN signal 104A, the CNN signal 116A is a signal that indicates the set value of the same items as the various set values 102.

The model generation unit 86B calculates an error 120 between the correction data 100 associated with the captured image 75 input to the replication model 116 and the CNN signal 116A. The errors 120 refer to, for example, an error of the set value of white balance R, an error of the set value of white balance B, an error the set value used for correction of exposure, an error of the set value used for adjustment of high color tone according to the imaging scene, an error of the set value used for adjustment of shadow tone according to the imaging scene, an error of the set value used for adjustment of color according to the imaging scene, and the like.

The model generation unit 86B calculates a plurality of adjustment values 122 that minimize the error 120. Thereafter, the model generation unit 86B adjusts a plurality of optimization variables in the replication model 116 by using the plurality of calculated adjustment values 122. Here, the plurality of optimization variables in the replication model 116 refer to, for example, a plurality of bonding loads and a plurality of offset values included in the replication model 116, and the like.

The model generation unit 86B repeats the learning processing of inputting the captured image 75 to the replication model 116, calculating the error 120, calculating the plurality of adjustment values 122, and adjusting the plurality of optimization variables in the replication model 116, for the number of captured images 75 stored in the storage 88. That is, the model generation unit 86B optimizes the replication model 116 by adjusting the plurality of optimization variables in the replication model 116 by using the plurality of adjustment values 122 calculated so as to minimize the error 120 for each of the plurality of captured images 75 in the storage 88.

The model generation unit 86B generates the second trained model 118 by optimizing the replication model 116. That is, the replication model 116 is optimized by adjusting the plurality of optimization variables included in the replication model 116, whereby the second trained model 118 is generated. The model generation unit 86B stores the generated second trained model 118 in the storage 88.

In the example shown in FIG. 8, the teacher data 98 in the storage 88 is an example of "teacher data" according to the present disclosed technology, the captured image 75 in the storage 88 is an example of a "first image" according to the present disclosed technology, and the correction data 100 in the storage 88 is an example of a "set value" according to the present disclosed technology.

Figure 9:
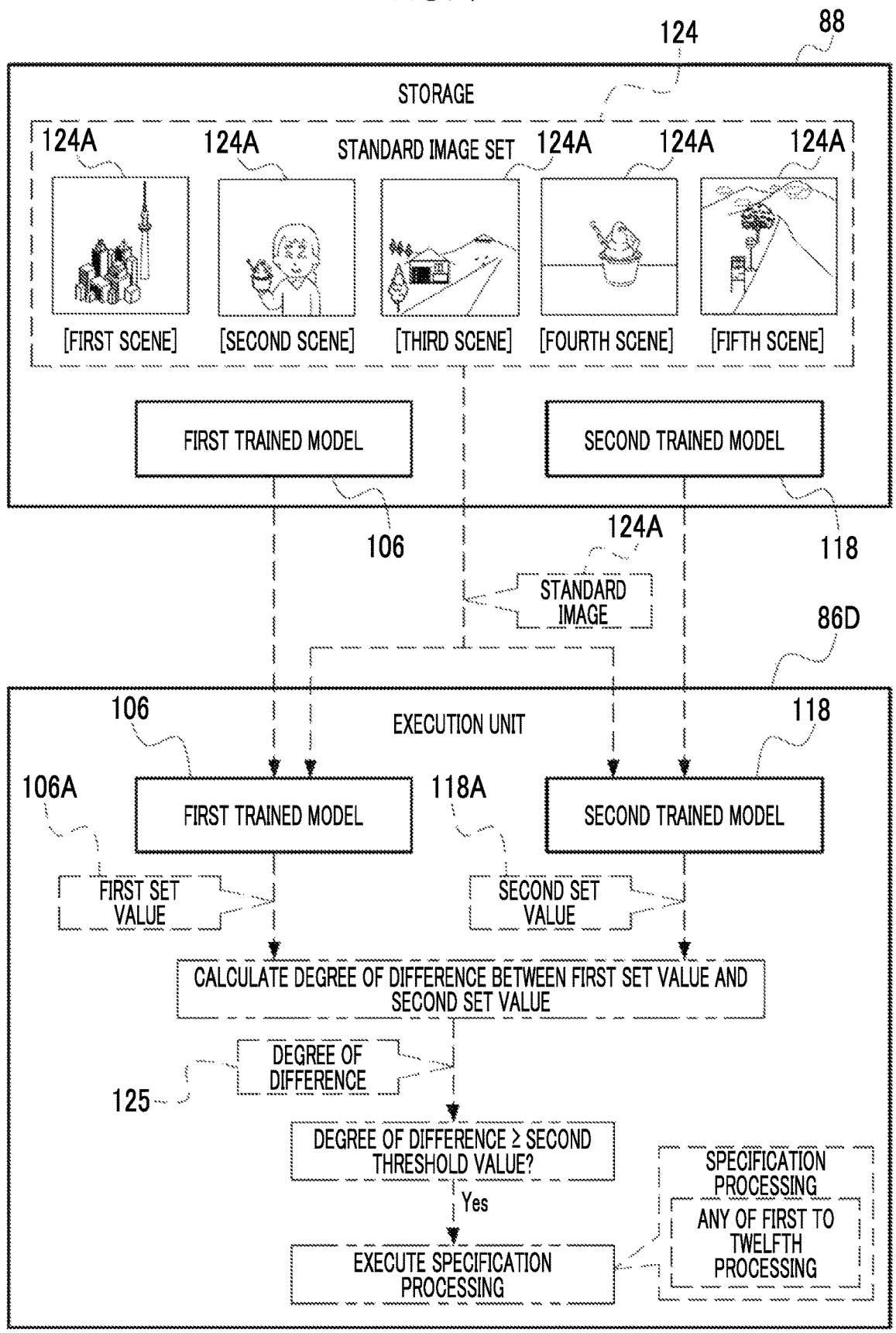
FIG. 9 is a conceptual diagram showing an example of the content of processing of an execution unit.

As an example shown in FIG. 9, the storage 88 stores a standard image set 124. The standard image set 124 has a plurality of standard images 124A. The standard image 124A is an example of a "second image" according to the present disclosed technology.

The plurality of standard images 124A are images acquired by being captured by the imaging apparatus 12 in different scenes. In the example shown in FIG. 9, as an example of the plurality of standard images 124A, images acquired by being captured by the imaging apparatus 12 in a first scene, images acquired by being captured by the imaging apparatus 12 in a second scene, images acquired by being captured by the imaging apparatus 12 in a third scene, images acquired by being captured by the imaging apparatus 12 in a fourth scene, and images acquired by being captured by the imaging apparatus 12 in a fifth scene, are shown.

The execution unit 86D performs specific processing under the condition that the number of captured images 75 of the teacher data 98 stored in the storage 88 reaches the first threshold value. In the present embodiment, as an example, the specific processing is performed depending on the output result of the second trained model 118 generated under the condition that the number of the captured images 75 of the teacher data 98 stored in the storage 88 reaches the first threshold value. This will be described in more detail below.

The execution unit 86D performs the specific processing based on a first set value 106A output from the first trained model 106 in a case where the standard image 124A is input to the first trained model 106 and a second set value 118A output from the second trained model 118 in a case where the standard image 124A is input to the second trained model 118. Specifically, first, the execution unit 86D inputs one standard image 124A among the plurality of standard images 124A to the first trained model 106 and the second trained model 118. The first trained model 106 outputs the first set value 106A in a case where the standard image 124A is input. The first set value 106A is a set value of the same items as the various set values 102 (hereinafter, also referred to as "various setting items"). The second trained model 118 outputs the second set value 118A in a case where the standard image 124A is input. The second set value 118A is also a set value of various setting items.

The execution unit 86D calculates a degree of difference 125 between the first set value 106A and the second set value 118A. The degree of difference 125 refers to, for example, an absolute value of a difference between the first set value 106A and the second set value 118A. The absolute value of the difference is only an example, and the absolute value of the difference may be a ratio of the second set value 118A to the first set value 106A or a ratio of the first set value 106A to the second set value 118A or may be any value as long as the value indicates the degree of difference between the first set value 106A and the second set value 118A.

Further, here, as the degree of difference 125 between the first set value 106A and the second set value 118A, for example, an average value of the degree of difference of each of the various setting items is used. For example, the degree of difference between the first set value 106A and the second set value 118A is an average value of the degree of difference between the first set value 106A and the second set value 118A for the white balance R, the degree of difference between the first set value 106A and the second set value 118A for the white balance B, the degree of difference between the first set value 106A and the second set value 118A used for the correction of exposure, the degree of difference between the first set value 106A and the second set value 118A used for the adjustment of high color tone according to the imaging scene, the degree of difference between the first set value 106A and the second set value 118A used for adjustment of the shadow tone according to the imaging scene, the degree of difference between the first set value 106A and the second set value 118A used for the adjustment of color according to the imaging scene, and the like. Further, in the present embodiment, for example, scoring is performed such that each of the set values can be treated equally.

Similarly, the execution unit 86D calculates the degree of difference 125 for the remaining standard image 124A among the plurality of standard images 124A. Thereafter, the execution unit 86D determines whether or not the degree of difference 125 for all of the plurality of standard images 124A is equal to or greater than a second threshold value. The execution unit 86D performs the specific processing in a case where the degree of difference 125 for all of the plurality of standard images 124A is equal to or greater than the second threshold value.

Here, an average of all the degrees of difference is calculated, but this is just an example. It is not necessary that there is a difference in each item of the above set value, for example, the specific processing may be performed in a case where there is a difference, which is equal to or greater than the second threshold value, in a certain set value. The second threshold value for the average value and the second threshold value for any one set value may be different from each other. Further, here, although an example of the embodiment in which the specific processing is executed under the condition that the degree of difference 125 for all of the plurality of standard images 124A is equal to or greater than the second threshold value has been described, this is only an example. For example, the specific processing may be performed under the condition that the number of times that the degree of difference 125 calculated for each of the plurality of standard images 124A is determined to be equal to or greater than the second threshold value, is equal to or greater than a default number (for example, majority, or any one frame, or the like) among the number of the plurality of standard images 124A (in the present example, 5 images (frames) of the standard images 124A of the first to fifth scenes). Further, for example, the specific processing may be performed under the condition that the average value of the degree of difference 125 for all of the plurality of standard images 124A is equal to or greater than the second threshold value. Further, for example, the specific processing may be performed under the condition that the maximum value of the degree of difference 125 for all of the plurality of standard images 124A is equal to or greater than the second threshold value. Further, for example, the specific processing may be performed under the condition that the minimum value of the degree of difference 125 for all of the plurality of standard images 124A is equal to or greater than the second threshold value. Further, for example, the specific processing may be performed under the condition that the median value of the degree of difference 125 for all of the plurality of standard images 124A is equal to or greater than the second threshold value.

The specific processing executed by the execution unit 86D refers to processing that includes any of the first to twelfth processing described later. However, this is only an example, and processing that includes a plurality of processing among the first to twelfth processing may be performed by the execution unit 86D as the specific processing.

Figure 10:
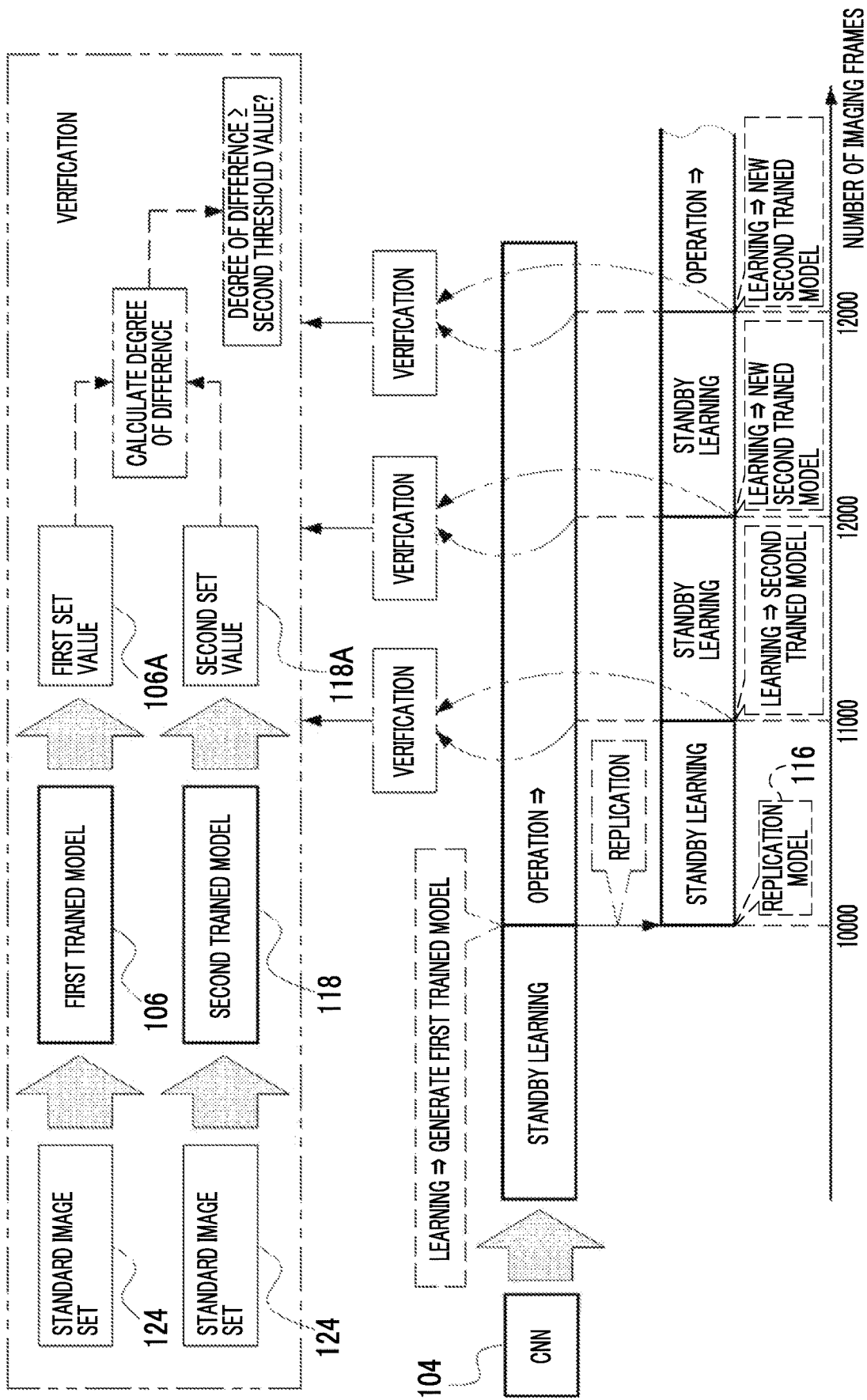
FIG. 10 is a conceptual diagram showing an example of a timing when verification is performed and a content of the verification.

FIG. 10 shows an example of the timing when a series of processing, which is processing of calculating the degree of difference 125 and processing of determining whether or not the degree of difference 125 is equal to or greater than the second threshold value (hereinafter, also referred to as "verification"), is performed by the execution unit 86D.

In the example shown in FIG. 10, until the number of captured images 75 acquired by being captured by the imaging apparatus 12 (hereinafter, also referred to as "the number of imaging frames") reaches "10000", the "standby learning" is set with respect to the CNN 104, and the learning processing is not performed on the CNN 104. In a case where the number of imaging frames reaches "10000", the learning processing is performed on the CNN 104, whereby the first trained model 106 is generated. In a case where the first trained model 106 is generated, the operation of the first trained model 106 is started. That is, inference (for example, processing of outputting the first set value 106A from the first trained model 106 by inputting the captured image 75 or the like to the first trained model 106) is performed on the first trained model 106, and the imaging support apparatus 14 performs processing that uses the inference result by the first trained model 106. Examples of the processing that uses the inference result by the first trained model 106 include processing of reflecting the first set value 106A, which is output from the first trained model 106 in a case where the captured image 75 is input to the first trained model 106 (for example, processing of setting the first set value 106A with respect to the imaging apparatus 12), on the control related to the imaging. The first trained model 106 may be generated in advance by the manufacturer of the imaging apparatus 12 and stored in a memory (for example, the NVM 64) in the camera (for example, the imaging apparatus 12).

Further, in a case where the number of imaging frames reaches "10000", the replication model 116 is generated. In a case where the replication model 116 is generated, the "standby learning" is set with respect to the replication model 116 until the number of imaging frames reaches "11000", and the learning processing is not performed on the replication model 116.

In a case where the number of imaging frames reaches "11000", the learning processing is performed on the replication model 116, whereby the second trained model 118 is generated. In a case where the second trained model 118 is generated, the verification is performed. In the verification, each of all the standard images 124A included in the standard image set 124 is sequentially input to the first trained model 106 and the second trained model 118. As a result, the first set value 106A is output from the first trained model 106, and the second set value 118A is output from the second trained model 118. Thereafter, the degree of difference 125 between the first set value 106A output from the first trained model 106 and the second set value 118A output from the second trained model 118 is calculated, and whether or not the calculated degree of difference 125 is equal to or greater than the second threshold value is determined. Here, in a case where the degree of difference 125 is equal to or greater than the second threshold value, the processing that includes the specific processing is executed.

The processing that includes the specific processing has processing of switching from the operation of the first trained model 106 to the operation of the existing second trained model 118 (for example, the operation of the latest second trained model 118). That is, inference (for example, processing of outputting the second set value 118A from the existing second trained model 118 by inputting the captured image 75 or the like to the existing second trained model 118) is performed on the existing second trained model 118, and the imaging support apparatus 14 performs processing that uses the inference result by the existing second trained model 118. Examples of the processing that uses the inference result by the second trained model 118 include processing of reflecting the second set value 118A, which is output from the second trained model 118 in a case where the captured image 75 is input to the second trained model 118 (for example, processing of setting the second set value 118A with respect to the imaging apparatus 12), on the control related to the imaging.

On the other hand, in the verification that uses the first trained model 106 and the existing second trained model 118, in a case where the degree of difference 125 is less than the second threshold value, the specific processing is not executed, the "standby learning" is set with respect to the second trained model 118 until the number of imaging frames reaches "12000", and the learning processing is not performed on the second trained model 118. Here, the existing second trained model 118 in a case where the degree of difference 125 is less than the second threshold value, that is, the latest second trained model 118 immediately before a timing of moment when the degree of difference 125 is determined to be less than the second threshold value is an example of the "learning model" according to the present disclosed technology.

In a case where the number of imaging frames reaches "12000", the learning processing is performed on the existing second trained model 118, whereby a new second trained model 118 is generated. In a case where the new second trained model 118 is generated, the verification is performed. In the verification, each of all the standard images 124A included in the standard image set 124 is sequentially input to the first trained model 106 and the new second trained model 118. As a result, the first set value 106A is output from the first trained model 106, and the second set value 118A is output from the new second trained model 118. Thereafter, the degree of difference 125 between the first set value 106A output from the first trained model 106 and the second set value 118A output from the new second trained model 118 is calculated, and whether or not the calculated degree of difference 125 is equal to or greater than the second threshold value is determined. Here, in a case where the degree of difference 125 is equal to or greater than the second threshold value, the specific processing is executed. In a case where the degree of difference 125 is less than the second threshold, the specific processing is not executed, the "standby learning" is set with respect to the existing second trained model 118 until the number of imaging frames reaches "13000", and the learning processing is not performed on the existing second trained model 118. Thereafter, each time the number of imaging frames reaches "1000", the same processing is performed until the condition of "the degree of difference 125≥the second threshold value" is satisfied.

In the example shown in FIG. 10, the time when the replication model 116 is replicated, that is, the time when the number of imaging frames reaches "10000" is an example of "specific time" according to the present disclosed technology. Further, in the example shown in FIG. 10, the time when the second trained model 118 used for verification is generated during a period when the number of imaging frames exceeds "10000" is an example of the "specific time" according to the present disclosed technology. Further, during a period when the number of imaging frames exceeds "10000", a period from the time when the second trained model 118 used for verification is generated until the number of imaging frames reaches "1000" (that is, a period until the next verification is performed) is an example of a "period from the specific time until the condition is satisfied" according to the present disclosed technology.

In the example shown in FIG. 10, although an example of the embodiment in which the learning processing is not performed on the CNN 104 until the number of imaging frames reaches "10000" has been described, this is only an example, and the number of imaging frames, which is used for a condition for canceling the standby learning, may be a value less than "10000" (for example, "1000") or may be a value exceeding "10000" (for example, "100000"). Further, in the example shown in FIG. 10, although an example of the embodiment in which the verification of the number of imaging frames is performed in units of "1000" in a case where the number of imaging frames exceeds "10000" has been described, this is only an example, and the number of imaging frames, which is used for a condition for performing the verification, may be a value less than "1000" (for example, "100") or may be a value exceeding "1000" (for example, "10000").

Figure 11:
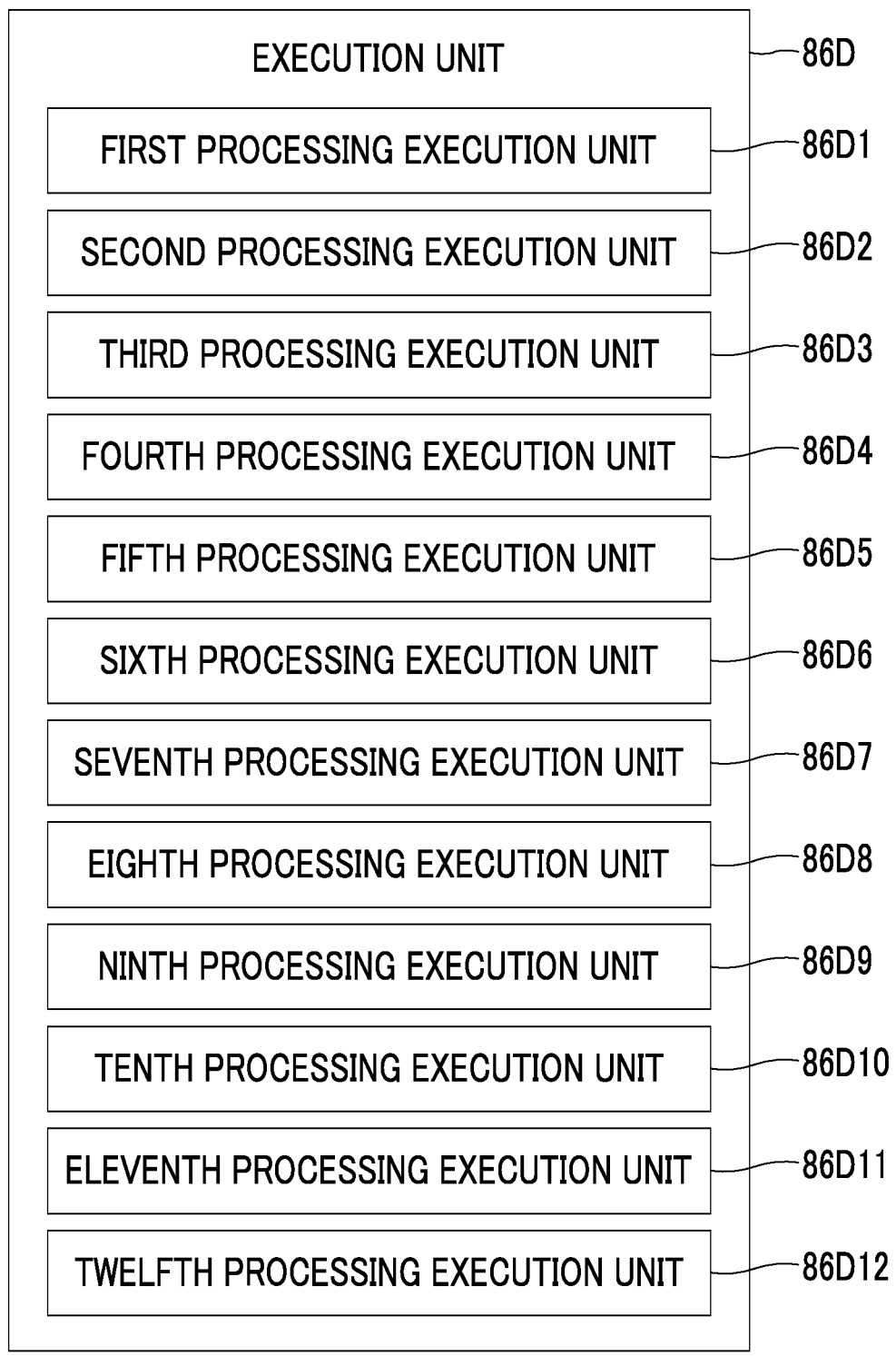
FIG. 11 is a block diagram showing an example of functions included in the execution unit.

As an example shown in FIG. 11, the execution unit 86D includes a first processing execution unit 86D1, a second processing execution unit 86D2, a third processing execution unit 86D3, a fourth processing execution unit 86D4, a fifth processing execution unit 86D5, a sixth processing execution units 86D6, a seventh processing execution unit 86D7, an eighth processing execution unit 86D8, a ninth processing execution unit 86D9, a tenth processing execution unit 86D10, an eleventh processing execution unit 86D11, and a twelfth processing execution unit 86D12.

Figure 12:
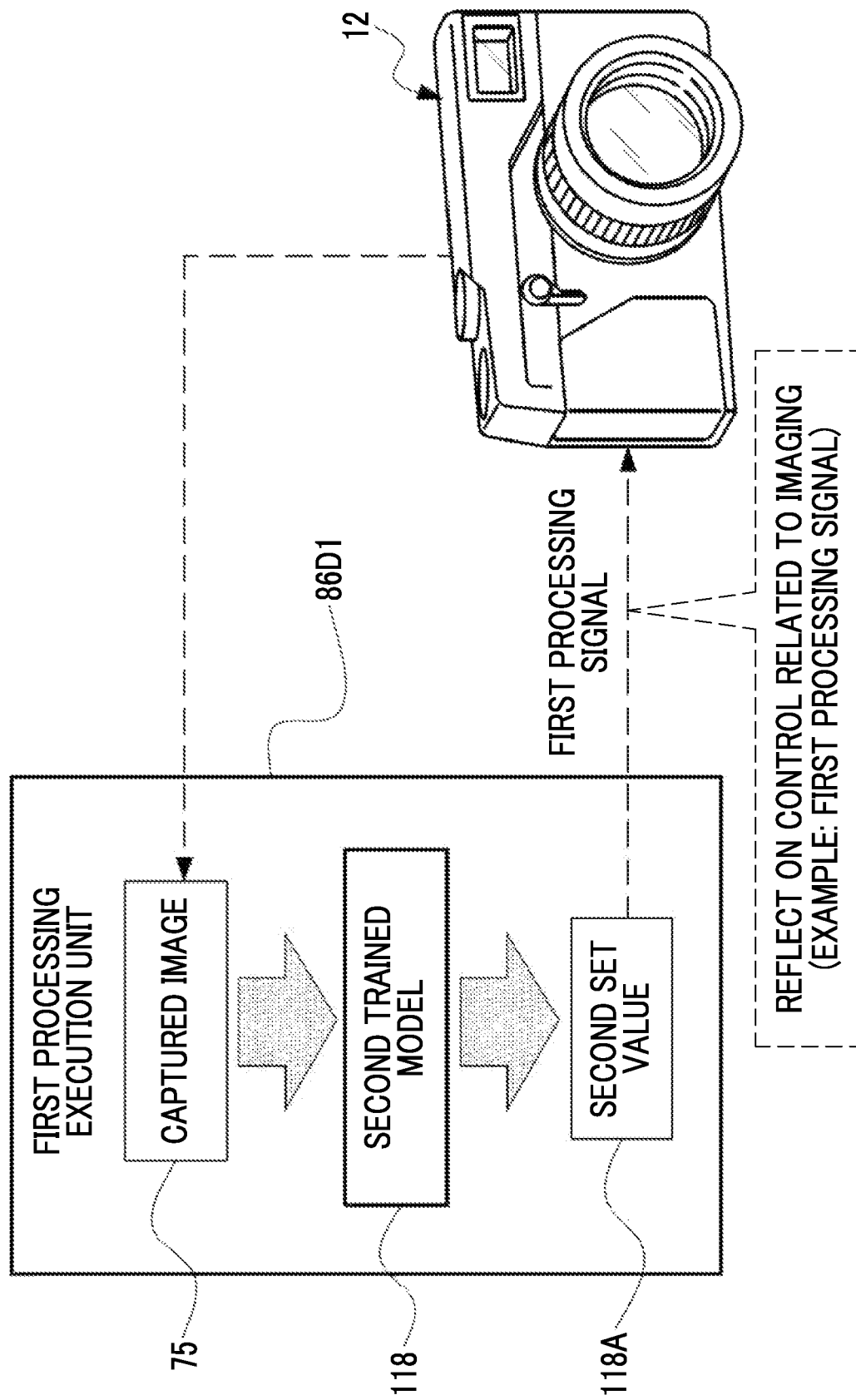
FIG. 12 is a conceptual diagram showing an example of the content of processing of a first processing execution unit.

The first processing execution unit 86D1 executes first processing (see FIG. 12). The second processing execution unit 86D2 executes second processing (see FIG. 13). The third processing execution unit 86D3 executes third processing (see FIG. 14). The fourth processing execution unit 86D4 executes fourth processing (see FIGS. 15 to 18). The fifth processing execution unit 86D5 executes fifth processing (see FIG. 19). The sixth processing execution unit 86D6 executes sixth processing (see FIG. 20). The seventh processing execution unit 86D7 executes seventh processing (see FIG. 21). The eighth processing execution unit 86D8 executes eighth processing (see FIG. 22). The ninth processing execution unit 86D9 executes ninth processing (see FIGS. 23 and 24). The tenth processing execution unit 86D10 executes tenth processing (see FIGS. 25 and 26). The eleventh processing execution unit 86D11 executes eleventh processing (see FIG. 27). The twelfth processing execution unit 86D12 executes twelfth processing (see FIG. 28).

As an example shown in FIG. 12, the first processing execution unit 86D1 executes processing of reflecting the second set value 118A on the control related to the imaging, as the first processing. For example, first, the first processing execution unit 86D1 acquires the captured image 75 from the imaging apparatus 12 and inputs the acquired captured image 75 to the second trained model 118. The second trained model 118 outputs the second set value 118A in a case where the captured image 75 is input. The first processing execution unit 86D1 transmits a first processing signal, which includes the second set value 118A output from the second trained model 118, to the imaging apparatus 12. The imaging apparatus 12 receives the first processing signal transmitted from the first processing execution unit 86D1 and performs the imaging by using the second set value 118A included in the received first processing signal.

In the example shown in FIG. 12, although an example of the embodiment in which the captured image 75 is input to the second trained model 118 has been described, this is only an example, and an image other than the captured image 75 may be input to the second trained model 118. Examples of the image other than the captured image 75 include at least one image selected by the user or the like among the plurality of standard images 124A.

Figure 13:
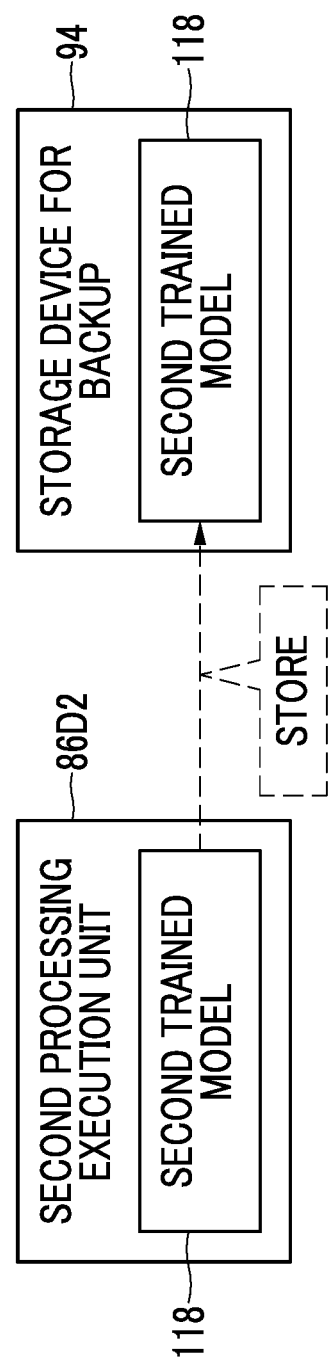
FIG. 13 is a conceptual diagram showing an example of the content of processing of a second processing execution unit.

As an example shown in FIG. 13, the second processing execution unit 86D2 executes processing of storing the second trained model 118 in the storage device 94 for backup, as the second processing. For example, the second processing execution unit 86D2 stores the latest second trained model 118 used in the verification in the storage device 94 for backup. Although the storage device 94 for backup is exemplified here as a storage destination of the second trained model 118, the present disclosed technology is not limited to this, and the storage device of another device (for example, the imaging apparatus 12, a server, a personal computer, or the like) existing on the network 34 may be used instead of the storage device 94 for backup.

Figure 14:
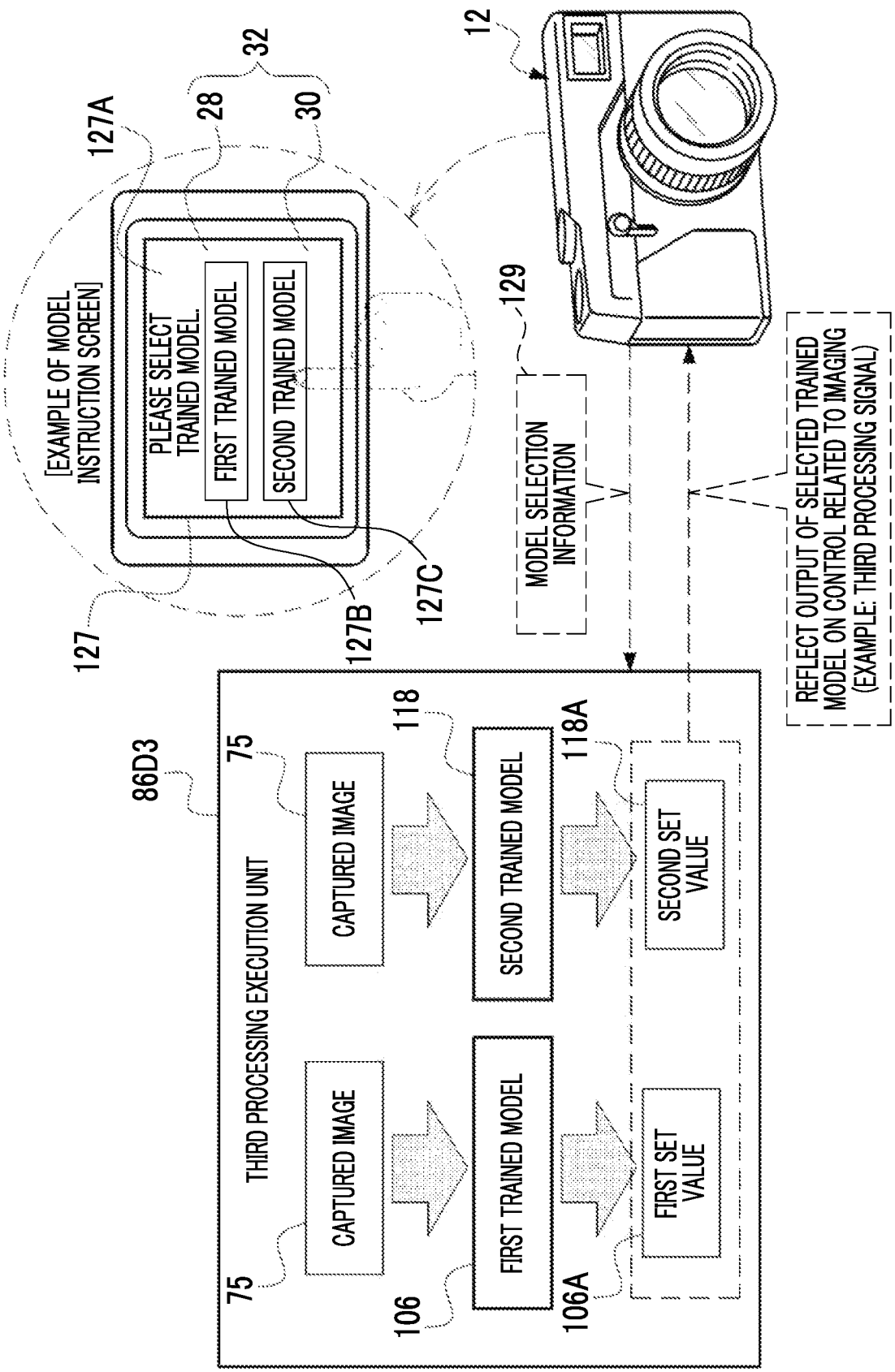
FIG. 14 is a conceptual diagram showing an example of the content of processing of a third processing execution unit.

As an example shown in FIG. 14, the third processing execution unit 86D3 executes processing of reflecting the output of the trained model, among the first trained model 106 and the second trained model 118, selected according to the received instruction on the control related to the imaging, as the third processing.

In this case, for example, any of the first trained model 106 or the second trained model 118 is selected according to the instruction provided to the imaging apparatus 12 by the user or the like. In the example shown in FIG. 14, a model instruction screen 127 is displayed on the display 28 of the imaging apparatus 12, and the instruction from the user or the like is received by the touch panel 30.

A message 127A, a softkey 127B, and a softkey 127C are displayed on the model instruction screen 127. The message 127A is a message that prompts the user to select a trained model. In the example shown in FIG. 14, a message "Please select a trained model" is shown as an example of the message 127A. The softkey 127B is turned on via the touch panel 30 in a case where the first trained model 106 is selected by the user or the like. The softkey 127C is turned on via the touch panel 30 in a case where the second trained model 118 is selected by the user or the like. In the example shown in FIG. 14, an example of the aspect in which the softkey 127C is turned on by the user or the like is described. In a case where the softkey 127B or the softkey 127C is turned on via the touch panel 30, the imaging apparatus 12 transmits model selection information 129 to the third processing execution unit 86D3. The model selection information 129 is information indicating whether any of the first trained model 106 or the second trained model 118 is selected by the user or the like (for example, information indicating whether any of the softkeys 127B or 127C is turned on).

The third processing execution unit 86D3 receives the model selection information 129 transmitted from the imaging apparatus 12 and specifies which of the first trained model 106 and the second trained model 118 is selected with reference to the received model selection information 129. The third processing execution unit 86D3 inputs the captured image 75 to the specified model (hereinafter, also referred to as a "selected trained model") among the first trained model 106 and the second trained model 118. In a case where the selected trained model is the first trained model 106, the first trained model 106 outputs the first set value 106A. In a case where the selected trained model is the second trained model 118, the second trained model 118 outputs the second set value 118A.

The third processing execution unit 86D3 transmits a signal, which includes the first set value 106A output from the first trained model 106 or the second set value 118A output from the second trained model 118, to the imaging apparatus 12 as s third processing signal. Hereinafter, for convenience of explanation, in a case where it is not necessary to distinguish between the first set value 106A output from the first trained model 106 and the second set value 118A output from the second trained model 118, the set value is called as an "output set value".

The imaging apparatus 12 receives the third processing signal transmitted from the third processing execution unit 86D3 and performs the imaging by using the output set value that is included in the received third processing signal.

In the example shown in FIG. 14, although an example of the embodiment in which the captured image 75 is input to each of the first trained model 106 and the second trained model 118 has been described, this is only an example, and an image other than the captured image 75 may be input to at least one trained model among the first trained model 106 or the second trained model 118.

Figure 15:
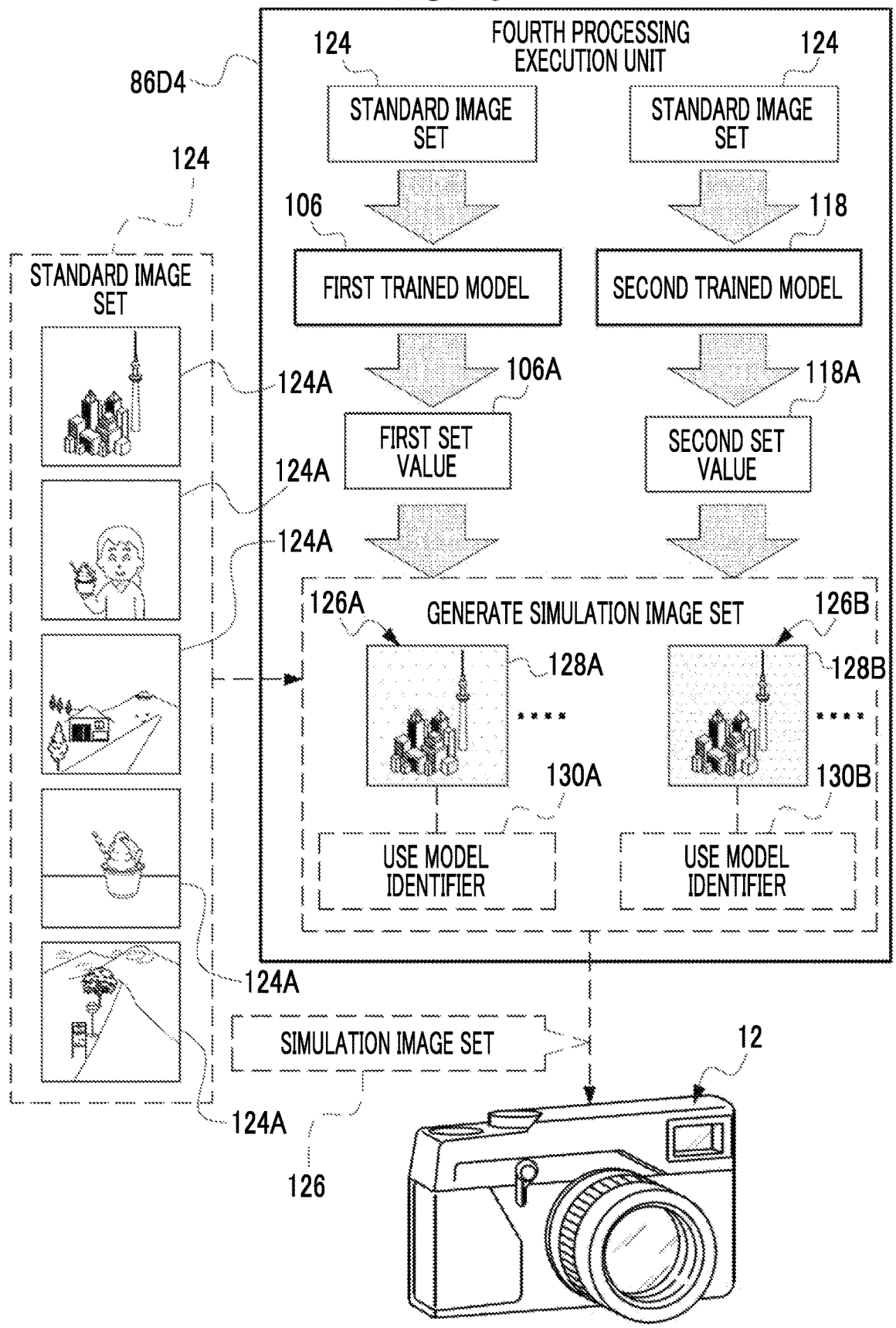
FIG. 15 is a conceptual diagram showing an example of the content of processing of a fourth processing execution unit.

As an example shown in FIG. 15, the fourth processing execution unit 86D4 outputs data for displaying a simulation image 128A, which corresponds to an image obtained by applying the first set value 106A output from the first trained model 106 by inputting the standard image set 124 to the first trained model 106 to the standard image set 124, and a simulation image 128B, which is obtained by applying the second set value 118A output from the second trained model 118 by inputting the standard image set 124 to the second trained model 118 to the standard image set 124, on the display 28 (see FIG. 16), as the fourth processing.

Here, the standard image set 124 is an example of a "third image" and a "fifth image" according to the present disclosed technology. That is, the "third image" and the "fifth image" may be the same image. Further, the first set value 106A is an example of a "first output result" according to the present disclosed technology. Further, the second set value 118A is an example of a "second output result" according to the present disclosed technology. Further, a simulation image set 126B is an example of a "fourth image" according to the present disclosed technology. Further, the simulation image 128B is an example of a "sixth image" according to the present disclosed technology. Further, the display 28 is an example of a "first display" according to the present disclosed technology.

In the example shown in FIG. 15, the fourth processing execution unit 86D4 sequentially inputs each of all the standard images 124A included in the standard image set 124 to the first trained model 106. The first trained model 106 outputs the first set value 106A each time the standard image 124A is input. The fourth processing execution unit 86D4 generates a simulation image set 126A that includes the simulation image 128A and a use model identifier 130A based on the output first set value 106A and the corresponding standard image 124A each time the first set value 106A is output from the first trained model 106. The simulation image set 126A is generated for each of all the standard images 124A included in the standard image set 124. Here, although each of all the standard images 124A is sequentially input to the first trained model 106, any one or a plurality of standard images may be used.

The simulation image 128A is an image expected as the captured image 75 acquired by the imaging apparatus 12 in a case where the imaging is performed by using the first set value 106A. Examples of the simulation image 128A include an image corresponding to the standard image 124A influenced by the first set value 106A in a case where the imaging is performed by using the first set value 106A, on the premise that the standard image 124A is acquired by the imaging apparatus 12 performing the imaging.

The use model identifier 130A, which is included in the simulation image set 126A, is an identifier that is capable of specifying the first trained model 106. The use model identifier 130A is associated with the simulation image 128A.

In the example shown in FIG. 15, the fourth processing execution unit 86D4 sequentially inputs each of all the standard images 124A included in the standard image set 124 to the second trained model 118. The second trained model 118 outputs the second set value 118A each time the standard image 124A is input. The fourth processing execution unit 86D4 generates a simulation image set 126B that includes the simulation image 128B and a use model identifier 130B based on the output second set value 118A and the corresponding standard image 124A each time the second set value 118A is output from the second trained model 118. The simulation image set 126B is generated for each of all the standard images 124A included in the standard image set 124.

The simulation image 128B is an image expected as the captured image 75 acquired by the imaging apparatus 12 in a case where the imaging is performed by using the second set value 118A. Examples of the simulation image 128B include an image corresponding to the standard image 124A influenced by the second set value 118A in a case where the imaging is performed by using the second set value 118A, on the premise that the standard image 124A is acquired by the imaging apparatus 12 performing the imaging.

The use model identifier 130B, which is included in the simulation image set 126B, is an identifier that is capable of specifying the second trained model 118. The use model identifier 130B is associated with the simulation image set 126B.

In the following, for convenience of explanation, the data including the simulation image sets 126A and 126B is referred to as a simulation image set 126. Further, in a case where it is not necessary to distinguish between the simulation images 128A and 128B, the simulation images 128A and 128B are referred to as simulation images 128. Further, in a case where it is not necessary to distinguish between the use model identifiers 130A and 130B, the use model identifiers 130A and 130B are referred to as a use model identifier 130.

The fourth processing execution unit 86D4 transmits the simulation image set 126 to the imaging apparatus 12. The imaging apparatus 12 receives the simulation image set 126 transmitted from the fourth processing execution unit 86D4. Here, the simulation image set 126 is an example of "first data" according to the present disclosed technology.

Figure 16:
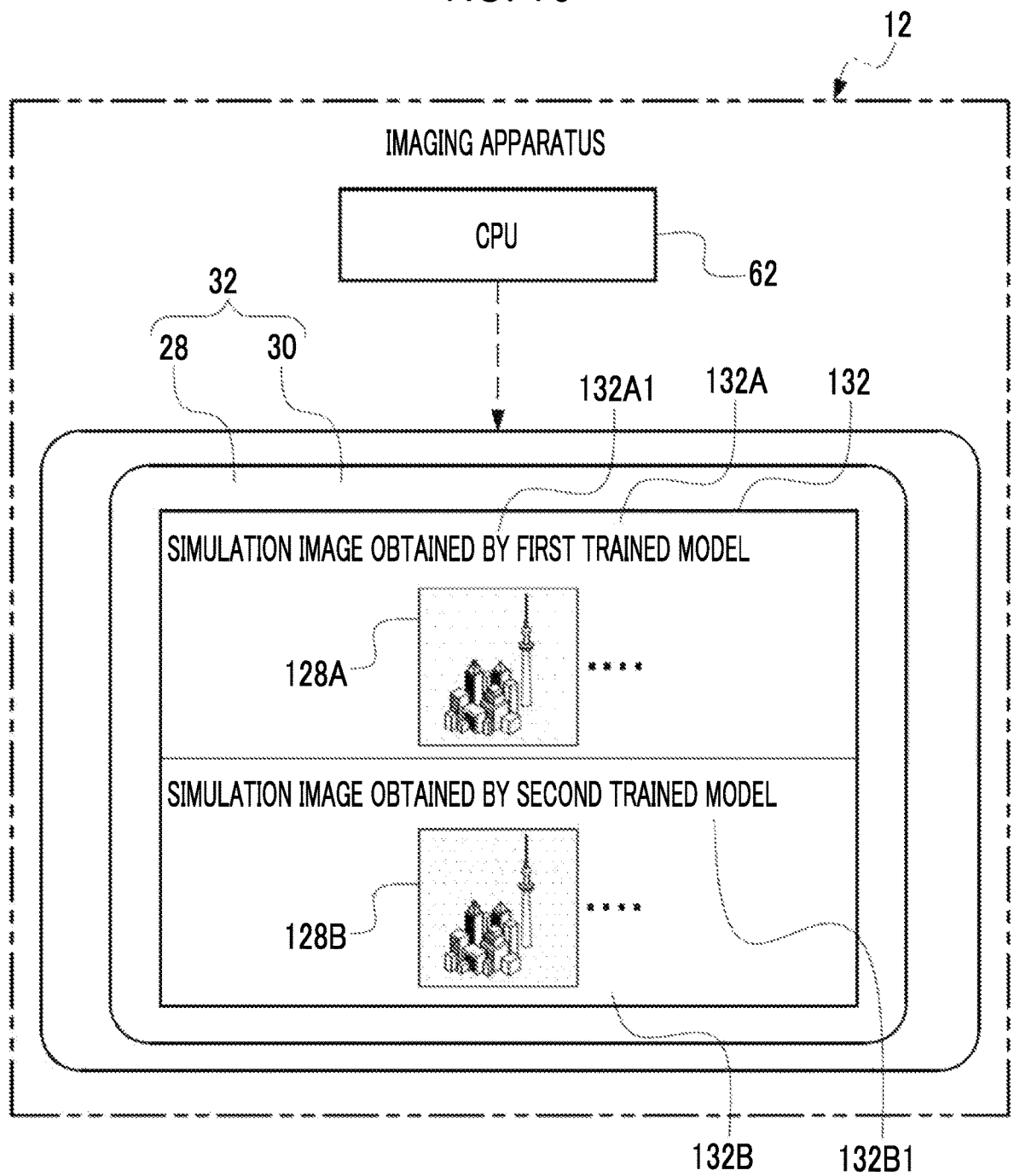
FIG. 16 is a screen view showing an example of an aspect of a simulation image display screen displayed on a display under the control of the CPU.

As an example shown in FIG. 16, the CPU 62 of the imaging apparatus 12 generates a simulation image display screen 132 based on the simulation image set 126 and displays the simulation image display screen 132 on the display 28. The simulation image 128 or the like is displayed on the simulation image display screen 132.

The simulation image display screen 132 includes a first screen 132A and a second screen 132B. The CPU 62 generates the first screen 132A based on the simulation image set 126A and generates the second screen 132B based on the simulation image set 126B. In the example shown in FIG. 16, the upper half region in the simulation image display screen 132 is the first screen 132A, and the lower half region is the second screen 132B.

The CPU 62 controls the display 28 such that the simulation image 128A is displayed on the first screen 132A and the simulation image 128B is displayed on the second screen 132B with reference to the use model identifier 130. The displayed simulation images 128A and 128B may be one or a plurality. As a result, the simulation image 128A and the simulation image 128B are displayed on the display 28 in a distinguishable manner. The use model identifier 130 is an example of "data for displaying the fourth image and the sixth image on the first display in a distinguishable manner" according to the present disclosed technology.

The CPU 62 displays the message 132A1 on the display 28 in a state corresponding to the simulation image 128A based on the use model identifier 130A included in the simulation image set 126A. Further, the CPU 62 displays the message 132B1 on the display 28 in a state corresponding to the simulation image 128B based on the use model identifier 130B included in the simulation image set 126B. In the example shown in FIG. 16, the message 132A1 is associated with the simulation image 128A by displaying the message 132A1 on the first screen 132A, and the message 132B1 is associated with the simulation image 128B by displaying the message 132B1 on the second screen 132B.

The message 132A1 is a message that enables the specification of the first trained model 106, and the message 132B1 is a message that enables the specification of the second trained model 118. In the example shown in FIG. 16, the message "Simulation image obtained by the first trained model" is shown as an example of the message 132A1, and the message "Simulation image obtained by the second trained model" is shown as an example of the message 132B1.

The content of the message 132A1 illustrated in FIG. 16 is only an example, and the message 132A1 may be a message indicating that the simulation image 128A that is displayed on the first screen 132A is a simulation image generated by relying on the first trained model 106. Further, the content of the message 132B1 illustrated in FIG. 16 is only an example, and the message 132B1 may be a message indicating that the simulation image 128B that is displayed on the second screen 132B is a simulation image generated by relying on the second trained model 118.

The message 132A1 is an example of "first trained model specification information" according to the present disclosed technology, and the message 132B1 is an example of "second trained model specification information" according to the present disclosed technology. Further, the use model identifier 130 is an example of "data for displaying the fourth image and the first trained model specification information that enables the specification of the first trained model on the first display in a state where being associated with each other, and for displaying the sixth image and the second trained model specification information that enables the specification of the second trained model on the first display in a state of being associated with each other" according to the present disclosed technology.

Here, although the message 132A1 specifies that the simulation image 128A is an image that relies on the first trained model 106, and the message 132B1 specifies that the simulation image 128B is an image that relies on the second trained model 118, the present disclosed technology is not limited to this. For example, color that enables the specification of the simulation image generated by the first trained model 106 may be used for an outer frame of the simulation image 128A, and color that enables the specification of the simulation image generated by the second trained model 118 may be used for an outer frame of the simulation image 128B. Further, a mark or the like that enables the specification of the simulation image generated by the first trained model 106 may be displayed in a state of being associated with the simulation image 128A, and a mark or the like that enables the specification of the simulation image generated by the second trained model 118 may be displayed in a state of being associated with the simulation image 128B.

Figure 17:
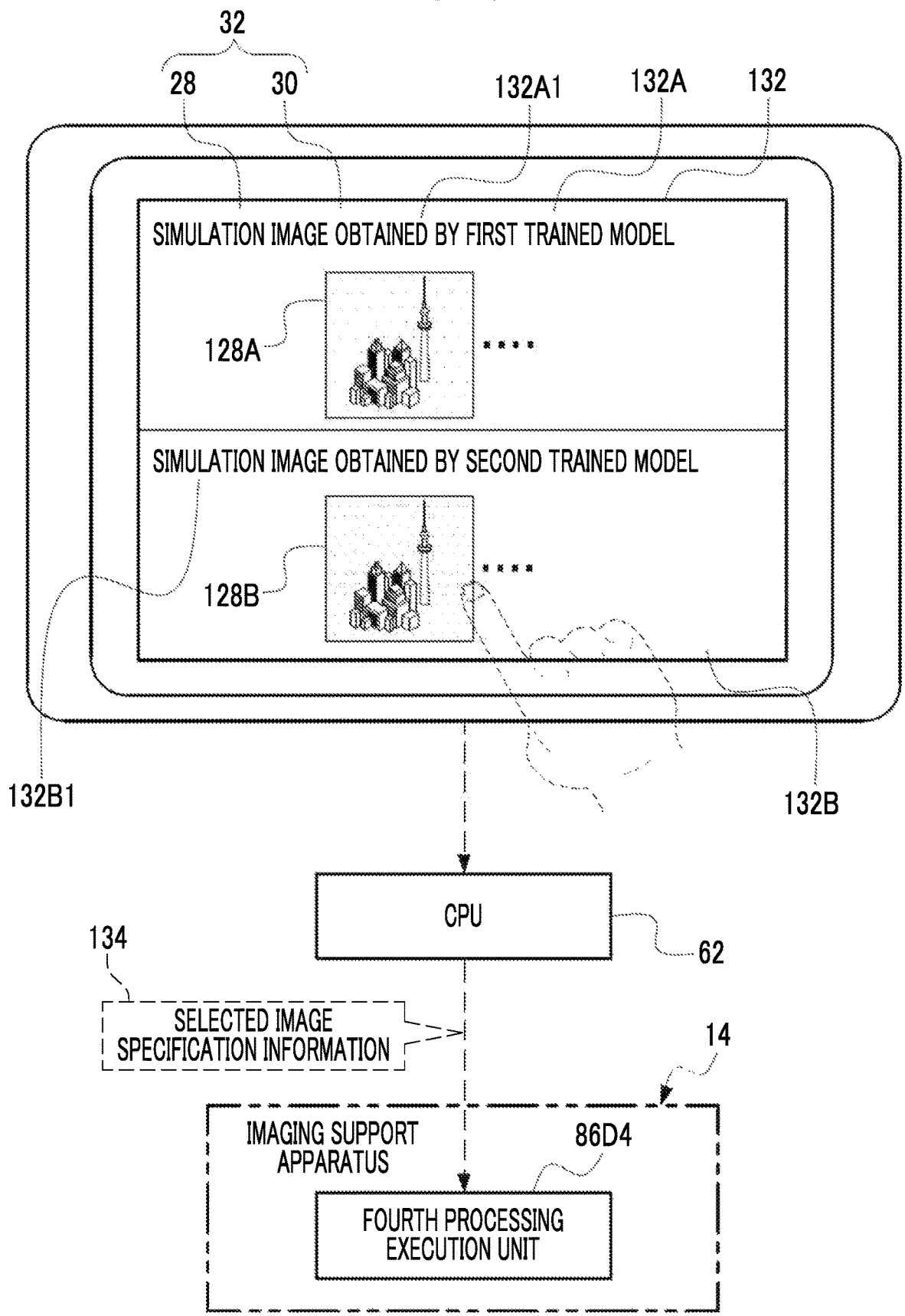
FIG. 17 is a conceptual diagram showing an example of an aspect in which a simulation image is selected from the simulation image display screen.

As an example shown in FIG. 17, in a state where the simulation image display screen 132 is displayed on the display 28, in a case where any of the simulation images 128 in the simulation image display screen 132 is selected by the user or the like via the touch panel 30, the CPU 62 transmits selected image specification information 134, which enables the specification of which simulation image 128 is selected, to the imaging support apparatus 14. The fourth processing execution unit 86D4 of the imaging support apparatus 14 receives the selected image specification information 134 transmitted from the imaging apparatus 12.

Figure 18:
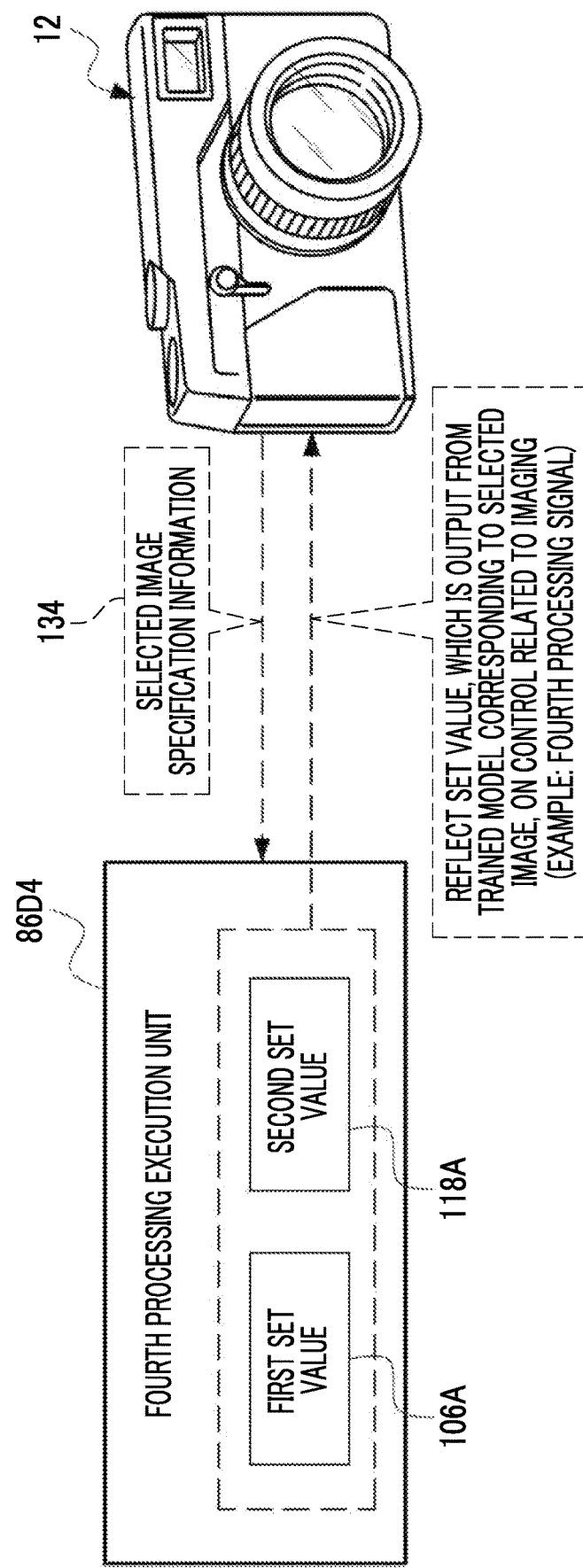
FIG. 18 is a conceptual diagram showing an example of the content of processing in a case where a set value, which is output from the trained model corresponding to a selected simulation image, is reflected on control related to imaging.

As an example shown in FIG. 18, the fourth processing execution unit 86D4 executes processing of reflecting the output of the first trained model 106 on the control related to the imaging in a case where the simulation image 128A is selected among the plurality of simulation images 128 displayed on the display 28 and executes processing of reflecting the output of the second trained model 118 on the control related to the imaging in a case where the simulation image 128B is selected, as one of the processing included in the fourth processing.

In this case, for example, the fourth processing execution unit 86D4 specifies which simulation image 128, among the plurality of simulation images 128, is selected by the user or the like with reference to the selected image specification information 134. The fourth processing execution unit 86D4 inputs the standard image 124A used for generating the specified simulation image 128, to the trained model used for generating the specified simulation image 128. The trained model used for generating the simulation image 128 is the first trained model 106 or the second trained model 118. The first trained model 106 outputs the first set value 106A in a case where the standard image 124A is input to the first trained model 106, and the second trained model 118 outputs the second set value 118A in a case where the standard image 124A is input to the second trained model 118.

The fourth processing execution unit 86D4 transmits a signal that includes the output set value to the imaging apparatus 12 as a fourth processing signal. The imaging apparatus 12 receives the fourth processing signal transmitted from the fourth processing execution unit 86D4 and performs the imaging by using the output set value included in the received fourth processing signal.

Figure 19:
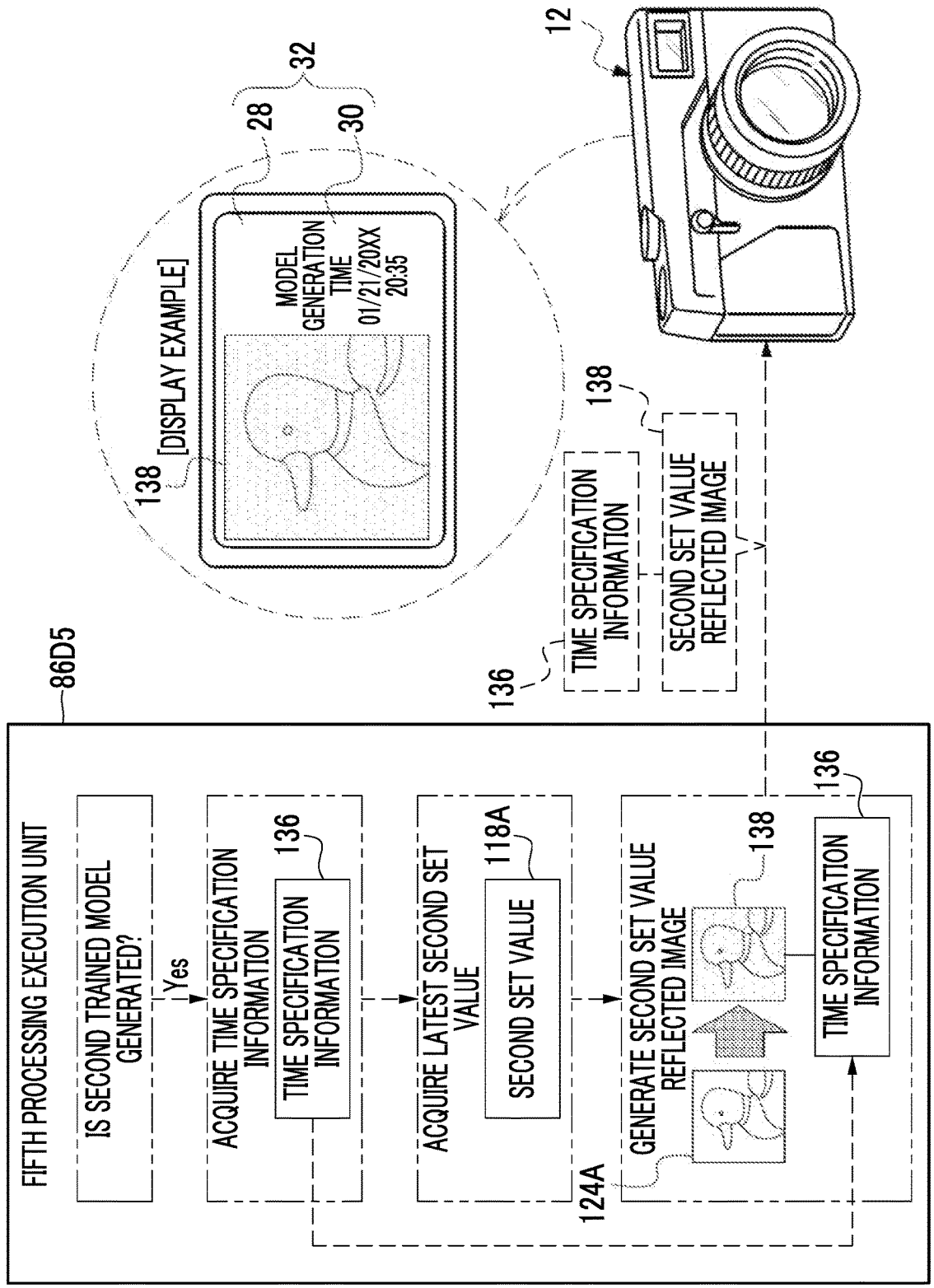
FIG. 19 is a conceptual diagram showing an example of the content of processing of a fifth processing execution unit.

As an example shown in FIG. 19, the fifth processing execution unit 86D5 executes processing of outputting data for displaying time specification information 136 that enables the specification of the time when the second trained model 118 is generated on the display 28, as the fifth processing. A plurality of time specification information 136 may be displayed on the display 28 without displaying images. For example, information on a plurality of dates specified by the plurality of time specification information 136 is listed and displayed on the display 28. The user may also be able to select the trained model to be used by selecting the displayed dates.

In this case, for example, the fifth processing execution unit 86D5 determines whether or not the second trained model 118 is generated by the model generation unit 86B (see FIG. 8). The fifth processing execution unit 86D5 acquires the time specification information 136 in a case where the second trained model 118 is generated by the model generation unit 86B. For example, the time specification information 136 is acquired from a clock (for example, a real-time clock). The fifth processing execution unit 86D5 acquires the latest second set value 118A. Examples of the latest second set value 118A include the second set value 118A used for calculating the degree of difference 125 in a case where the condition of "the degree of difference 125>=the second threshold value" is satisfied.

The fifth processing execution unit 86D5 generates the second set value reflected image 138. The second set value reflected image 138 is an image obtained by reflecting the output of the second trained model 118, that is, the latest second set value 118A on the standard image 124A. That is, the second set value reflected image 138 is generated based on the latest second set value 118A and the standard image 124A in the same manner as the simulation image 128 (FIG. 15) is generated by the fourth processing execution unit 86D4.

The fifth processing execution unit 86D5 associates the time specification information 136 with the second set value reflected image 138. Thereafter, the fifth processing execution unit 86D5 transmits the second set value reflected image 138 associated with the time specification information 136 to the imaging apparatus 12. The imaging apparatus 12 receives the second set value reflected image 138 associated with the time specification information 136. In the imaging apparatus 12, under the control of the CPU 62, the second set value reflected image 138 and the time (for example, the time when the second trained model 118 is generated) that is specified from the time specification information 136 are displayed side by side on the display 28.

The time specification information 136 and the second set value reflected image 138 are "second data" according to the present disclosed technology. Further, the time specification information 136 and the second set value reflected image 138 are an example of "data for displaying the time specification information on the second display in a state corresponding to the seventh image obtained in a case where the output of the second trained model is reflected" according to the present disclosed technology. Further, the second set value reflected image 138 is an example of the "seventh image" according to the present disclosed technology.

Figure 20:
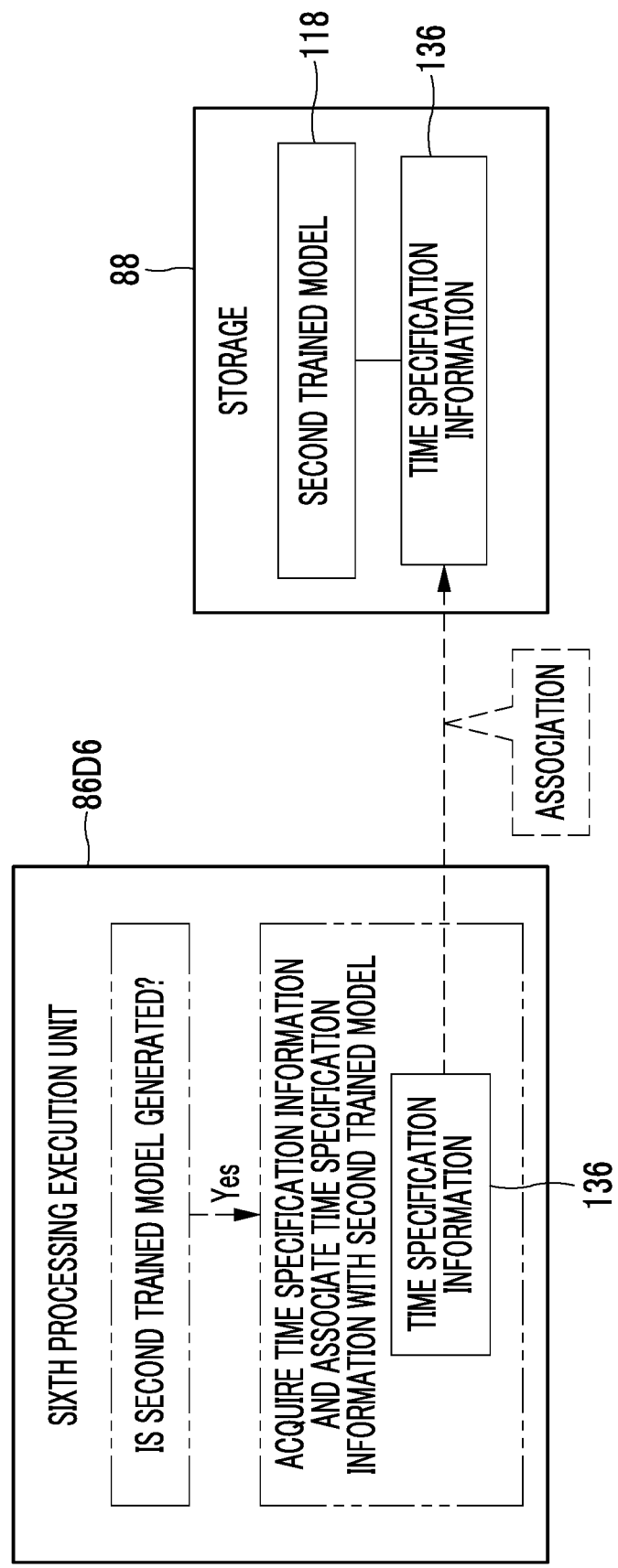
FIG. 20 is a conceptual diagram showing an example of the content of processing of a sixth processing execution unit.

As an example shown in FIG. 20, the sixth processing execution unit 86D6 executes processing of associating the time specification information 136 with the second trained model 118, as the sixth processing. In this case, for example, the sixth processing execution unit 86D6 acquires the time specification information 136 in a case where the second trained model 118 is generated by the model generation unit 86B. The sixth processing execution unit 86D6 stores the acquired time specification information 136 in the storage 88 in association with the second trained model 118 in the storage 88. In the example shown in FIG. 20, although the second trained model 118 and the time specification information 136 are stored in the storage 88 in a state of being associated with each other, the present disclosed technology is not limited to this, and the storage device 94 for backup may be used in a state in which the second trained model 118 and the time specification information 136 are associated with each other.

Further, the CPU 86 of the imaging support apparatus 14 may perform the learning processing on a replication trained model by treating the existing second trained model 118 (in the example shown in FIG. 20, the second trained model 118 that is stored in the storage 88) in the same manner as the first trained model 106 and by treating the replication trained model, which is a trained model that replicates the existing second trained model 118, in the same manner as the replication model 116.

In this case, the CPU 86 generates a third trained model by performing the learning processing on the replication trained model and associates the generated third trained model with the time specification information 136, similarly to the second trained model 118. Thereafter, the CPU 86 stores the third trained model and the time specification information 136 in the storage 88 in a state of being associated with each other. By repeating the same processing as the third trained model is generated by performing the learning processing on the second trained model 118, a plurality of operable trained models are accumulated in the storage 88 in a state of being associated with the time specification information 136. That is, in a case where N is a natural number of 3 or more, N or more trained models are accumulated in the storage 88 in a state of being associated with the time specification information 136. N or more trained models may be accumulated in the storage device 94 for backup in a state of being associated with the time specification information 136.

Figure 21:
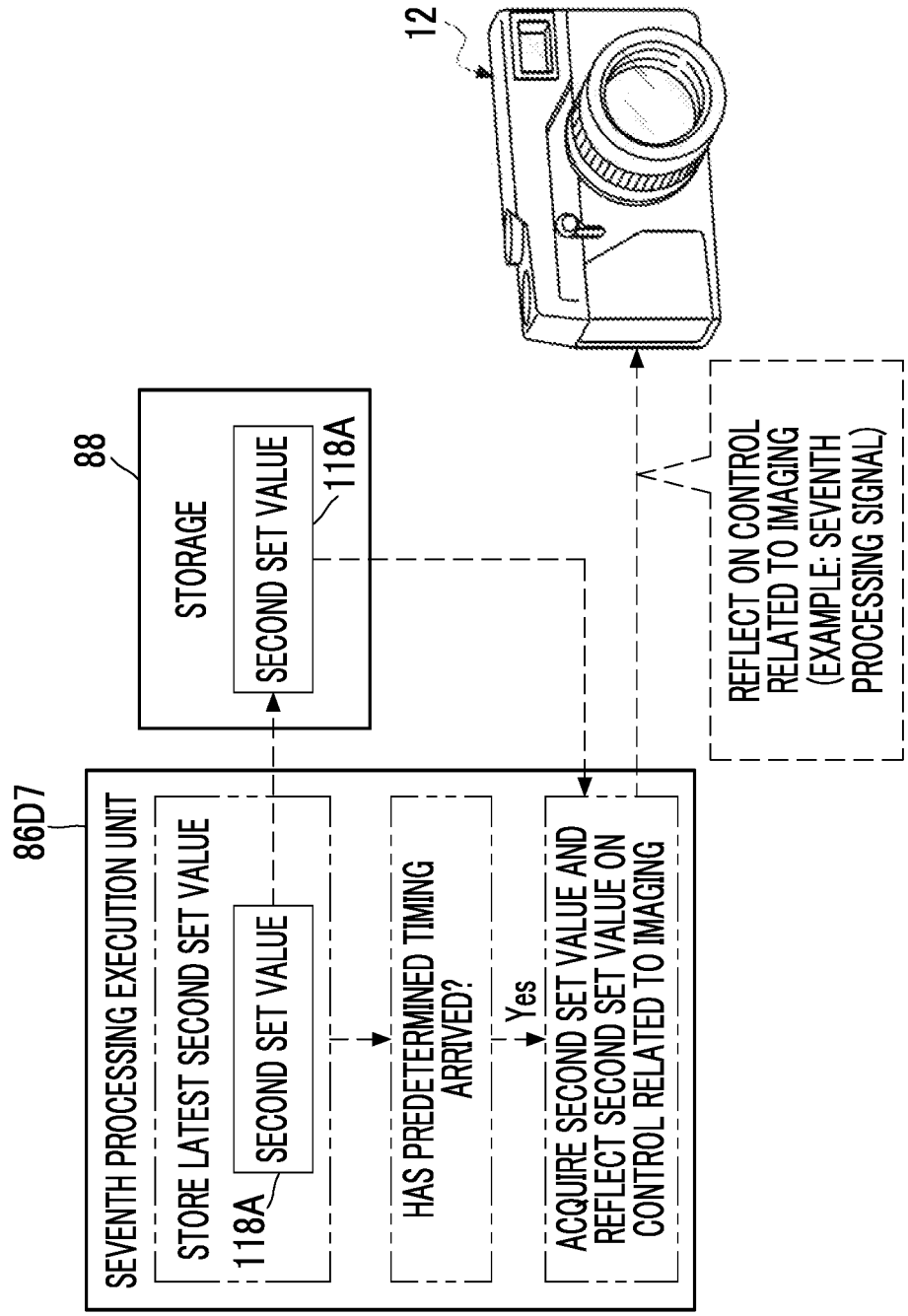
FIG. 21 is a conceptual diagram showing an example of the content of processing of a seventh processing execution unit.

As an example shown in FIG. 21, the seventh processing execution unit 86D7 executes processing of reflecting the output of the second trained model 118 on the control related to the imaging at a predetermined timing, as the seventh processing.

In this case, for example, the seventh processing execution unit 86D7 stores the latest second set value 118A, which is output from the second trained model 118, in the storage 88. Examples of the latest second set value 118A include the second set value 118A used in the latest verification. The seventh processing execution unit 86D7 determines whether or not the predetermined timing has arrived after the latest second set value 118A is stored in the storage 88. Examples of the predetermined timing include timing when the imaging apparatus 12 is activated, timing when the number of captured images 75, which are acquired by being captured by the imaging apparatus 12, (as an example, the number of captured images 75 acquired by being captured by the imaging apparatus 12 after the latest second set value 118A is stored in the storage 88) becomes equal to or greater than a sixth threshold value (for example, "10000"), timing when the operation mode of the imaging apparatus 12 transitions from the playback mode to the setting mode, and timing when rating (for example, evaluation by the user or the like for the image quality of the captured image 75) is performed on the captured images 75 in the playback mode.

The seventh processing execution unit 86D7 acquires the second set value 118A from the storage 88 in a case where the predetermined timing has arrived and reflects the acquired second set value 118A on the control related to the imaging. In this case, for example, the seventh processing execution unit 86D7 transmits a signal that includes the second set value 118A acquired from the storage 88 to the imaging apparatus 12 as a seventh processing signal. The imaging apparatus 12 receives the seventh processing signal transmitted from the seventh processing execution unit 86D7 and performs the imaging by using the second set value 118A included in the received seventh processing signal.

Figure 22:
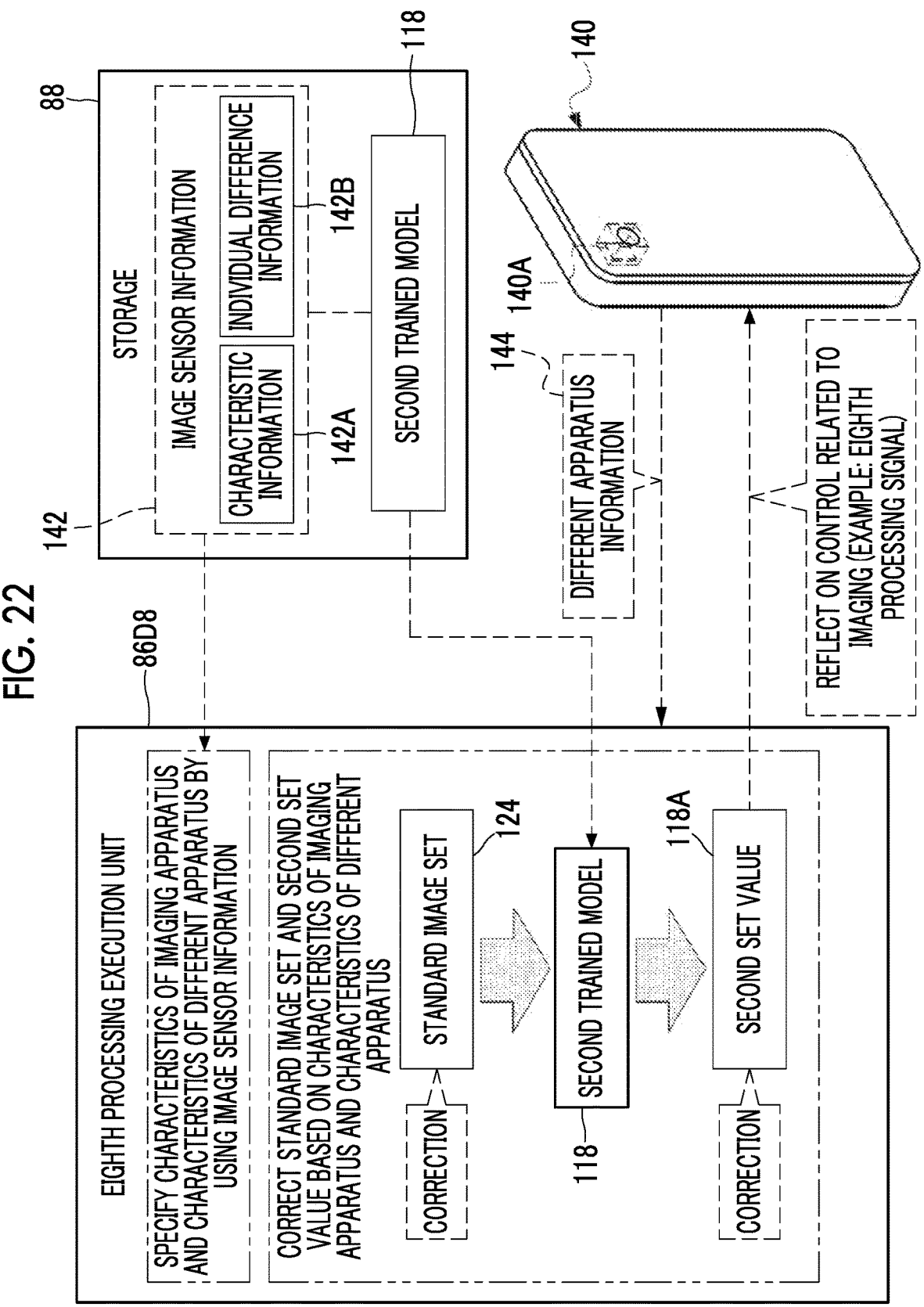
FIG. 22 is a conceptual diagram showing an example of the content of processing of an eighth processing execution unit.

As an example shown in FIG. 22, the eighth processing execution unit 86D8 executes processing of, in a case where the second trained model 118 is applied to a different apparatus 140 that is an imaging apparatus different from the imaging apparatus 12, correcting at least one of the data input to the second trained model 118 or the output from the second trained model 118, based on the characteristics of the imaging apparatus 12 and the characteristics of the different apparatus 140, as the eighth processing.

In the example shown in FIG. 22, the storage 88 stores the second trained model 118 and image sensor information 142. The image sensor information 142 is information related to a plurality of image sensors. The image sensor information 142 is appended to the second trained model 118 and has characteristic information 142A and individual difference information 142B.

The characteristic information 142A is information indicating the characteristics of each of the different image sensors involved in the second trained model 118. Examples of the different image sensor involved in the second trained model 118 include the image sensor 20 of the imaging apparatus 12 (that is, the imaging apparatus 12 in which the output of the second trained model 118 is reflected at a current timing) to which the second trained model 118 is applied at a current timing, and the image sensor mounted on a new target to which the second trained model 118 is applied. In the example shown in FIG. 22, the image sensor mounted on the new target to which the second trained model 118 is applied is an image sensor 140A mounted on the different apparatus 140.

The individual difference information 142B is information indicating individual differences between different image sensors involved in the second trained model 118. Examples of the individual difference include a difference between the sensitivity of each RGB pixel of one image sensor (for example, image sensor 20) and the sensitivity of each RGB pixel of the other image sensor (for example, an image sensor mounted on the different apparatus 140), a difference between the ISO sensitivity of one image sensor and the ISO sensitivity of the other image sensor, a difference between the speed of the electronic shutter of one image sensor and the speed of the electronic shutter of the other second image sensor, and/or the like.

The eighth processing execution unit 86D8 acquires, from the different apparatus 140, the different apparatus information 144 including the information that enables the specification of the image sensor 140A as the information indicating the characteristics of the different apparatus 140. The eighth processing execution unit 86D8 specifies the characteristics (for example, characteristics that can be specified from the image sensor information 142) of the imaging apparatus 12 and the characteristics (for example, characteristics that can be specified from the image sensor information 142) of the different apparatus 140 by using the different apparatus information 144 and the image sensor information 142. For example, the eighth processing execution unit 86D8 acquires at least one of the characteristic information 142A related to the image sensor 140A specified from the different apparatus information 144 or the individual difference information 142B related to the image sensor 140A specified from the different apparatus information 144, and specifies the characteristics of the imaging apparatus 12 and the characteristics of the different apparatus 140 by using at least one of the characteristic information 142A or the individual difference information 142B.

Since the second trained model 118 is a model obtained in a case where the learning processing is performed by using the plurality of captured images 75, which are acquired by being captured by the imaging apparatus 12, and the correction data 100, the characteristics of the imaging apparatus 12 is reflected in the second set value 118A in a case where the model is applied to the different apparatus 140 as it is. Therefore, the eighth processing execution unit 86D8 corrects the standard image set 124 used for inputting the second trained model 118 and the second set value 118A output from the second trained model 118 based on the characteristics of the imaging apparatus 12 and the characteristics of the different apparatus 140.

In this case, for example, the eighth processing execution unit 86D8 derives the content of the correction to be performed on the standard image set 124 and corrects the standard image set 124 according to the content of the derived correction by using a first table (not shown) or a first calculation expression (not shown) in which a difference between the characteristics of the imaging apparatus 12 and the characteristics of the different apparatus 140, and the content of the correction to be performed on the standard image set 124 are associated with each other.

The eighth processing execution unit 86D8 inputs the corrected standard image set 124 to the second trained model 118. The second trained model 118 outputs the second set value 118A in a case where the corrected standard image set 124 is input. The eighth processing execution unit 86D8 derives the content of the correction to be performed on the second set value 118A output from the second trained model 118 and corrects the second set value 118A according to the content of the derived correction by using a second table (not shown) or a second calculation expression (not shown) in which a difference between the characteristics of the imaging apparatus 12 and the characteristics of the different apparatus 140, and the content of the correction to be performed on the second set value 118A are associated with each other.

The eighth processing execution unit 86D8 reflects the corrected second set value 118A on the control related to the imaging. In this case, for example, the eighth processing execution unit 86D8 transmits a signal that includes the corrected second set value 118A to the imaging apparatus 12 as an eighth processing signal. The imaging apparatus 12 receives the eighth processing signal transmitted from the eighth processing execution unit 86D8 and performs the imaging by using the corrected second set value 118A included in the received eighth processing signal.

Here, although the correction is performed for both the standard image set 124 and the second set value 118A, the present disclosed technology is not limited to this, and the correction may be performed only on one of the standard image set 124 or the second set value 118A. Further, although an example of the embodiment in which the standard image set 124 is input to the second trained model 118 is provided here, the present disclosed technology is not limited to this, and at least one standard image 124A or at least one captured image 75 may be input to the second trained model 118. Further, in the same manner as the correction for the standard image set 124, the eighth processing execution unit 86D8 may correct the captured image 75, which is obtained by being captured by the imaging apparatus 12, based on the characteristics of the imaging apparatus 12 and the characteristics of the different apparatus 140. Further, here, although the information that includes both the characteristic information 142A and the individual difference information 142B is exemplified as the image sensor information 142, the present disclosed technology is not limited to this, and the image sensor information 142 may be information that includes only one of the characteristic information 142A or the individual difference information 142B.

Figure 23:
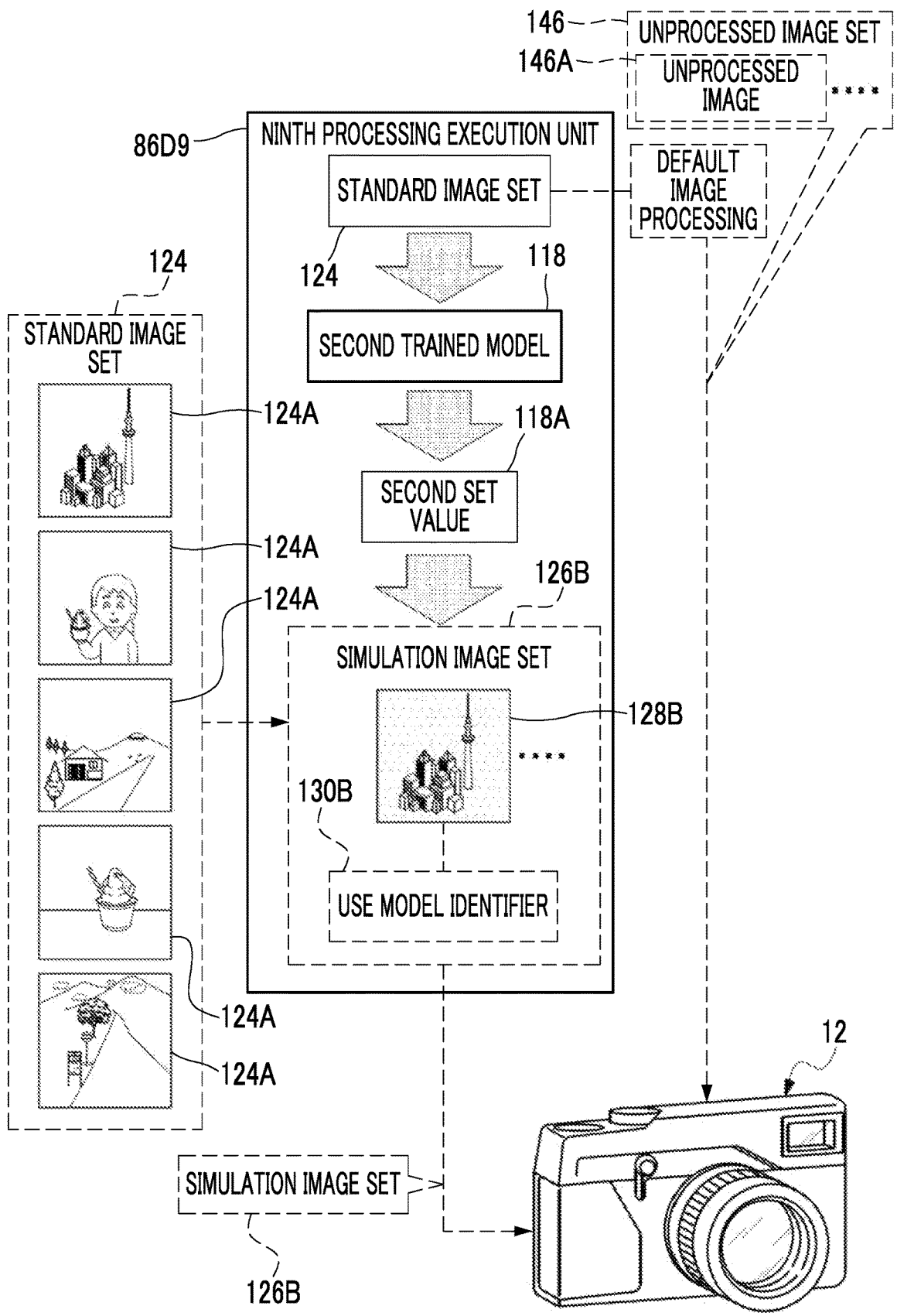
FIG. 23 is a conceptual diagram showing an example of the content of processing of a ninth processing execution unit.

As an example shown in FIG. 23, the ninth processing execution unit 86D9 executes processing of outputting the simulation image set 126B as data for displaying the above-mentioned simulation image 128B and an unprocessed image 146A on the display 28 (see FIG. 24), as the ninth processing. The unprocessed image 146A is an image (for example, an image corresponding to the standard image 124A included in the standard image set 124) obtained without applying the second set value 118A, which is output from the second trained model 118 by inputting the standard image 124A included in the standard image set 124 to the second trained model 118, to the standard image 124A. In other words, the unprocessed image 146A is an image obtained in a case where only the image processing that does not use the output result of the trained model is reflected.

In the example shown in FIG. 23, the standard image 124A is an example of an "eighth image" according to the present disclosed technology. Further, the second set value 118A is an example of a "third output result" according to the present disclosed technology. Further, the simulation image 128B is an example of a "first processed image" according to the present disclosed technology. Further, the unprocessed image 146A is an example of an "unprocessed image" according to the present disclosed technology. Further, the simulation image set 126 and an unprocessed image set 146 are examples of "third data" according to the present disclosed technology.

The ninth processing execution unit 86D9 generates the simulation image set 126B in the same manner as the processing performed by the fourth processing execution unit 86D4 shown in FIG. 15 and transmits the generated simulation image set 126B to the imaging apparatus 12. Further, the ninth processing execution unit 86D9 transmits the standard image set 124 used for the input to the second trained model 118 to the imaging apparatus 12 as the unprocessed image set 146. The imaging apparatus 12 receives the simulation image set 126B and the unprocessed image set 146 transmitted from the ninth processing execution unit 86D9.

Figure 24:
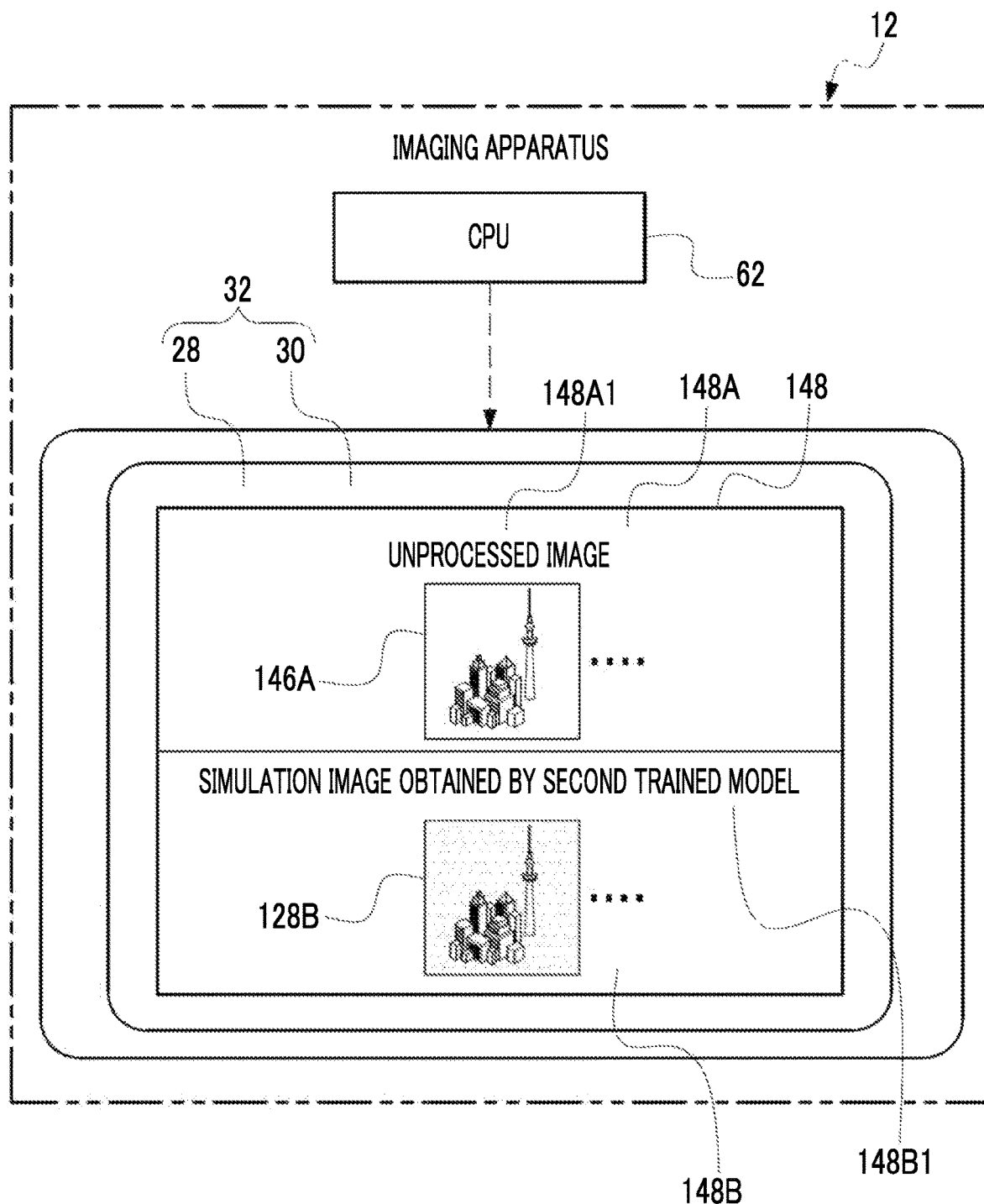
FIG. 24 is a screen view showing an example of an aspect of the simulation image display screen displayed on the display under the control of the CPU.

As an example shown in FIG. 24, the CPU 62 of the imaging apparatus 12 generates a simulation image display screen 148 based on the simulation image set 126B and the unprocessed image set 146, and displays the simulation image display screen 148 on the display 28. The simulation image 128B, the unprocessed image 146A, and the like are displayed on the simulation image display screen 148.

The simulation image display screen 148 includes a first screen 148A and a second screen 148B. The CPU 62 generates the first screen 148A based on the unprocessed image set 146 and generates the second screen 148B based on the simulation image set 126B. In the example shown in FIG. 24, the upper half region in the simulation image display screen 148 is the first screen 148A, and the lower half region is the second screen 148B.

The CPU 62 controls the display 28 such that the unprocessed image 146A is displayed on the first screen 148A and the simulation image 128B is displayed on the second screen 148B. As a result, the unprocessed image 146A and the simulation image 128B are displayed on the display 28 in a distinguishable manner.

The CPU 62 displays a message 148A1 on the display 28 in a state corresponding to the unprocessed image 146A. Further, the CPU 62 displays a message 148B1 on the display 28 in a state corresponding to the simulation image 128B. In the example shown in FIG. 24, the message 148A1 is associated with the unprocessed image 146A by displaying the message 148A1 on the first screen 148A, and the message 148B1 is associated with the simulation image 128B by displaying the message 148B1 on the second screen 148B.

The message 148A1 is a message that enables the specification of the unprocessed image 146A, and the message 148B1 is a message that enables the specification of the second trained model 118. In the example shown in FIG. 24, the message "Unprocessed image" is shown as an example of the message 148A1, and the message "Simulation image obtained by the second trained model" is shown as an example of the message 148B1.

The content of the message 148A1 illustrated in FIG. 24 is only an example, and the message 148A1 may be a message indicating that the unprocessed image 146A that is displayed on the first screen 148A is not an image generated by relying on the trained model. Further, the content of the message 148B1 illustrated in FIG. 24 is only an example, and the message 148B1 may be a message indicating that the simulation image 128B that is displayed on the second screen 148B is a simulation image generated by relying on the second trained model 118.

Here, although the message 148A1 specifies that the unprocessed image 146A is not an image that relies on the trained model, and the message 148B1 specifies that the simulation image 128B is an image that relies on the second trained model 118, the present disclosed technology is not limited to this. For example, color that enables the specification of the fact that the unprocessed image 146A is not an image generated by relying on the trained model may be used for an outer frame of the unprocessed image 146A, and color that enables the specification of the simulation image generated by the second trained model 118 may be used for an outer frame of the simulation image 128B. Further, a mark or the like that enables the specification of the fact that the unprocessed image 146A is not an image generated by relying on the trained model may be displayed in a state of being associated with the unprocessed image 146A, and a mark or the like that enables the specification of the simulation image generated by the second trained model 118 may be displayed in a state of being associated with the simulation image 128B.

In the examples shown in FIGS. 23 and 24, although an example of the embodiment in which the unprocessed image 146A is the standard image 124A, and the simulation image 128B is an image, which is generated based on the second set value 118A output from the second trained model 118 in a case where the standard image 124A is input to the second trained model 118, has been described, the present disclosed technology is not limited to this. For example, the captured image 75 may be used instead of the unprocessed image 146A, and an image generated based on the second set value 118A output from the second trained model 118 in a case where the captured image 75 is input to the second trained model 118 may be used instead of the simulation image 128B.

Figure 25:
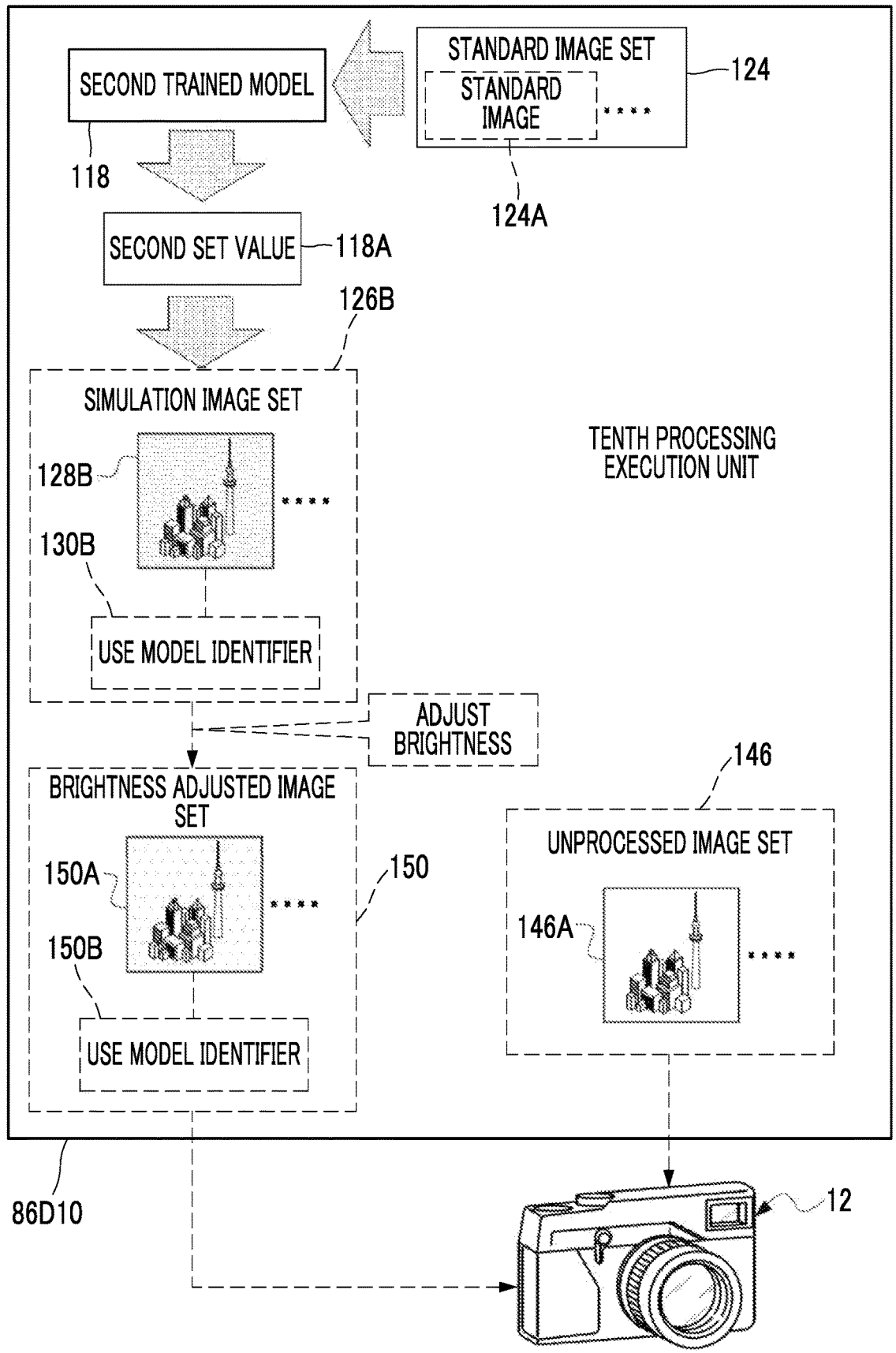
FIG. 25 is a conceptual diagram showing an example of the content of processing of a tenth processing execution unit.

As an example shown in FIG. 25, the tenth processing execution unit 86D10 executes processing of outputting data for displaying the above-mentioned unprocessed image 146A and a brightness adjusted image 150A obtained by adjusting the brightness of the simulation image 128B based on the second set value 118A output from the second trained model 118 on the display 28 (see FIG. 26), as the tenth processing.

In the example shown in FIG. 25, the unprocessed image 146A is an example of a "ninth image" according to the present disclosed technology. Further, the second set value 118A is an example of a "fourth output result" according to the present disclosed technology. Further, the brightness adjusted image 150A is an example of a "second processed image" according to the present disclosed technology. Further, the unprocessed image 146A and a brightness adjusted image set 150 are examples of "fourth data" according to the present disclosed technology.

The tenth processing execution unit 86D10 generates the simulation image set 126B based on the second set value 118A and further generates the brightness adjusted image set 150 in which the brightness of the simulation image 128B is adjusted based on the second set value 118A in the same manner as the processing performed by the fourth processing execution unit 86D4 shown in FIG. 15. The brightness adjusted image set 150 includes a brightness adjusted image 150A and a use model identifier 150B. The tenth processing execution unit 86D10 generates the brightness adjusted image 150A by adjusting the brightness of the simulation image 128B included in the simulation image set 126B. The tenth processing execution unit 86D10 associates the use model identifier 150B with the brightness adjusted image 150A. The use model identifier 150B is an identifier corresponding to the use model identifier 130B associated with the simulation image 128B before the brightness is adjusted (for example, an identifier obtained by replicating the use model identifier 130B).

The tenth processing execution unit 86D10 transmits the unprocessed image 146A and the brightness adjusted image set 150 to the imaging apparatus 12. The imaging apparatus 12 receives the unprocessed image 146A and the brightness adjusted image set 150 transmitted from the tenth processing execution unit 86D10.

Figure 26:
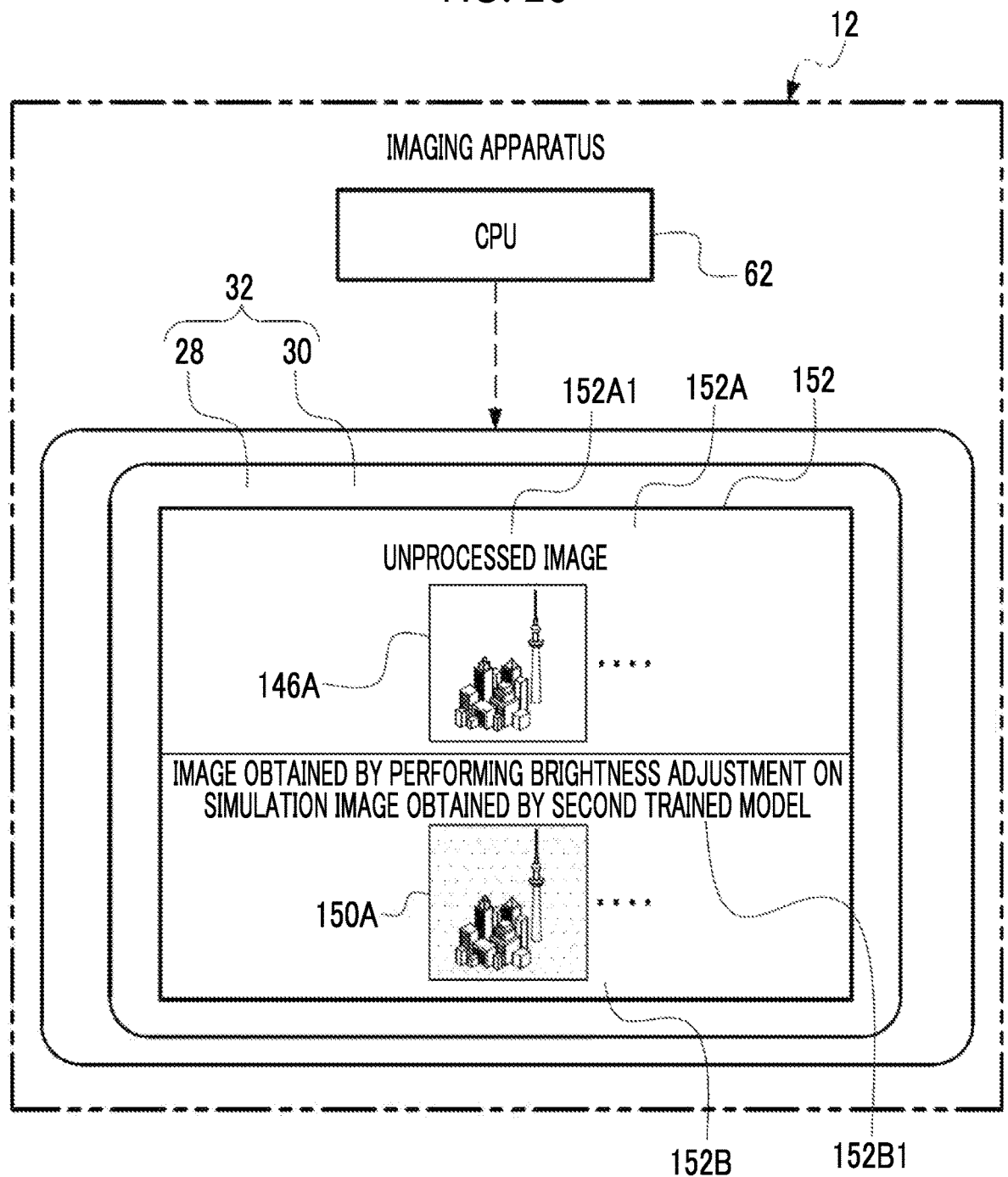
FIG. 26 is a screen view showing an example of an aspect of the simulation image display screen displayed on the display under the control of the CPU.

As an example shown in FIG. 26, the CPU 62 of the imaging apparatus 12 generates a simulation image display screen 152 based on the unprocessed image 146A and the brightness adjusted image set 150, and displays the simulation image display screen 152 on the display 28. The unprocessed image 146A, the brightness adjusted image 150A, and the like are displayed on the simulation image display screen 152.

The simulation image display screen 152 includes a first screen 152A and a second screen 152B. The CPU 62 generates the first screen 152A based on the unprocessed image 146A and generates the second screen 152B based on the brightness adjusted image set 150. In the example shown in FIG. 26, the upper half region in the simulation image display screen 152 is the first screen 152A, and the lower half region is the second screen 152B.

The CPU 62 controls the display 28 such that the unprocessed image 146A is displayed on the first screen 152A and the brightness adjusted image 150A is displayed on the second screen 152B. As a result, the unprocessed image 146A and the brightness adjusted image 150A are displayed on the display 28 in a distinguishable manner.

The CPU 62 displays a message 152A1 on the display 28 in a state corresponding to the unprocessed image 146A. Further, the CPU 62 displays the message 152B1 on the display 28 in a state corresponding to the brightness adjusted image 150A. In the example shown in FIG. 26, the message 152A1 is associated with the unprocessed image 146A by displaying the message 152A1 on the first screen 152A, and the message 152B1 is associated with the brightness adjusted image 150A by displaying the message 152B1 on the second screen 152B.

The message 152A1 is a message that enables the specification of the unprocessed image 146A, and the message 152B1 is a message that enables the specification of the fact that the brightness adjustment is performed on the simulation image 128B. In the example shown in FIG. 26, the message "Unprocessed image" is shown as an example of the message 152A1, and the message "Image obtained by performing the brightness adjustment on the simulation image obtained by the second trained model" is shown as an example of the message 152B1.

The content of the message 152A1 illustrated in FIG. 26 is only an example, and the message 152A1 may be a message indicating that the unprocessed image 146A that is displayed on the first screen 152A is an image obtained in a case where the processing that relies on the trained model is not performed. Further, the content of the message 152B1 illustrated in FIG. 26 is only an example, and the message 152B1 may be a message that enables the specification of the fact that the brightness adjusted image 150A that is displayed on the second screen 152B is an image obtained in a case where the brightness adjustment is performed based on the output of the second trained model 118.

Here, although the message 152A1 specifies that the unprocessed image 146A is an image that does not rely on the second trained model 118, and the message 152B1 specifies that the brightness adjusted image 150A is an image obtained in a case where the brightness adjustment is performed based on the output of the second trained model 118 with respect to the simulation image 128B, the present disclosed technology is not limited to this. For example, color that enables the specification of the fact that the unprocessed image 146A is an image that does not rely on the second trained model 118 may be used for an outer frame of the unprocessed image 146A, and color that enables the specification of the fact that the brightness adjusted image 150A is an image obtained in a case where the brightness adjustment is performed based on the output of the second trained model 118 may be used for an outer frame of the brightness adjusted image 150A.

Further, a mark or the like that enables the specification of the fact that the unprocessed image 146A is an image that does not rely on the second trained model 118 may be displayed in a state of being associated with the unprocessed image 146A, and a mark or the like that enables the specification of the fact that the brightness adjusted image 150A is an image obtained in a case where the brightness adjustment is performed based on the output of the second trained model 118 may be displayed in a state of being associated with the brightness adjusted image 150A.

In the examples shown in FIGS. 25 and 26, although an example of the embodiment in which the brightness adjusted image 150A is an image generated based on the second set value 118A output from the second trained model 118 in a case where the standard image 124A is input to the second trained model 118 has been described, the present disclosed technology is not limited to this. For example, an image generated based on the second set value 118A output from the second trained model 118 in a case where the captured image 75 is input to the second trained model 118 may be used instead of the standard image 124A.

Figure 27:
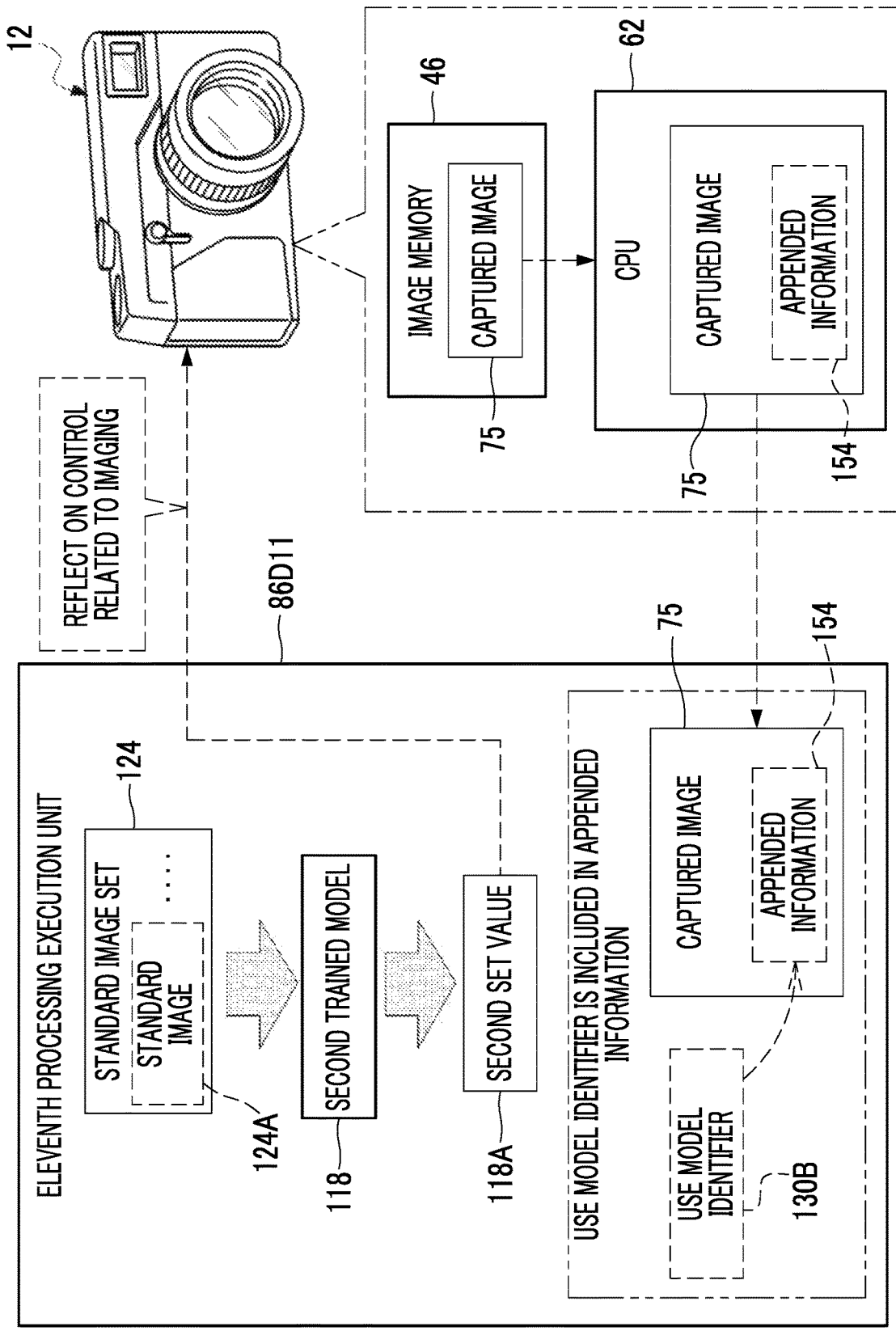
FIG. 27 is a conceptual diagram showing an example of the content of processing of an eleventh processing execution unit.

As an example shown in FIG. 27, the eleventh processing execution unit 86D11 inputs the standard image 124A included in the standard image set 124 to the second trained model 118. The second trained model 118 outputs the second set value 118A in a case where the standard image 124A is input.

The eleventh processing execution unit 86D11 reflects the second set value 118A on the control related to the imaging in the same manner as the processing performed by the first processing execution unit 86D1 shown in FIG. 12, the processing performed by the third processing execution unit 86D3 shown in FIG. 14, the processing performed by the seventh processing execution unit 86D7 shown in FIG. 21, and the processing performed by the eighth processing execution unit 86D8 shown in FIG. 22. As described above, the captured image 75, which is acquired by being captured by the imaging apparatus 12 in a state where the second set value 118A is reflected on the control related to the imaging, is stored in the image memory 46. In the example shown in FIG. 27, the captured image 75 stored in the image memory 46 is an example of a "third processed image" according to the present disclosed technology.

The CPU 62 of the imaging apparatus 12 acquires the captured image 75 from the image memory 46 and adds appended information 154, which is appended to the captured image 75, to the acquired captured image 75. The appended information 154 includes, for example, the second set value 118A used in the imaging to obtain the captured image 75, the information indicating the characteristics of the imaging apparatus 12, the imaging condition, the imaging date and time, and the like. Examples of the appended information 154 include Exif information. In the example shown in FIG. 27, the appended information 154 is an example of "first appended information" according to the present disclosed technology.

The CPU 62 of the imaging apparatus 12 transmits the captured image 75 to which the appended information 154 is added to the eleventh processing execution unit 86D11. The eleventh processing execution unit 86D11 receives the captured image 75 transmitted from the CPU 62 of the imaging apparatus 12. The eleventh processing execution unit 86D11 executes processing of including the above-mentioned use model identifier 130B in the appended information 154 added to the received captured image 75, as the eleventh processing.

In the example shown in FIG. 27, although an example of the embodiment in which the standard image 124A is input to the second trained model 118 has been described, this is only an example, and the captured image 75 may be input to the second trained model 118.

Figure 28:
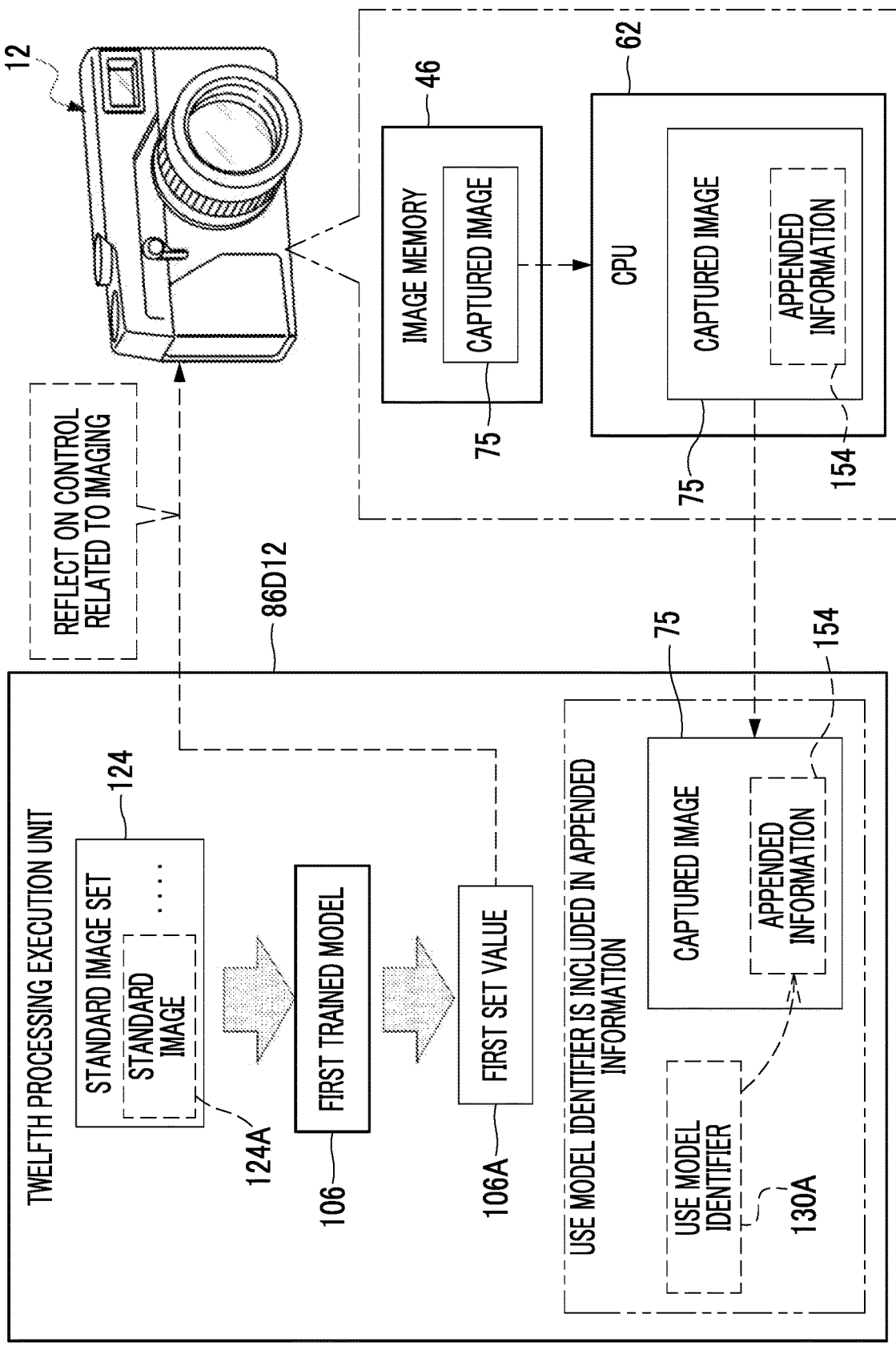
FIG. 28 is a conceptual diagram showing an example of the content of processing of a twelfth processing execution unit.

As an example shown in FIG. 28, the twelfth processing execution unit 86D12 inputs the standard image 124A included in the standard image set 124 to the first trained model 106. The first trained model 106 outputs the first set value 106A in a case where the standard image 124A is input.

The twelfth processing execution unit 86D12 reflects the first set value 106A on the control related to the imaging in the same manner as the processing performed by the first processing execution unit 86D1 shown in FIG. 12, the processing performed by the third processing execution unit 86D3 shown in FIG. 14, the processing performed by the seventh processing execution unit 86D7 shown in FIG. 21, the processing performed by the eighth processing execution unit 86D8 shown in FIG. 22, and the processing performed by the eleventh processing execution unit 86D11 shown in FIG. 27. As described above, the captured image 75, which is acquired by being captured by the imaging apparatus 12 in a state where the first set value 106A is reflected on the control related to the imaging, is stored in the image memory 46. In the example shown in FIG. 28, the captured image 75 stored in the image memory 46 is an example of a "fourth processed image" according to the present disclosed technology.

The CPU 62 of the imaging apparatus 12 acquires the captured image 75 from the image memory 46 and adds appended information 154, which is appended to the captured image 75, to the acquired captured image 75. The appended information 154 includes, for example, the first set value 106A used in the imaging to obtain the captured image 75, the information indicating the characteristics of the imaging apparatus 12, the imaging condition, the imaging date and time, and the like. Examples of the appended information 154 include Exif information. In the example shown in FIG. 28, the appended information 154 is an example of "second appended information" according to the present disclosed technology.

The CPU 62 of the imaging apparatus 12 transmits the captured image 75 to which the appended information 154 is added to the twelfth processing execution unit 86D12. The twelfth processing execution unit 86D12 receives the captured image 75 transmitted from the CPU 62 of the imaging apparatus 12. The twelfth processing execution unit 86D12 executes processing of including the above-mentioned use model identifier 130A in the appended information 154 added to the received captured image 75, as the twelfth processing.

Next, the operation of the imaging system 10 will be described with reference to FIGS. 29A and 29B.

Figure 29A:
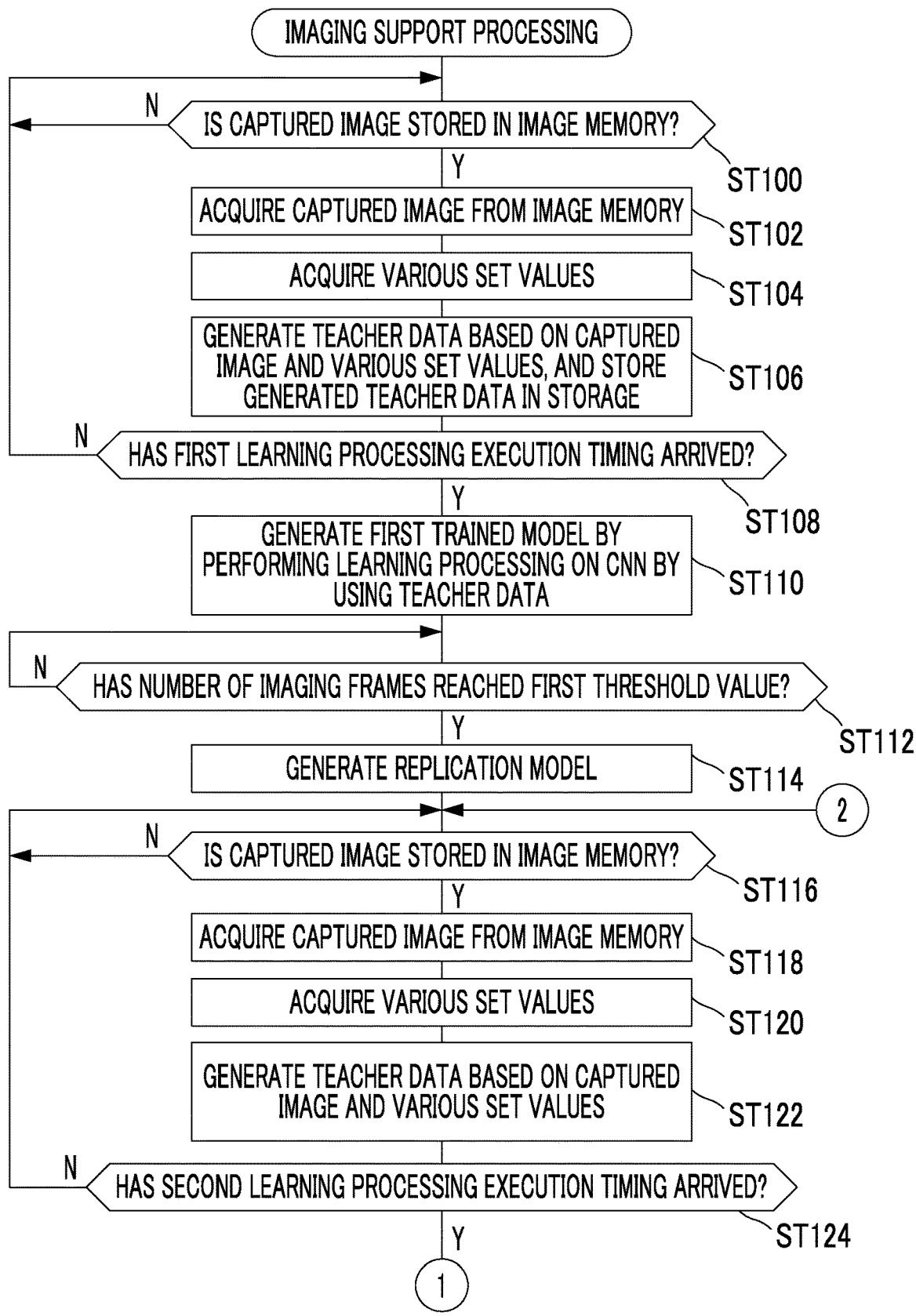
FIG. 29A is a flowchart showing an example of a flow of imaging support processing.
Figure 29B:
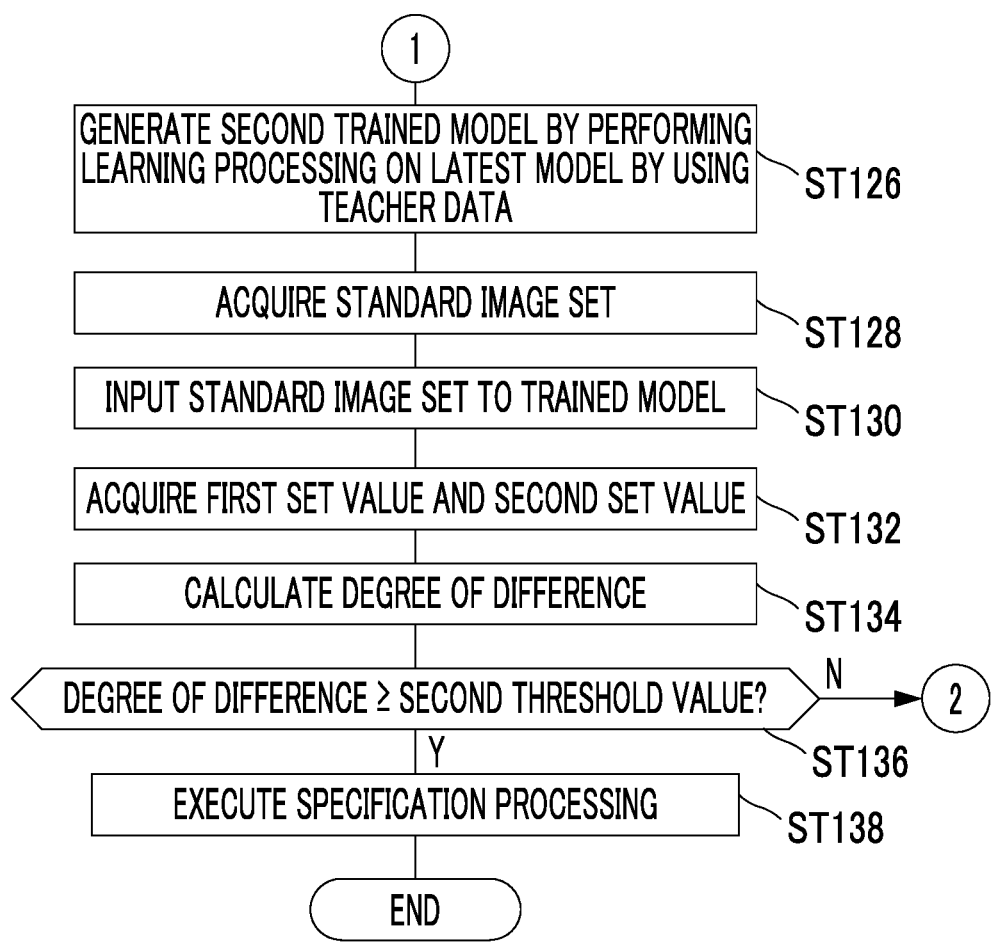
FIG. 29B is a continuation of the flowchart shown in FIG. 29A.

FIGS. 29A and 29B show an example of a flow of the imaging support processing performed by the CPU 86 of the imaging support apparatus 14. The flow of the imaging support processing shown in FIGS. 29A and 29B is an example of an "imaging support method" according to the present disclosed technology.

In the imaging support processing shown in FIG. 29A, first, in step ST100, the teacher data generation unit 86A determines whether or not the captured image 75 is stored in the image memory 46 of the imaging apparatus 12. In step ST100, in a case where the captured image 75 is not stored in the image memory 46 of the imaging apparatus 12, the determination is set as negative, and the determination in step ST100 is performed again. In step ST100, in a case where the captured image 75 is stored in the image memory 46 of the imaging apparatus 12, the determination is set as positive, and the imaging support processing shifts to step ST102.

In step ST102, the teacher data generation unit 86A acquires the captured image 75 from the image memory 46. After the processing in step ST102 is executed, the imaging support processing shifts to step ST104.

In step ST104, the teacher data generation unit 86A acquires various set values 102 from the NVM 64 of the imaging apparatus 12. After the processing in step ST104 is executed, the imaging support processing shifts to step ST106.

In step ST106, the teacher data generation unit 86A generates teacher data 98 based on the captured image 75 acquired in step ST102 and various set values 102 acquired in step ST104, and stores the generated teacher data 98 in the storage 88. After the processing in step ST106 is executed, the imaging support processing shifts to step ST108.

In step ST108, the determination unit 86C determines whether or not a first learning processing execution timing, which is the timing for executing the learning processing for the CNN 104, has arrived. Examples of the first learning processing execution timing include the timing when the number of imaging frames reaches the first threshold value (for example, "10000").

In step ST108, in a case where the first learning processing execution timing has not arrived, the determination is set as negative, and the imaging support processing shifts to step ST100. In a case where the first learning processing execution timing has arrived in step ST108, the determination is set as positive, and the imaging support processing shifts to step ST110.

In step ST110, the model generation unit 86B generates the first trained model 106 by performing the learning processing on the CNN 104 by using the teacher data 98 stored in the storage 88. After the processing in step ST110 is executed, the imaging support processing shifts to step ST112.

In step ST112, the determination unit 86C determines whether or not the number of imaging frames has reached the first threshold value. In step ST112, in a case where the number of imaging frames has not reached the first threshold value, the determination is set as negative, and the determination in step ST112 is performed again. In step ST112, in a case where the number of imaging frames has reached the first threshold value, the determination is set as positive, and the imaging support processing shifts to step ST114.

In step ST114, the model generation unit 86B generates the replication model 116 from the first trained model 106 generated in step ST110. After the processing in step ST114 is executed, the imaging support processing shifts to step ST116.

In step ST116, the teacher data generation unit 86A determines whether or not the captured image 75 is stored in the image memory 46 of the imaging apparatus 12. In step ST116, in a case where the captured image 75 is not stored in the image memory 46 of the imaging apparatus 12, the determination is set as negative, and the determination in step ST116 is performed again. In step ST116, in a case where the captured image 75 is stored in the image memory 46 of the imaging apparatus 12, the determination is set as positive, and the imaging support processing shifts to step ST118.

In step ST118, the teacher data generation unit 86A acquires the captured image 75 from the image memory 46. After the processing in step ST118 is executed, the imaging support processing shifts to step ST120.

In step ST120, the teacher data generation unit 86A acquires various set values 102 from the NVM 64 of the imaging apparatus 12. After the processing in step ST120 is executed, the imaging support processing shifts to step ST122.

In step ST122, the teacher data generation unit 86A generates teacher data 98 based on the captured image 75 acquired in step ST118 and various set values 102 acquired in step ST120, and stores the generated teacher data 98 in the storage 88. After the processing in step ST122 is executed, the imaging support processing shifts to step ST124.

In step ST124, the determination unit 86C determines whether or not a second learning processing execution timing, which is a timing for executing the learning processing for the replication model 116 generated in step ST114, has arrived. Examples of the second learning processing execution timing include the timing when the number of imaging frames reaches the first threshold value (for example, "1000").

In step ST124, in a case where the second learning processing execution timing has not arrived, the determination is set as negative, and the imaging support processing shifts to step ST116. In step ST124, in a case where the second learning processing execution timing has arrived, the determination is set as positive, and the imaging support processing shifts to step ST126 shown in FIG. 29B.

In step ST126 shown in FIG. 29B, by using the teacher data 98 (as an example, the teacher data 98 obtained by repeating the processing in steps ST116 to ST124) stored in the storage 88, the model generation unit 86B generates the second trained model 118 by performing the learning processing on the latest model (for example, the replication model 116 in a case where the first positive determination is made in step ST124, and the existing second trained model 118 in a case where the second and subsequent positive determination are made in step ST124, (that is, the latest trained model 118)). After the processing in step ST126 is executed, the imaging support processing shifts to step ST128.

In step ST128, the execution unit 86D acquires the standard image set 124 from the storage 88. After the processing in step ST128 is executed, the imaging support processing shifts to step ST130.

In step ST130, the execution unit 86D inputs the standard image set 124 acquired in step ST128 to the first trained model 106 and the second trained model 118. After the processing in step ST130 is executed, the imaging support processing shifts to step ST132.

In step ST132, the execution unit 86D acquires the first set value 106A output from the first trained model 106 and the second set value 118A output from the second trained model 118. After the processing in step ST132 is executed, the imaging support processing shifts to step ST134.

In step ST134, the execution unit 86D calculates the degree of difference 125 between the first set value 106A and the second set value 118A acquired in step ST132. After the processing in step ST134 is executed, the imaging support processing shifts to step ST136.

In step ST136, the execution unit 86D determines whether or not the degree of difference 125, which is calculated in step ST134, is equal to or greater than the second threshold value. In step ST136, in a case where the degree of difference 125, which is calculated in step ST134, is less than the second threshold value, the determination is set as negative, and the imaging support processing shifts to step ST116 shown in FIG. 29A. In step ST136, in a case where the degree of difference 125, which is calculated in step ST134, is equal to or greater than the second threshold value, the determination is set as positive, and the imaging support processing shifts to step ST138.

In step ST138, the execution unit 86D executes the specific processing. After the processing in step ST138 is executed, the imaging support processing is ended.

As described above, in the imaging support apparatus 14, the first trained model 106 is stored in the storage 88, and the first trained model 106 is used for the control related to the imaging. Further, in the imaging support apparatus 14, the various set values 102, which are applied to the imaging apparatus 12 in a case where the captured image 75 is acquired, are defined as the correction data 100, and the learning processing, in which the captured image 75 and the correction data 100 are used as the teacher data 98, is performed on the learning model, thereby the second trained model 118 that is used for the control related to the imaging is generated. Thereafter, the specific processing is performed based on the first set value 106A output from the first trained model 106 in a case where the standard image set 124 is input to the first trained model 106 and the second set value 118A output from the second trained model 118 in a case where the standard image set 124 is input to the second trained model 118. Therefore, the present configuration can contribute to reducing the load on the CPU 86 and/or the user as compared with the case where only the processing irrelevant to the degree of difference between the first trained model 106 and the second trained model 118 is performed.

In the imaging support apparatus 14, the standard image set 124 is stored in the storage 88. Therefore, according to the present configuration, the processing of inputting the standard image set 124 to the first trained model 106 and the second trained model 118 can be easily implemented as compared with the case where the image that is input to the first trained model 106 and the second trained model 118 is not stored in the memory such as the storage 88.

In the imaging support apparatus 14, the second trained model 118 is generated by performing the learning processing in a case where the condition that the number of imaging frames reaches the first threshold value is satisfied. Therefore, according to the present configuration, the load on the learning processing can be reduced as compared with the case where the learning processing is constantly performed.

In the imaging support apparatus 14, the plurality of captured images 75 acquired by being captured by the imaging apparatus 12 during the period from the time (for example, the time when the replication model 116 is generated) when the latest learning model to be the target of the learning processing is obtained to the time when the condition that the number of imaging frames reaches the first threshold value is satisfied, and the various set values, which are related to the plurality of captured images 75 and applied to the imaging apparatus 12, are used as the teacher data 98. Therefore, according to the present configuration, the load on the CPU 86 required for the learning processing can be reduced as compared with the case where the learning processing, in which the single captured image 75 and the single set value are used as the teacher data, is performed each time the imaging is performed.

In the imaging support apparatus 14, the specific processing is performed in a case where the condition that the number of imaging frames reaches the first threshold value is satisfied. Therefore, according to the present configuration, the load on the CPU 86 can be reduced as compared with the case where the specific processing is constantly performed.

In the imaging support apparatus 14, the specific processing is performed in a case where the degree of difference 125 between the first set value 106A and the second set value 118A is equal to or greater than the second threshold value. Therefore, according to the present configuration, the load on the CPU 86 can be reduced as compared with the case where the specific processing is constantly performed regardless of the degree of difference 125 between the first set value 106A and the second set value 118A.

In the imaging support apparatus 14, as the first processing included in the specific processing, processing of reflecting the second set value 118A on the control related to the imaging is performed. Therefore, according to the present configuration, the control related to the imaging can be made closer to the control intended by the user or the like, as compared with the case where only the first trained model 106 is constantly used for the control related to the imaging.

In the imaging support apparatus 14, as the second processing included in the specific processing, processing of storing the second trained model 118 in the storage device 94 for backup is performed. Therefore, according to the present configuration, the same second trained model 118 can be used repeatedly.

In the imaging support apparatus 14, as the third processing included in the specific processing, processing of reflecting the output of the trained model, among the first trained model 106 and the second trained model 118, selected according to the received instruction by the third processing execution unit 86D3 on the control related to the imaging. Therefore, according to the present configuration, the output from the trained model, among the first trained model 106 and the second trained model 118, corresponding to the preference of the user or the like can be reflected on the control related to the imaging.

In the imaging support apparatus 14, as the fourth processing included in the specific processing, data for displaying the simulation image 128A, which corresponds to an image obtained by applying the first set value 106A output from the first trained model 106 by inputting the standard image set 124 to the first trained model 106 to the standard image set 124, and a simulation image 128B, which is obtained by applying the second set value 118A output from the second trained model 118 by inputting the standard image set 124 to the second trained model 118 to the standard image set 124, on the display 28 is transmitted to the imaging apparatus 12. Therefore, according to the present configuration, it is possible for the user or the like to visually recognize a difference between the output of the first trained model 106 and the output of the second trained model 118.

In the imaging support apparatus 14, the simulation image 128A, which corresponds to an image obtained by applying the first set value 106A output from the first trained model 106 by inputting the standard image set 124 to the first trained model 106 to the standard image set 124, and a simulation image 128B, which is obtained by applying the second set value 118A output from the second trained model 118 by inputting the standard image set 124 to the second trained model 118 to the standard image set 124, are displayed on the display 28 in a distinguishable manner. Therefore, according to the present configuration, the user or the like can easily perceive a difference between the simulation image 128A and the simulation image 128B as compared with the case where the simulation image 128A and the simulation image 128B are displayed on the display 28 in an indistinguishable state.

In the imaging support apparatus 14, the simulation image 128A and the message 132A1 are displayed on the first screen 132A in a state of being associated with each other, and the simulation image 128B and the message 132B1 are displayed on the second screen 132B in a state of being associated with each other. Therefore, according to the present configuration, the user or the like can easily perceive that the simulation image 128A is an image obtained by using the first trained model 106, and the simulation image 128B is an image obtained by using the second trained model 118.

In the imaging support apparatus 14, as the fourth processing included in the specific processing, data for displaying the simulation image 128A, which corresponds to an image obtained by applying the first set value 106A output from the first trained model 106 by inputting the standard image set 124 to the first trained model 106 to the standard image set 124, and a simulation image 128B, which is obtained by applying the second set value 118A output from the second trained model 118 by inputting the standard image set 124 to the second trained model 118 to the standard image set 124, on the display 28 is transmitted to the imaging apparatus 12. Therefore, according to the present configuration, the output of the trained model, among the first trained model 106 and the second trained model 118, that is intended by the user or the like can be easily reflected on the control related to the imaging as compared with the case where the output of the trained model, which is randomly selected from the first trained model 106 and the second trained model 118, is reflected on the control related to the imaging.

In the imaging support apparatus 14, as the fifth processing included in the specific processing, data for displaying the time specification information 136 that enables the specification of the time when the second trained model 118 is generated on the display 28 is transmitted to the imaging apparatus 12. Therefore, according to the present configuration, the user or the like can perceive the time when the second trained model 118 is generated.

In the imaging support apparatus 14, the second set value reflected image 138, in which the output of the second trained model 118 is reflected, and the time specification information 136 are displayed on the display 28 in a state of being associated with each other. Therefore, according to the present configuration, the user or the like can perceive a correspondence relationship between the time when the second trained model 118 is generated and the image obtained in a case where the output of the second trained model 118 is reflected.

In the imaging support apparatus 14, as the sixth processing included in the specific processing, processing of associating the time specification information 136 with the second trained model 118 is performed. Therefore, according to the present configuration, the user or the like can perceive a correspondence relationship between the time when the second trained model 118 is generated and the second trained model 118.

In the imaging support apparatus 14, as the seventh processing included in the specific processing, processing of reflecting the output of the second trained model 118 on the control related to the imaging is performed at the predetermined timing. Therefore, according to the present configuration, for example, the trained model can be updated at a timing convenient for the user as compared with the case where the trained model is updated at the timing in a case where a significant difference is determined.

In the imaging support apparatus 14, as the seventh processing included in the specific processing, processing of reflecting the output of the second trained model 118 on the control related to the imaging is performed at the timing when the imaging apparatus 12 is activated, timing when the number of captured images 75, which are acquired by being captured by the imaging apparatus 12, (as an example, the number of captured images 75 acquired by being captured by the imaging apparatus 12 after the latest second set value 118A is stored in the storage 88) becomes equal to or greater than a sixth threshold value (for example, "10000"), timing when the operation mode of the imaging apparatus 12 transitions from the playback mode to the setting mode, or timing when rating (for example, evaluation by the user or the like for the image quality of the captured image 75) is performed on the captured images 75 in the playback mode. Therefore, according to the present configuration, for example, the trained model can be updated at a timing convenient for the user as compared with the case where the trained model is updated at the timing in a case where a significant difference is determined.

In the imaging support apparatus 14, as the eighth processing included in the specific processing, in a case where the second trained model 118 is applied to a different apparatus 140 that is an imaging apparatus different from the imaging apparatus 12, processing of correcting at least one of the data input to the second trained model 118 or the output from the second trained model 118 is performed based on the characteristics of the imaging apparatus 12 and the characteristics of the different apparatus 140. Therefore, according to the present configuration, the image quality of the image obtained by being captured by the different apparatus 140 can be easily made closer to the image quality intended by the user or the like as compared with the case where the second trained model 118 is applied to the different apparatus without considering the characteristics of the imaging apparatus 12 and the characteristics of the different apparatus 140 at all.

In the imaging support apparatus 14, the image sensor information 142 is appended to the second trained model 118, and the characteristic information 142A and the individual difference information 142B are included in the image sensor information 142. Thereafter, the characteristics of the imaging apparatus 12 and the characteristics of the different apparatus 140 are specified based on the image sensor information 142. Therefore, according to the present configuration, it is possible to more accurately reproduce the image quality intended by the user or the like with respect to the image obtained by being captured by the different apparatus 140 as compared with the case where the second trained model 118 is applied to the different apparatus 140 without considering the difference between the image sensor 20 used in the imaging apparatus 12 and the image sensor 140A used in the different apparatus 140 at all.

In the imaging support apparatus 14, as the ninth processing included in the specific processing, the simulation image 128B obtained by applying the second set value 118A, which is output from the second trained model 118 by inputting the standard image set 124 to the second trained model 118, to the standard image set 124, and the unprocessed image 146A are displayed on the display 28. The unprocessed image 146A is an image (for example, an image corresponding to the standard image 124A included in the standard image set 124) obtained without applying the second set value 118A, which is output from the second trained model 118 by inputting the standard image 124A included in the standard image set 124 to the second trained model 118, to the standard image 124A. Therefore, according to the present configuration, the user or the like can perceive the difference between the image affected by the output of the second trained model 118 and the image not influenced by the output.

In the imaging support apparatus 14, as the tenth processing included in the specific processing, data for displaying the brightness adjusted image 150A obtained by applying the second set value 118A, which is output from the second trained model 118 by inputting the standard image set 124 to the second trained model 118, to the standard image set 124 and by adjusting the brightness, and the unprocessed image 146A on the display 28 is transmitted to the imaging apparatus 12. Therefore, according to the present configuration, the user or the like can perceive the difference between the unprocessed image and the image obtained in a case where the brightness of the image, which is influenced by the output of the second trained model 118, is adjusted.

In the imaging support apparatus 14, as the eleventh processing included in the specific processing, processing of including the use model identifier 130B in the appended information 154 added to the captured image 75 is performed. Therefore, according to the present configuration, it is easy to specify that the image, which is obtained by being captured with the output of the second trained model 118 reflected on the control related to the imaging, is an image obtained by using the second trained model 118 as compared with the case where the image, which is obtained by being captured with the output of the second trained model 118 reflected on the control related to the imaging, is not associated with the information that enables the specification of the second trained model 118.

In the imaging support apparatus 14, as the twelfth processing included in the specific processing, processing of including the use model identifier 130A in the appended information 154 added to the captured image 75 is executed. Therefore, according to the present configuration, it is easy to specify that the image, which is obtained by being captured with the output of the first trained model 106 reflected on the control related to the imaging, is an image obtained by using the first trained model 106 as compared with the case where the image, which is obtained by being captured with the output of the first trained model 106 reflected on the control related to the imaging, is not associated with the information that enables the specification of the first trained model 106.

In the imaging support apparatus 14, the various set values 102 are used as the teacher data 98. As the various set values 102, a set value related to white balance used in the imaging, a set value related to exposure used in the imaging, a set value related to saturation used in the imaging, and a set value related to gradation used in the imaging are adopted. Therefore, according to the present configuration, as the teacher data 98, at least one of a set value related to the white balance used in the imaging, a set value related to the exposure used in the imaging, a set value related to the saturation used in the imaging, or a set value related to the gradation used in the imaging can be easily made to closer to the set value intended by the user or the like as compared with the case of using the set value that is completely irrelevant to the set value related to the white balance used in the imaging, the set value related to the exposure used in the imaging, the set value related to the saturation used in the imaging, and the set value related to the gradation used in the imaging.

Further, a set value related to the focus used in the imaging may be used as the teacher data 98. Examples of the set value related to the focus used in the imaging include a set value related to a focus frame used for the AF control, a set value related to an AF method being used (for example, a phase difference AF method, a contrast AF method, or the like), and/or the like. In this case, as the teacher data 98, the set value related to the focus used in the imaging can be easily made closer to the set value intended by the user or the like as compared with the case of using a set value that is completely irrelevant to the set value related to the focus used in the imaging.

The set value 102 used as the teacher data 98 may be at least one of the set value related to the white balance used in the imaging, the set value related to the exposure used in the imaging, the set value related to the saturation used in the imaging, the set value related to the gradation used in the imaging, or the set value related to the focus used in the imaging.

Figure 30:
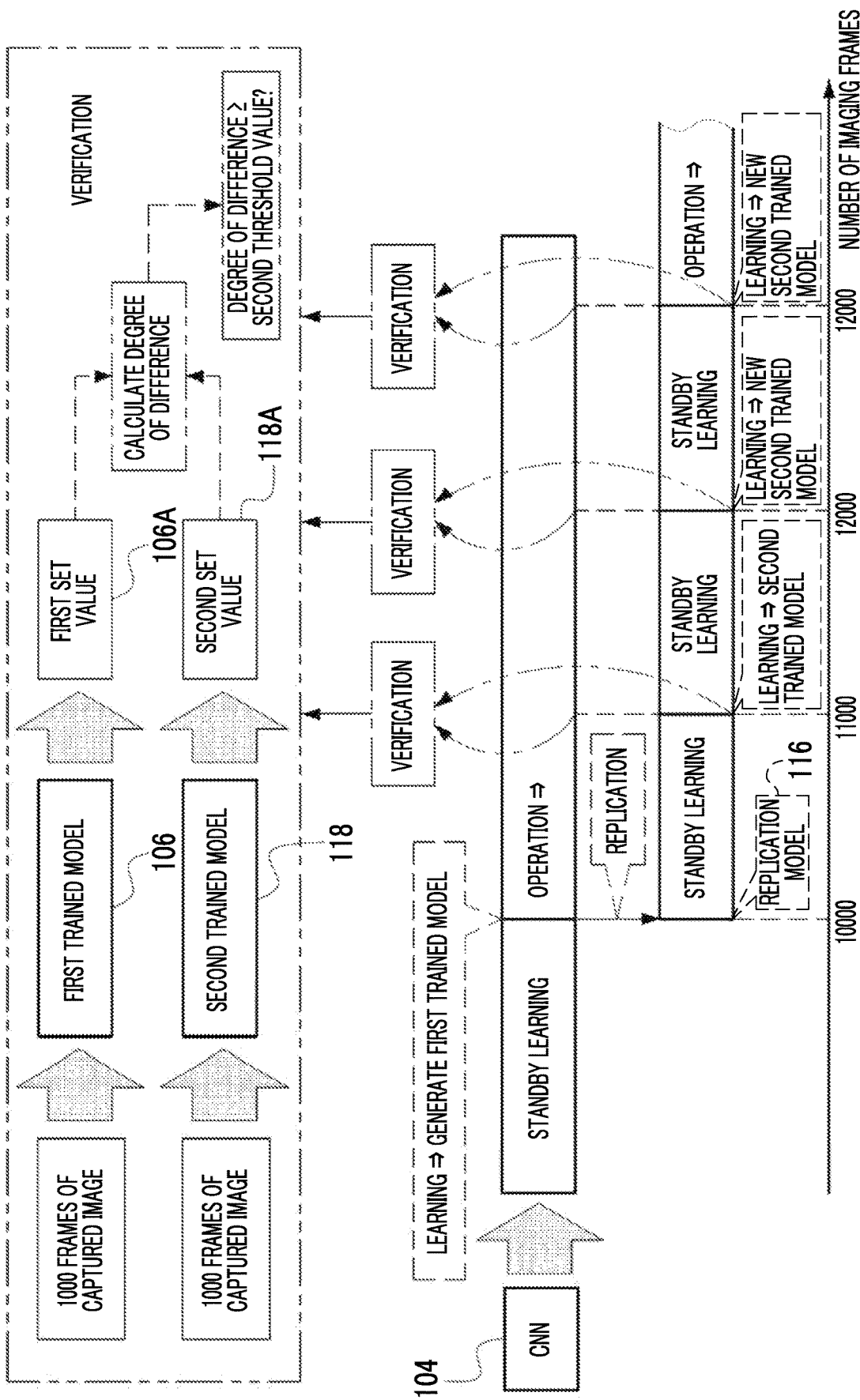
FIG. 30 is a conceptual diagram showing an example of a timing when verification is performed and a content of the verification.
Figure 31:
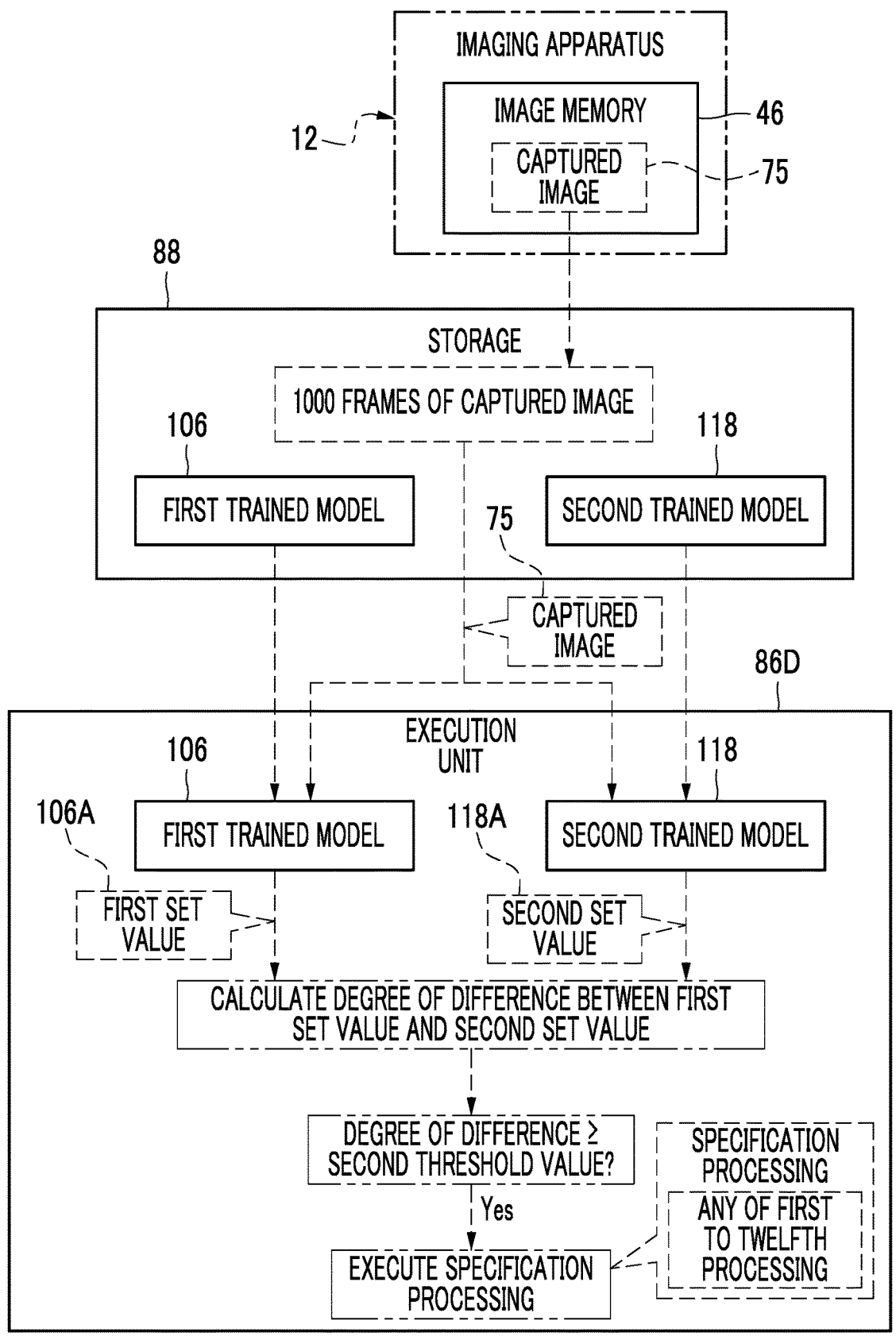
FIG. 31 is a block diagram showing an example of the content of the processing of the execution unit.

In the above embodiment, although an example of the embodiment (see FIG. 10) in which the verification is performed by inputting the standard image set 124 to the first trained model 106 and the second trained model 118 has been described, the present disclosed technology is not limited to this. For example, as shown in FIG. 30, the verification may be performed by inputting 1000 captured images 75 to the first trained model 106 and the second trained model 118. In this case, as an example shown in FIG. 31, each time the captured image 75 is stored in the image memory 46 of the imaging apparatus 12, the captured image 75 is also stored in the storage 88. Thereafter, in a case where the number of captured images 75 stored in the storage 88 reaches 1000, the execution unit 86D inputs the 1000 captured images 75, which is in the storage 88, to the first trained model 106 and the second trained model 118. As a result, the first trained model 106 outputs the first set value 106A corresponding to the input captured image 75, and the second trained model 118 outputs the second set value 118A corresponding to the input captured image 75. The execution unit 86D calculates the degree of difference 125 between the first set value 106A and the second set value 118A and determines whether or not the degree of difference 125 is equal to or greater than the second threshold value.

In this case, for example in a case where the second trained model 118 is generated by performing the learning processing by using the 1000 captured images 75, and the 1000 captured images 75, which are used in the learning processing for generating the second trained model 118, are provided one by one with respect to the generated second trained model 118 and first trained model 106 as an input for the verification, the trained model that is used for the operation may be switched to the latest trained model, or the specific processing may be performed, under the condition that the number of images, for which the degree of difference 125 between the first set value 106A and the second set value 118A reaches the second threshold value, reaches the designated number of images (for example, 800).

Further, an example of the embodiment, in which the verification is not performed until the 1000 captured images 75 are accumulated, is only an example, and the trained model that is used for the operation may be switched to the latest trained model, or the specific processing may be performed at the step where the verification is performed each time one image is captured and the number of images, for which the degree of difference 125 between the first set value 106A and the second set value 118A reaches the second threshold value, reaches the designated number of images.

Here, although an example of the embodiment in which the 1000 captured images 75 are input to the first trained model 106 and the second trained model 118 has been described, this is only an example, and the number of captured images 75 of less than 1000 images (for example, 100) or the number of captured images 75 of more than 1000 images (for example, 10000) may be input to the first trained model 106 and the second trained model 118.

Figure 32:
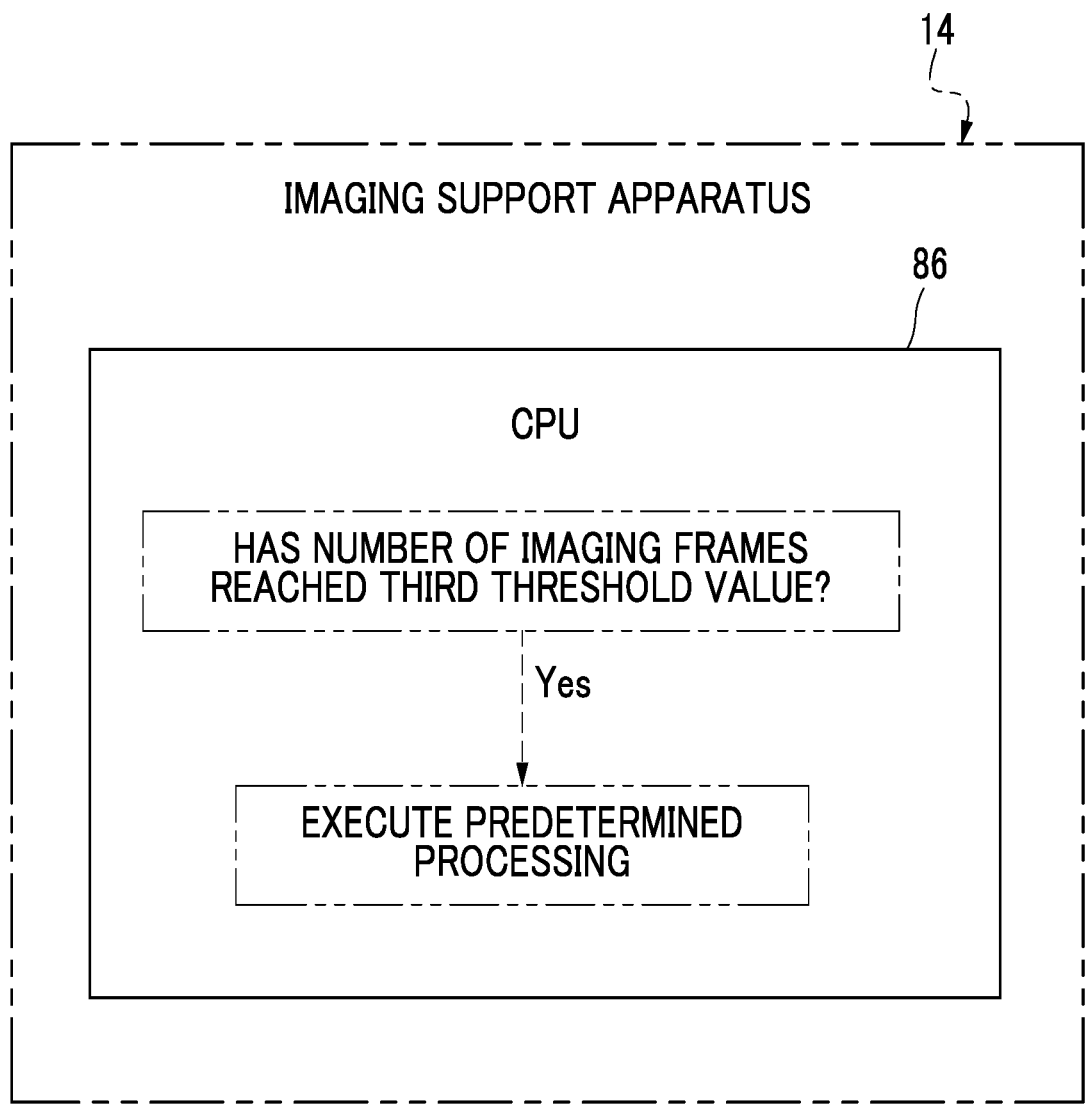
FIG. 32 is a block diagram showing an example of the content of processing performed by a CPU of the imaging support apparatus.

In the above embodiment, although an example of the embodiment in which the specific processing is performed in a case where the degree of difference 125 is equal to or greater than the second threshold value has been described, the present disclosed technology is not limited to this. For example, as shown in FIG. 32, the CPU 86 may perform predetermined processing under the condition that the number of images obtained by being captured within a default period reaches a third threshold value. Examples of the third threshold value include 5000 images after the replication model 116 is generated and 5000 images after the verification is performed, but the present disclosed technology is not limited to this, and a value corresponding to the number less than 5000 images may be used, or a value corresponding to the number more than 5000 images may be used. Further, a default period is, for example, one day. That is, for example, it may be determined whether or not the capturing related to 5000 or more images per day is performed. In a case where the image capturing related to the 5000 images is performed in one day, it is considered that the second trained model 118 has a larger significant difference than that of the first trained model 106.

Examples of the predetermined processing include processing of storing the second trained model 118, which is determined to have a significant difference between the output of the first trained model 106 and the output of the second trained model 118, in the storage device 94 for backup and/or processing of determining that a significant difference has occurred between the output of the first trained model 106 and the output of the second trained model 118. Here, the significant difference refers to, for example, the degree to which the tendency of the content (for example, the imaging scene) of the captured image 75, which is used in the learning processing of the second trained model 118, deviates from the tendency of the content of the captured image 75, which is used in the learning processing of the first trained model 106, by a default degree or more. Further, the significant difference refers to, for example, the degree to which the tendency of the content of the correction data 100, which is used in the learning processing of the second trained model 118, deviates from the tendency of the content of the correction data 100, which is used in the learning processing of the first trained model 106, by the default degree or more. The default degree may be a fixed value or may be a variable value that is changed according to the instruction, which is provided to the imaging support apparatus 14 by the user or the like, and/or various conditions. Although the processing is predetermined here, it does not need to be predetermined, for example, the user may be allowed to select the processing under the condition that the number of images, which are captured within the default period, reaches the third threshold value.

According to the configuration in which the predetermined processing is performed under the condition that the number of images obtained by being captured reaches the third threshold value, the load on the CPU 86 can be reduced as compared with the case where the predetermined processing is performed regardless of the number of images obtained by being captured. Further, for example, in a case where the processing of storing the second trained model 118, which is determined to have a significant difference, in the storage device 94 for backup is performed under the condition that the number of images obtained by being captured reaches the third threshold value, only the second trained model 118, which is considered to have a particularly large difference, can be stored in the storage device 94 for backup as compared with the case where all the second trained models 118, which is determined to have a significant difference, are stored in the storage device 94 for backup.

Further, the CPU 86 may perform the predetermined processing in a case where the number of captured images 75, which is acquired by performing the imaging under a first environment during the default period and used as the teacher data 98, is equal to or greater than a fourth threshold value, and in a case where the number of captured images 75, which is obtained by performing the imaging under a second environment different from the first environment and used as the teacher data 98, is equal to or less than a fifth threshold value. The default period refers to, for example, one day. For example, in a case where the fourth threshold value is significantly greater than the fifth threshold value (for example, the fourth threshold value is 1000 and the fifth threshold value is 10) and the number of captured images 75 satisfies the above condition, it is considered that the captured images 75 include many images obtained by being captured under the first environment. That is, it is considered that the captured image 75, which is the basis of the teacher data 98, is obtained by being captured under the first environment in a biased manner. It is considered that the second trained model 118 has a larger significant difference than that of the first trained model 106 in a case where the learning is performed by using the teacher data 98 imaged under the first environment in a biased manner. Examples of this specific processing also include processing of storing the second trained model 118 in the storage device 94 for backup, processing of determining that a significant difference has occurred between the output of the first trained model 106 and the output of the second trained model 118, and/or the like. These processing also do not need to be predetermined, for example, the user may be allowed to select these processing in a case where the number of captured images 75, which is acquired by being captured under a first environment and used as the teacher data 98, is equal to or greater than the fourth threshold value, and in a case where the number of captured images 75, which is obtained by being captured under a second environment different from the first environment and used as the teacher data 98, is equal to or less than the fifth threshold value. Further, the number of captured images 75 obtained under the second environment does not necessarily have to be used, for example, the above-mentioned predetermined processing may be performed by determining whether the ratio of the number of captured images 75, which is acquired by being captured under the first environment with respect to the total number of captured images 75 obtained in one day, is equal to or greater than a default threshold value.

Figure 33:
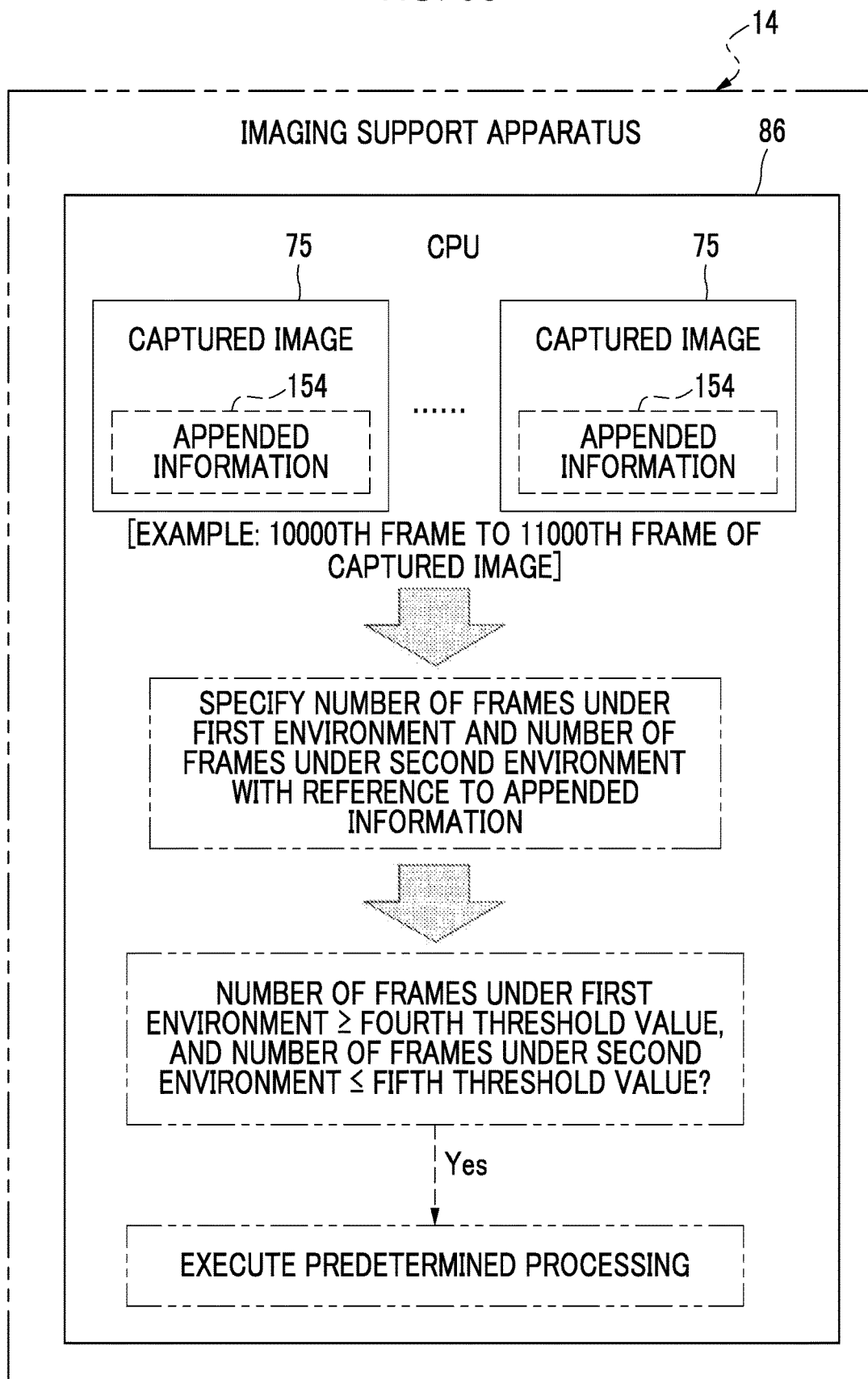
FIG. 33 is a block diagram showing an example of the content of the processing performed by the CPU of the imaging support apparatus.

In this case, for example, as shown in FIG. 33, the CPU 86 specifies the number of captured images 75 (hereinafter referred to as "the number of frames under the first environment") acquired by performing the imaging under the first environment and the number of captured images 75 (hereinafter referred to as "the number of frames under the second environment") acquired by performing the imaging under the second environment with reference to the appended information 154 of each of the captured images 75 from the 10000th image to the 11000th image, on the premise that the appended information 154 added to the captured image 75 includes information that enables the specification of the first environment and the second environment. Here, the first environment and the second environment refer to, for example, an environment specified from an imaging scene and a light source. The imaging scene refers to, for example, a person or a landscape, and the light source refers to, for example, the sun or an indoor light source.

The CPU 86 determines whether or not the condition (hereinafter, also referred to as a "determination condition") that the number of frames under the first environment is equal to or greater than the fourth threshold value and the number of frames under the second environment is equal to or less than the fifth threshold value, is satisfied. Satisfying the determination condition means that a significant difference has occurred between the output of the first trained model 106 and the output of the second trained model 118. Therefore, in a case where the determination condition is satisfied, the CPU 86 executes predetermined processing. The fourth threshold value and the fifth threshold value may be a fixed value or may be a variable value that is changed according to the instruction, which is provided to the imaging support apparatus 14 by the user or the like, and/or various conditions.

As described above, the CPU 86 specifies the number of frames under the first environment and the number of frames under the second environment with reference to the appended information 154 and determines whether or not the determination condition is satisfied based on the specific result. Therefore, according to the present configuration, it is possible to reduce the load on the CPU 86 from the acquisition of the captured image 75 by the CPU 86 to the time when the predetermined processing is performed as compared with the case where the captured image 75 is input to the first trained model 106 and the second trained model 118, the first set value 106A is output from the first trained model 106, the second set value 118A is output from the second trained model 118, and the degree of difference 125 between the first set value 106A and the second set value 118A is calculated. Further, it is possible to store only the second trained model 118, which is considered to have a particularly large difference, in the storage device 94 for backup by performing the processing of storing the second trained model 118, which is determined to have a significant difference, in the storage device 94 for backup in a case where it is determined whether or not the capturing related to the image captured image 75, which is used as the teacher data 98 under the first environment in a biased manner, is performed and the capturing related to the image captured image 75, which is used as the teacher data 98 under the first environment in a biased manner, is performed, as compared with the case where all the second trained models 118, which is determined to have a significant difference, are stored in the storage device 94 for backup.

Figure 34:
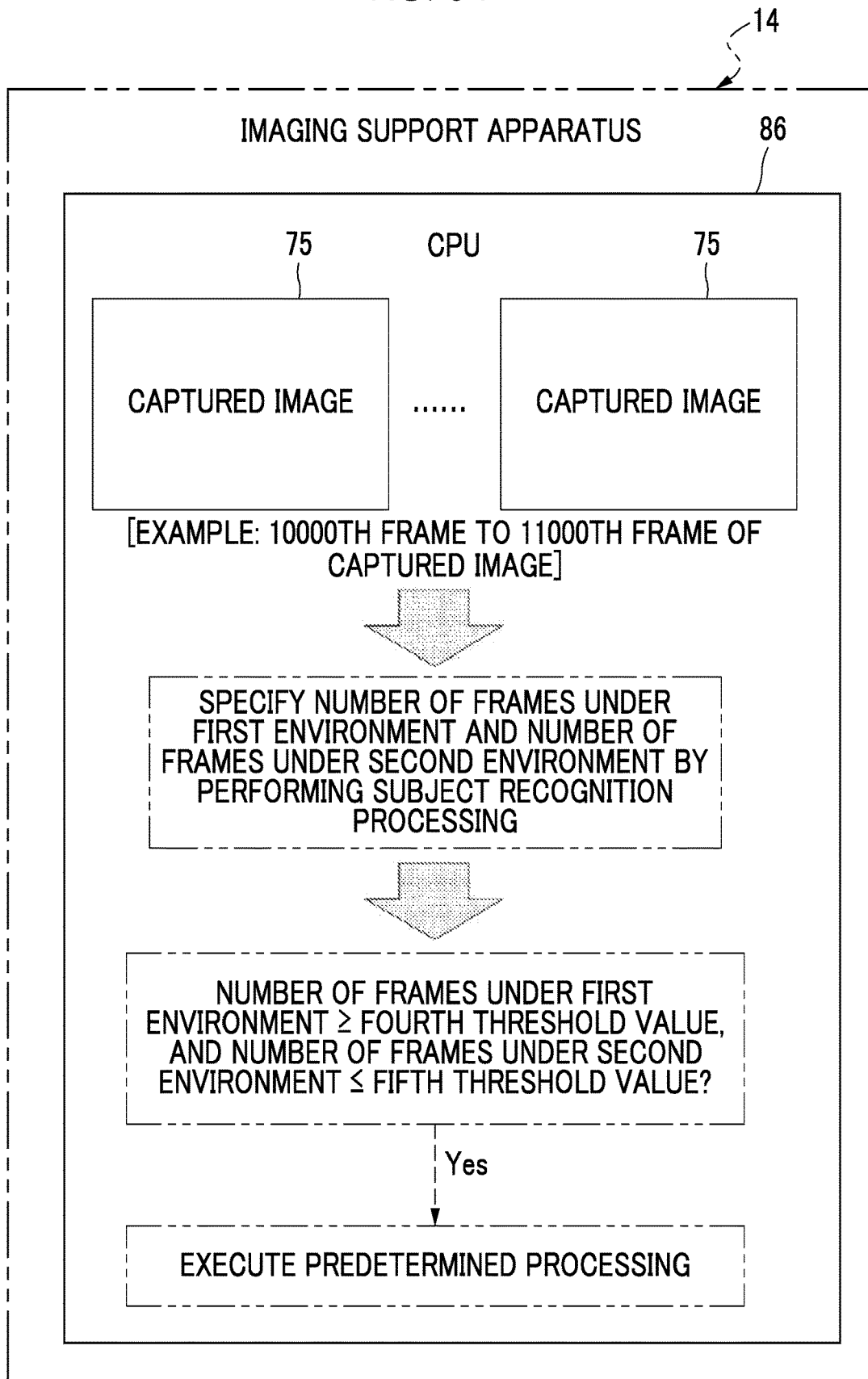
FIG. 34 is a block diagram showing an example of the content of the processing performed by the CPU of the imaging support apparatus.

In the example shown in FIG. 33, although an example of the embodiment in which the CPU 86 specifies the number of frames under the first environment and the number of frames under the second environment with reference to the appended information 154 of the captured image 75 has been described, this is only an example, for example, as shown in FIG. 34, the CPU 86 may specify the number of frames under the first environment and the number of frames under the second environment by performing subject recognition processing on each captured image 75. The subject recognition processing may be an AI method subject recognition processing or a template matching method subject recognition processing.

Figure 35:
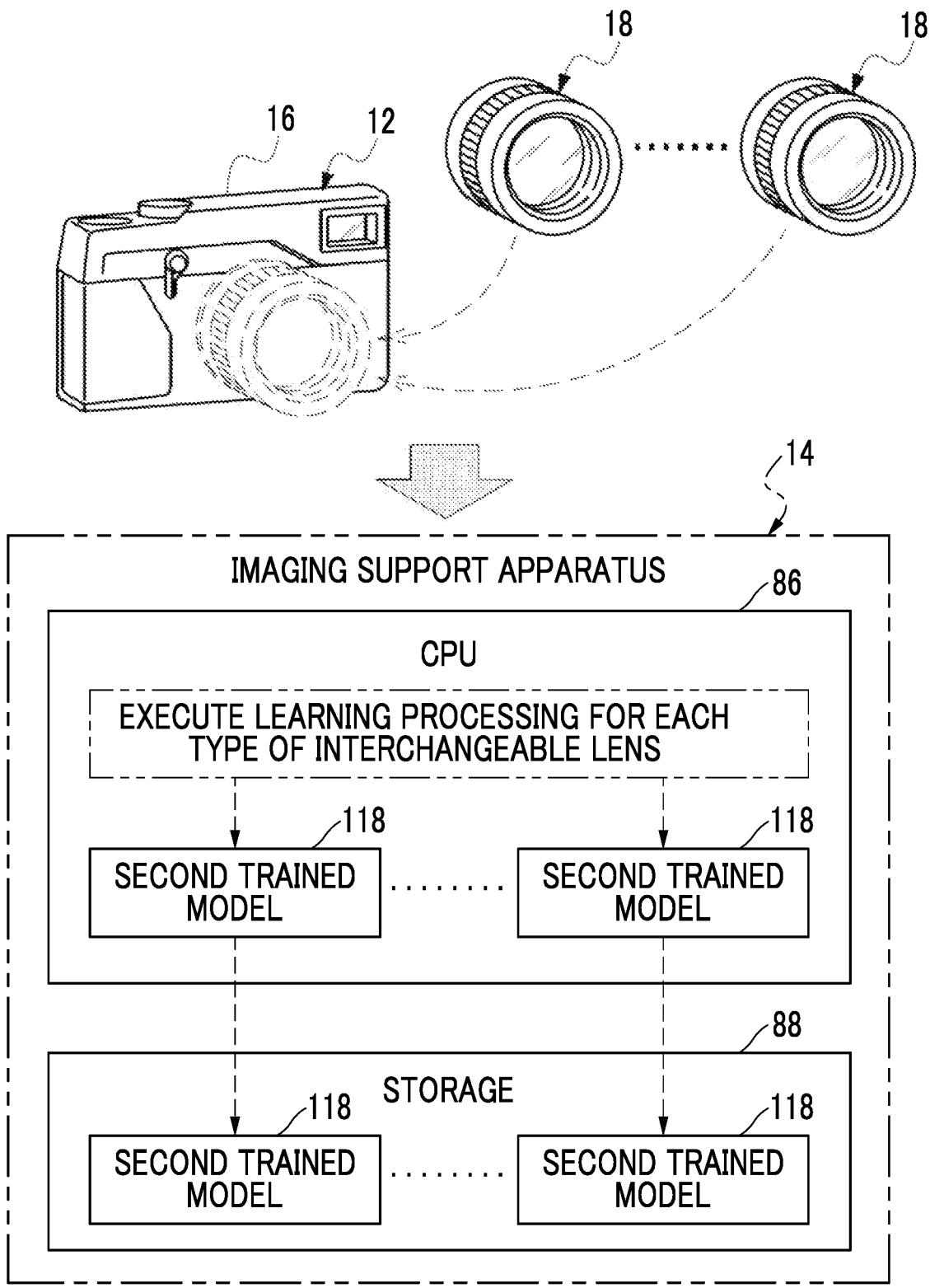
FIG. 35 is a block diagram showing an example of the content of the processing performed by the CPU of the imaging support apparatus.

In the above embodiment, although the fact that one type of interchangeable lens 18 is attached to the imaging apparatus main body 16 has been described as a premise, the present disclosed technology is not limited to this. For example, as shown in FIG. 35, since the imaging apparatus 12 is a lens-interchangeable imaging apparatus, an interchangeable lens 18 of a different type is selectively attached to the imaging apparatus main body 16. Therefore, the CPU 86 of the imaging support apparatus 14 generates a plurality of second trained models 118 by performing the learning processing on the learning model (for example, the replication model 116, or the like) for each type of interchangeable lens 18 used in the imaging related to the captured image 75 included in the teacher data 98. The CPU 86 stores the generated plurality of second trained models 118 in the storage 88. Therefore, according to the present configuration, the output of the second trained model 118 suitable for the interchangeable lens 18 attached to the imaging apparatus main body 16 can be reflected on the control related to the imaging as compared with the case where the output from only one second trained model 118 is constantly reflected on the control related to the imaging regardless of the type of the interchangeable lens 18.

Figure 36:
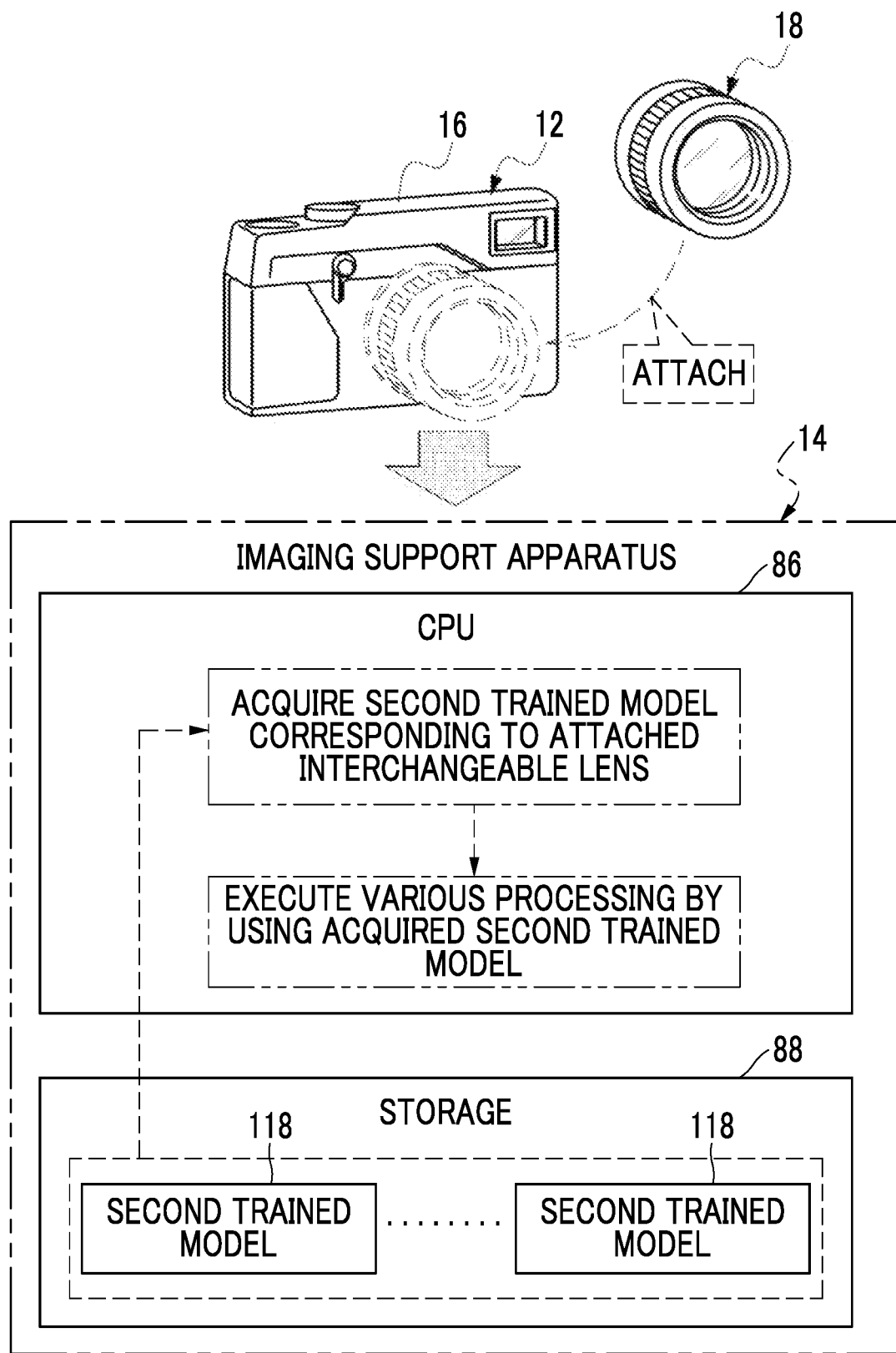
FIG. 36 is a block diagram showing an example of the content of the processing performed by the CPU of the imaging support apparatus.

Further, as an example shown in FIG. 36, in a case where the interchangeable lens 18 is attached to the imaging apparatus main body 16, the CPU 86 acquires the second trained model 118, among the plurality of second trained models 118 in the storage 88, corresponding to the interchangeable lens 18 attached to the imaging apparatus main body 16. The second trained model 118, which corresponds to the interchangeable lens 18 attached to the imaging apparatus main body 16, refers to the second trained model 118 generated by using the captured image 75, which is acquired by being captured by the imaging apparatus 12 equipped with the interchangeable lens 18, in the learning processing as the teacher data 98. The CPU 86 performs various processing (for example, the processing of reflecting the output of the second trained model 118 on the control related to the imaging, the learning processing with respect to the second trained model 118, and/or the like) by using the second trained model 118 acquired from the storage 88. Therefore, according to the present configuration, the processing can be performed by using the second trained model 118, among the plurality of second trained models 118, suitable for the interchangeable lens 18 as compared with the case where the processing is performed by using randomly selected one second trained model 118 among the plurality of second trained models 118.

In the examples shown in FIGS. 35 and 36, although an example of the embodiment in which the second trained model 118, which corresponds to the interchangeable lens 18 attached to the imaging apparatus main body 16, is used in a case where the interchangeable lens 18 of a different type is selectively attached to the imaging apparatus main body 16 has been described, in the same manner as above, the second trained model 118 corresponding to the selected imaging system may be used in a case where a plurality of imaging systems each having a function of imaging a subject are selectively used.

Figure 37:
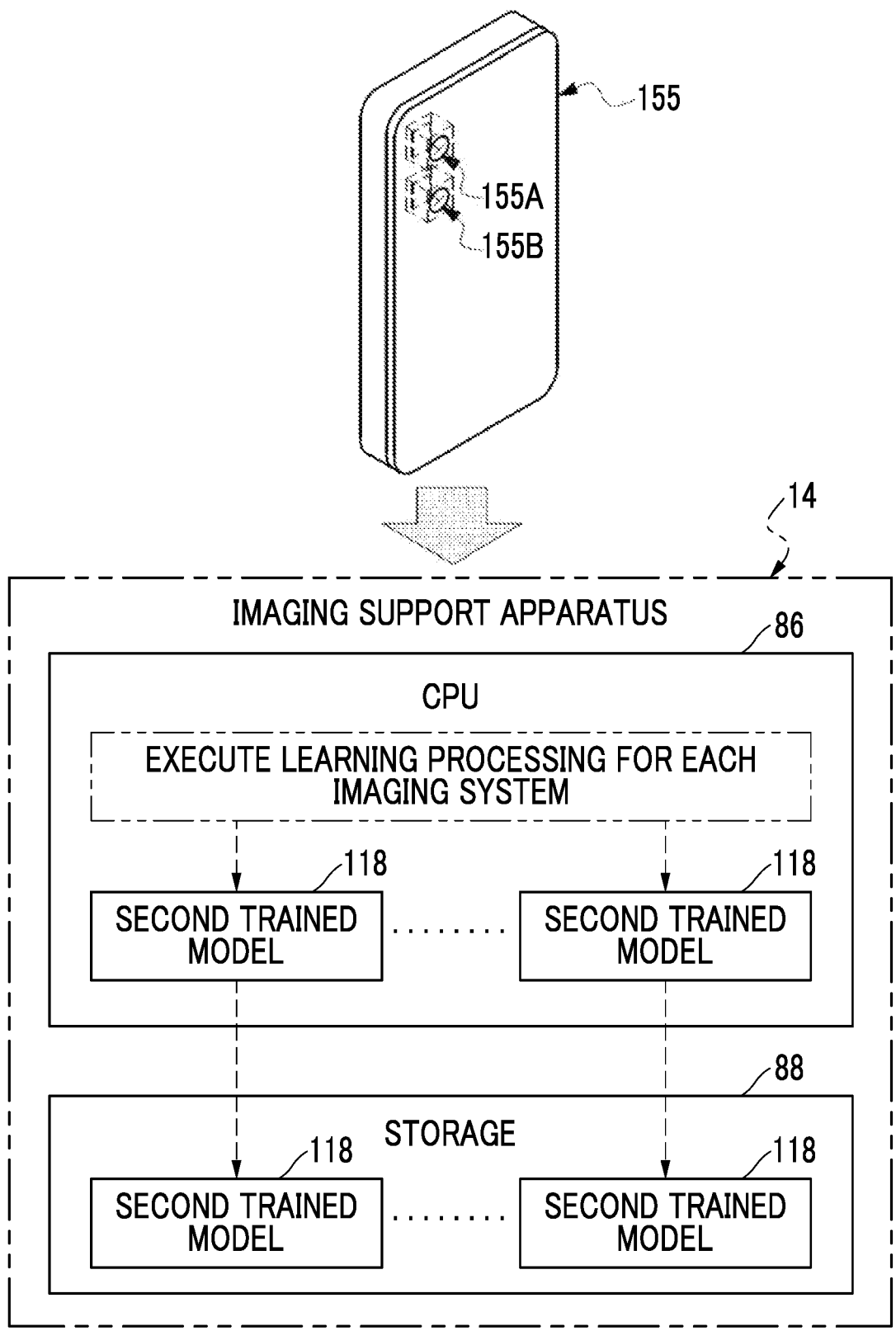
FIG. 37 is a block diagram showing an example of the content of the processing performed by the CPU of the imaging support apparatus.

For example, as shown in FIG. 37, in a case where the smart device 155 has the imaging systems 155A and 155B as the plurality of imaging systems and each of the first imaging system 155A and the second imaging system 155B is used in the imaging related to the captured image 75 included in the teacher data 98, the CPU 86 of the imaging support apparatus 14 generates the plurality of second trained models 118 by performing the learning processing on the learning model (for example, the replication model 116, or the like) for each of the first imaging system 155A and the second imaging system 155B. The CPU 86 stores the generated plurality of second trained models 118 in the storage 88. Therefore, according to the present configuration, the output of the second trained model 118, which is suitable for the imaging system to be used among the first imaging system 155A and the second imaging system 155B, can be reflected on the control related to the imaging performed by the imaging system to be used among the first imaging system 155A and the second imaging system 155B as compared with the case where the output from only one second trained model 118 is constantly reflected on the control related to the imaging performed by the first imaging system 155A and the second imaging system 155B of the smart device 155. The smart device 155 is an example of the "imaging apparatus" according to the present disclosed technology, and the first imaging system 155A and the second imaging system 155B are examples of the "plurality of imaging systems" according to the present disclosed technology.

Figure 38:
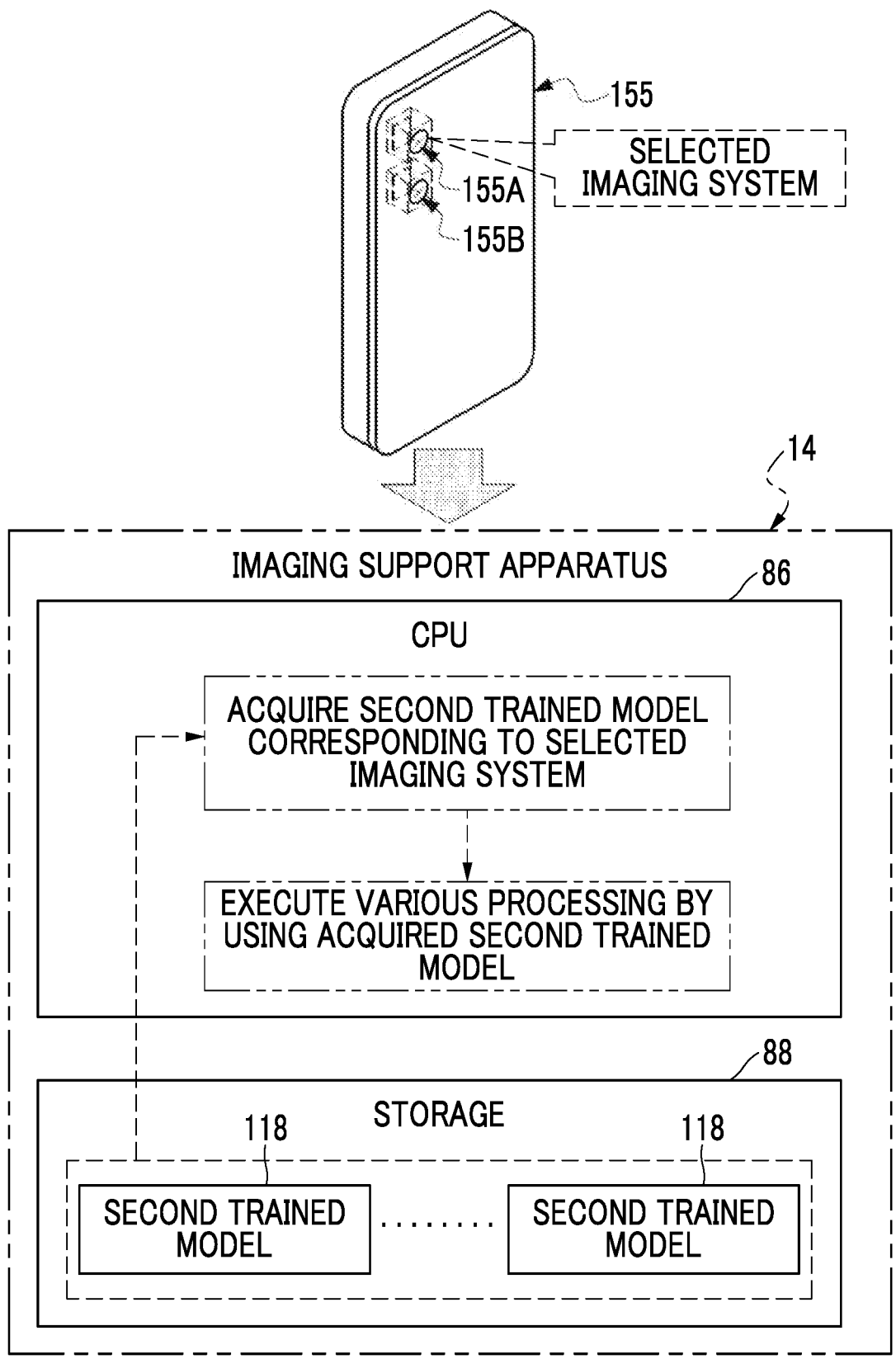
FIG. 38 is a block diagram showing an example of the content of the processing performed by the CPU of the imaging support apparatus.

Further, as an example shown in FIG. 38, in a case where an imaging system to be used in the imaging is selected from the first imaging system 155A and the second imaging system 155B, the CPU 86 acquires the second trained model 118, which corresponds to the imaging system selected from the first imaging system 155A and the second imaging system 155B, among the plurality of second trained models 118 in the storage 88. The second trained model 118, which corresponds to the imaging system selected from the first imaging system 155A and the second imaging system 155B, refers to the second trained model 118 generated by using the captured image 75, which is acquired by being captured by the selected imaging system from the first imaging system 155A and the second imaging system 155B, in the learning processing as the teacher data 98. The CPU 86 performs various processing (for example, the processing of reflecting the output of the second trained model 118 on the control related to the imaging performed by the imaging system selected from the first imaging system 155A and the second imaging system 155B, the learning processing with respect to the second trained model 118, and/or the like) by using the second trained model 118 acquired from the storage 88. Therefore, according to the present configuration, the processing can be performed by using the second trained model 118, which is suitable for the selected imaging system from the first imaging system 155A and the second imaging system 155B, among the plurality of second trained models 118, as compared with the case where the processing is performed by using randomly selected one second trained model 118 among the plurality of second trained models 118.

Figure 39:
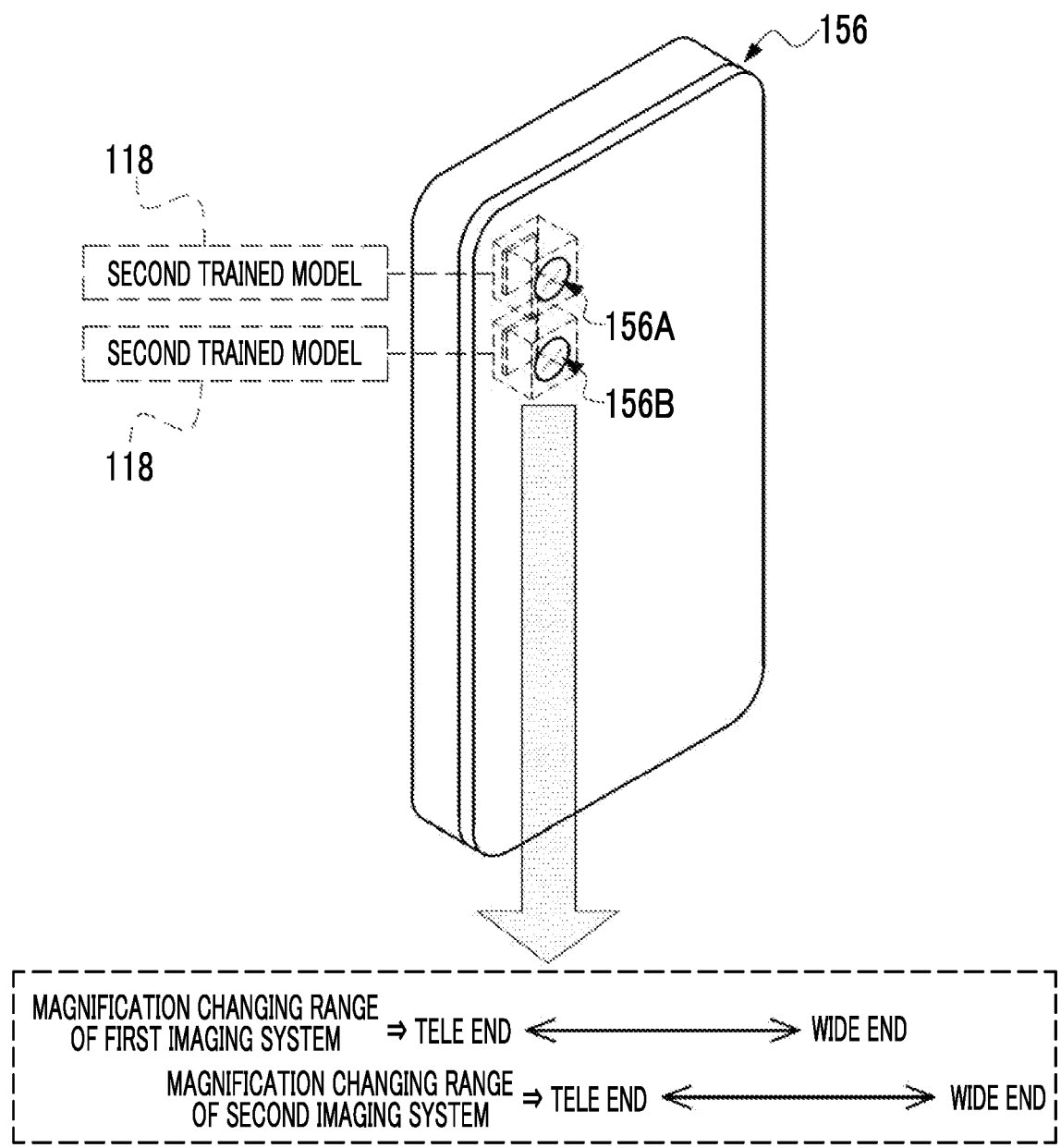
FIG. 39 is a schematic perspective view showing an example of a configuration of an external appearance of a smart device.

FIG. 39 shows an example of the configuration of the smart device 156 equipped with the plurality of imaging systems having a magnification changing function. As an example shown in FIG. 39, the smart device 156 includes the first imaging system 156A and the second imaging system 156B. Each of the first imaging system 156A and the second imaging system 156B is also generally referred to as an out camera. Each of the first imaging systems 156A and 158B has the magnification changing function in which magnification changing ranges are different from each other. Further, as in the examples shown in FIGS. 37 and 38, the second trained model 118 is assigned to each of the first imaging system 156A and the second imaging system 156B.

Figure 40B:
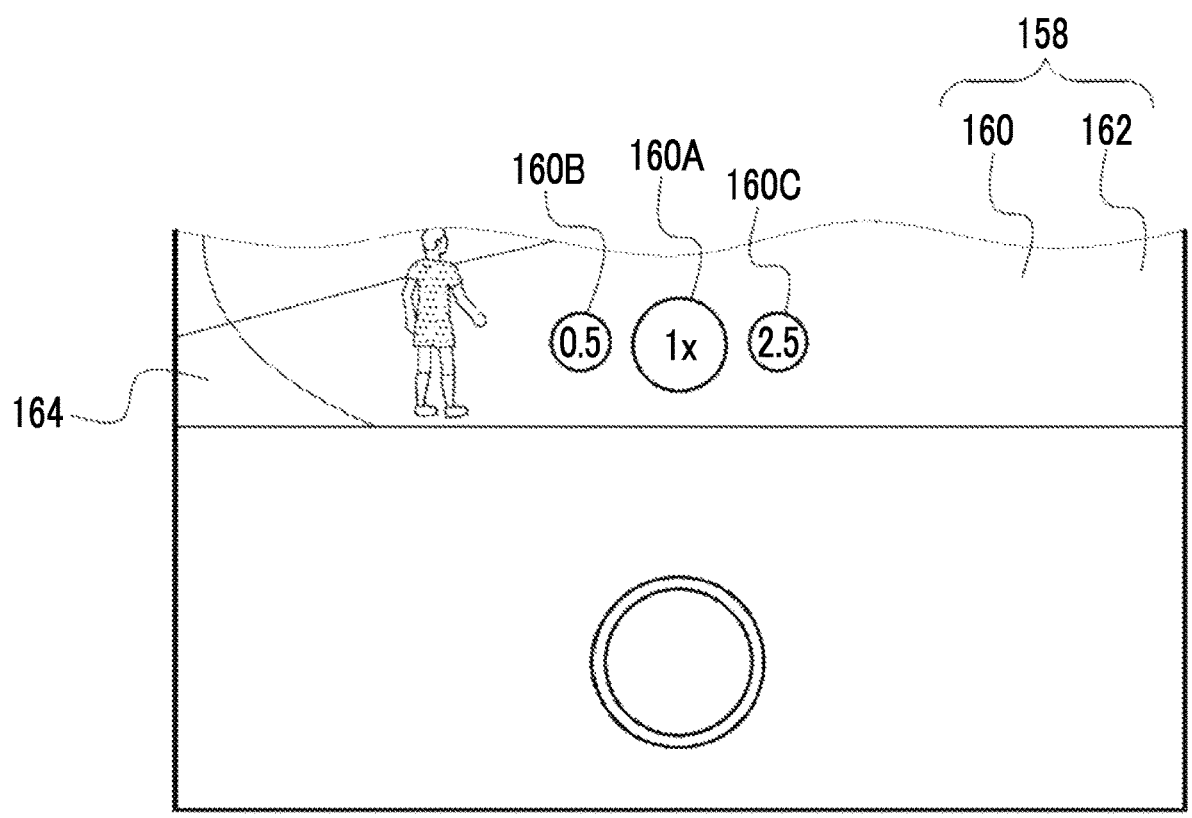
FIG. 40B is a schematic screen view showing an example of a part of a screen used in a case where a display magnification is changed.

As an example shown in FIG. 40A, the smart device 156 includes a touch panel display 158. The touch panel display 158 has a display 160 and a touch panel 162, and in a case where an angle of view change instruction is provided to the touch panel 162 in a state where the captured image 164 is displayed on the display 160 as a live view image, the magnification changing function is operated and the angle of view is changed. In the example shown in FIG. 40A, a pinch-out operation is shown as the angle of view change instruction. In a case where the pinch-out operation is performed on the touch panel 162 in a state where the captured image 164 is displayed on the display 160, the magnification changing function is operated and the captured image 164 is enlarged in the display 160. The method of magnification changing is not limited to this, and as an example shown in FIG. 40B, an embodiment may be used in which the magnification is directly selected by using the softkeys 160A, 160B, and 160C. In the example shown in FIG. 40B, the softkey 160A is a softkey that is turned on in a case where "1 time" is selected as the magnification, the softkey 160B is a softkey that is turned on in a case where "0.5 times" is selected as the magnification, and the softkey 160C is a softkey that is turned on in a case where "2.5 times" is selected as the magnification. The magnification illustrated here is only an example and may be another magnification. Further, the number of softkeys is not limited to three of the softkeys 160A, 160B, and 160C and may be two or may be four or more.

Figure 41:
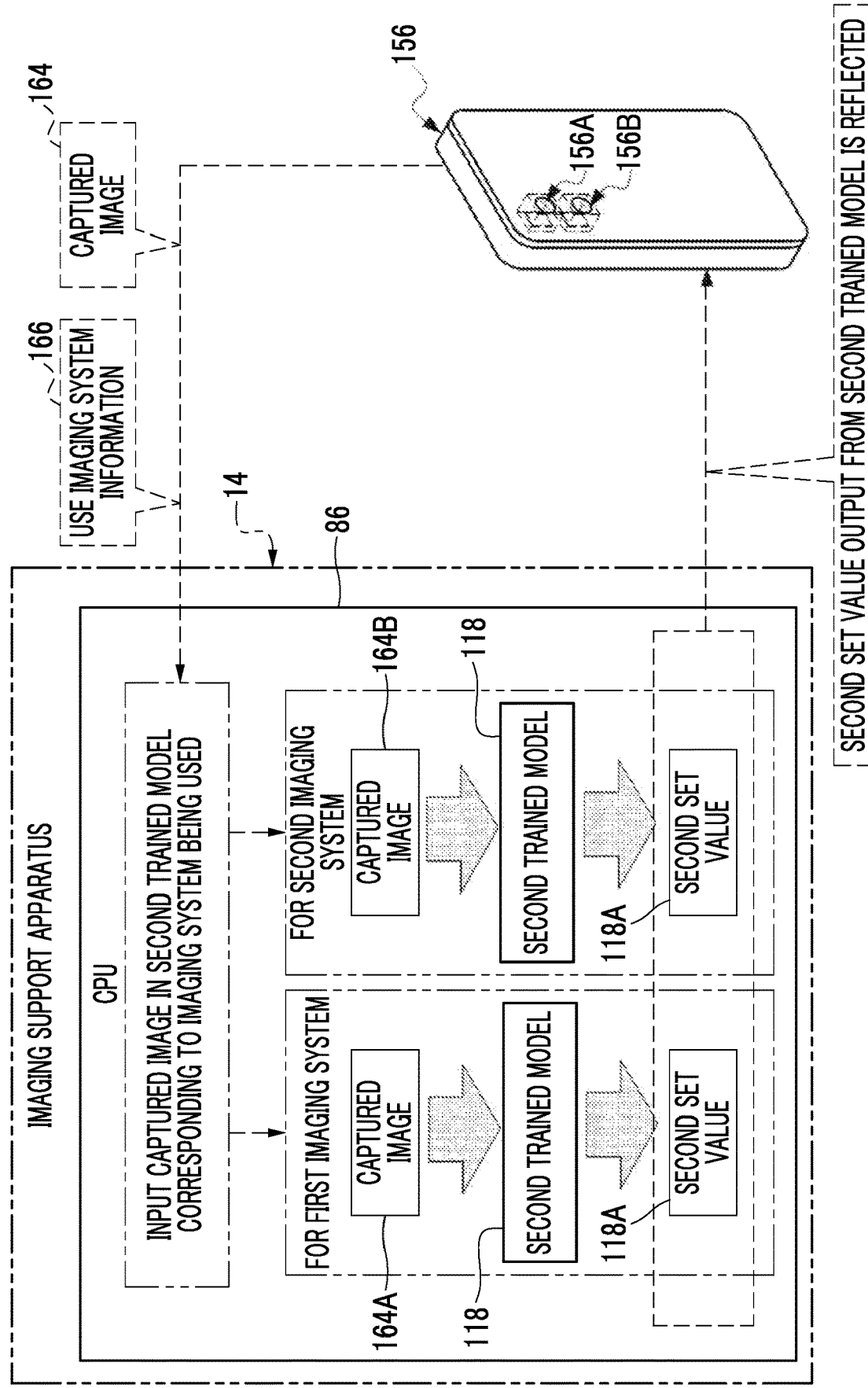
FIG. 41 is a block diagram showing an example of the content of the processing performed by the CPU of the imaging support apparatus.

As an example shown in FIG. 41, the smart device 156 transmits use imaging system information 166, which enables the specification of the imaging system being used at a current timing among the first imaging system 156A and the second imaging system 156B, and the captured image 164, which is acquired by being captured by the imaging system being used at a current timing, to the imaging support apparatus 14. The captured image 164 is classified into the captured image 164A acquired by being captured by the first imaging system 156A and the captured image 164B acquired by being captured by the second imaging system 156B.

The imaging support apparatus 14 has the second trained model 118 for the first imaging system 156A and the second trained model 118 for the second imaging system 156B, and the second trained model 118 for the first imaging system 156A is a model obtained by performing the learning processing, in which the set value that is applied to the first imaging system 156A as the teacher data, with the plurality of captured images 164A and the image capturing for obtaining the plurality of captured images 164A. The second trained model 118 for the second imaging system 156B is a model obtained by performing the learning processing, in which the set value that is applied to the second imaging system 156B as the teacher data, with the plurality of captured images 164B and the image capturing for obtaining the plurality of captured images 164B.

The CPU 86 of the imaging support apparatus 14 receives the use imaging system information 166 and the captured image 164 that are transmitted from the smart device 156. The CPU 86 inputs the received captured image 164 to the second trained model 118 corresponding to the imaging system specified from the received use imaging system information 166. For example, in a case where the imaging system that is specified from the received use imaging system information 166 is the first imaging system 156A, the CPU 86 inputs the captured image 164A to the second trained model 118 for the first imaging system 156A. Further, in a case where the imaging system that is specified from the received use imaging system information 166 is the second imaging system 156B, the CPU 86 inputs the captured image 164B to the second trained model 118 for the second imaging system 156B.

The second trained model 118 for the first imaging system 156A outputs the second set value 118A in a case where the captured image 164A is input. The CPU 86 reflects the second set value 118A output from the second trained model 118 for the first imaging system 156A on the control related to the imaging performed by the first imaging system 156A. Further, the second trained model 118 for the second imaging system 156B outputs the second set value 118A in a case where the captured image 164B is input. The CPU 86 reflects the second set value 118A output from the second trained model 118 for the second imaging system 156B on the control related to the imaging performed by the second imaging system 156B.

Examples of a method of switching the imaging system, that is used in the imaging, from one of the first imaging system 156A or the second imaging system 156B to the other include a method of switching the imaging system each time at least one softkey (not shown), which is displayed on the display 160, is turned on, and a method of switching the imaging system in a step-less manner in a case where a step-less instruction such as a pinch-in operation and a pinch-out operation is provided to the touch panel 162. In the method of switching the imaging system in a step-less manner, CPU86 changes the angle of view in a step-less manner according to the step-less instruction such as the pinch-in operation and the pinch-out operation and one of the first imaging system 156A or the second imaging system 156B may be switched to the other while the angle of view is being changed. That is, it is not possible to switch from one of the first imaging system 156A or the second imaging system 156B to the other, in a case where the angle of view is changed within a range (hereinafter, also referred to as a "overlapping magnification changing range") in which the magnification changing range of the first imaging system 156A and the magnification changing range of the second imaging system 156B overlap with each other or within a range (hereinafter, also referred to as a "non-overlapping magnification changing range") in which the magnification changing range of the first imaging system 156A and the magnification changing range of the second imaging system 156B do not overlap with each other, but the switching from one of the first imaging system 156A or the second imaging system 156B to the other is accompanied in a case where the angle of view is changed from one of the overlapping magnification changing range or the non-overlapping magnification changing range to the other.

Figure 42:
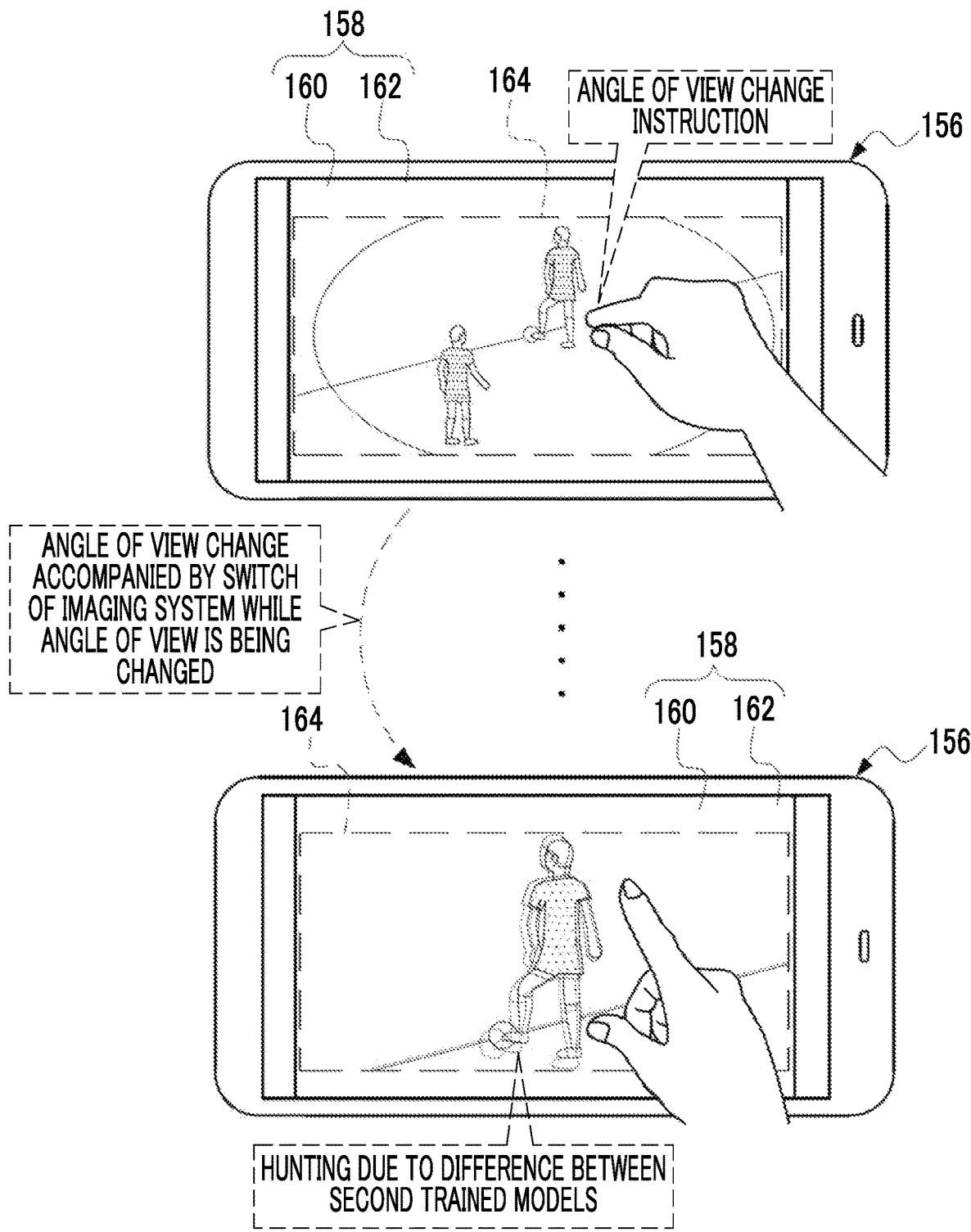
FIG. 42 is a conceptual diagram showing an example of an aspect of an angle of view change accompanied by a switch of an imaging system while the angle of view change is being performed.

The output of the second trained model 118 for the first imaging system 156A is reflected on the control related to the imaging performed by the first imaging system 156A, and the output of the second trained model 118 for the second imaging system 156B is reflected on the control related to the imaging performed by the second imaging system 156B. Therefore, as an example shown in FIG. 42, in a case where the switching is performed from one of the first imaging system 156A or the second imaging system 156B to the other while the angle of view is being changed, hunting may occur for the captured image 164 due to the difference between the second trained model 118 for the first imaging system 156A and the second trained model 118 for the second imaging system 156B.

Figure 43:
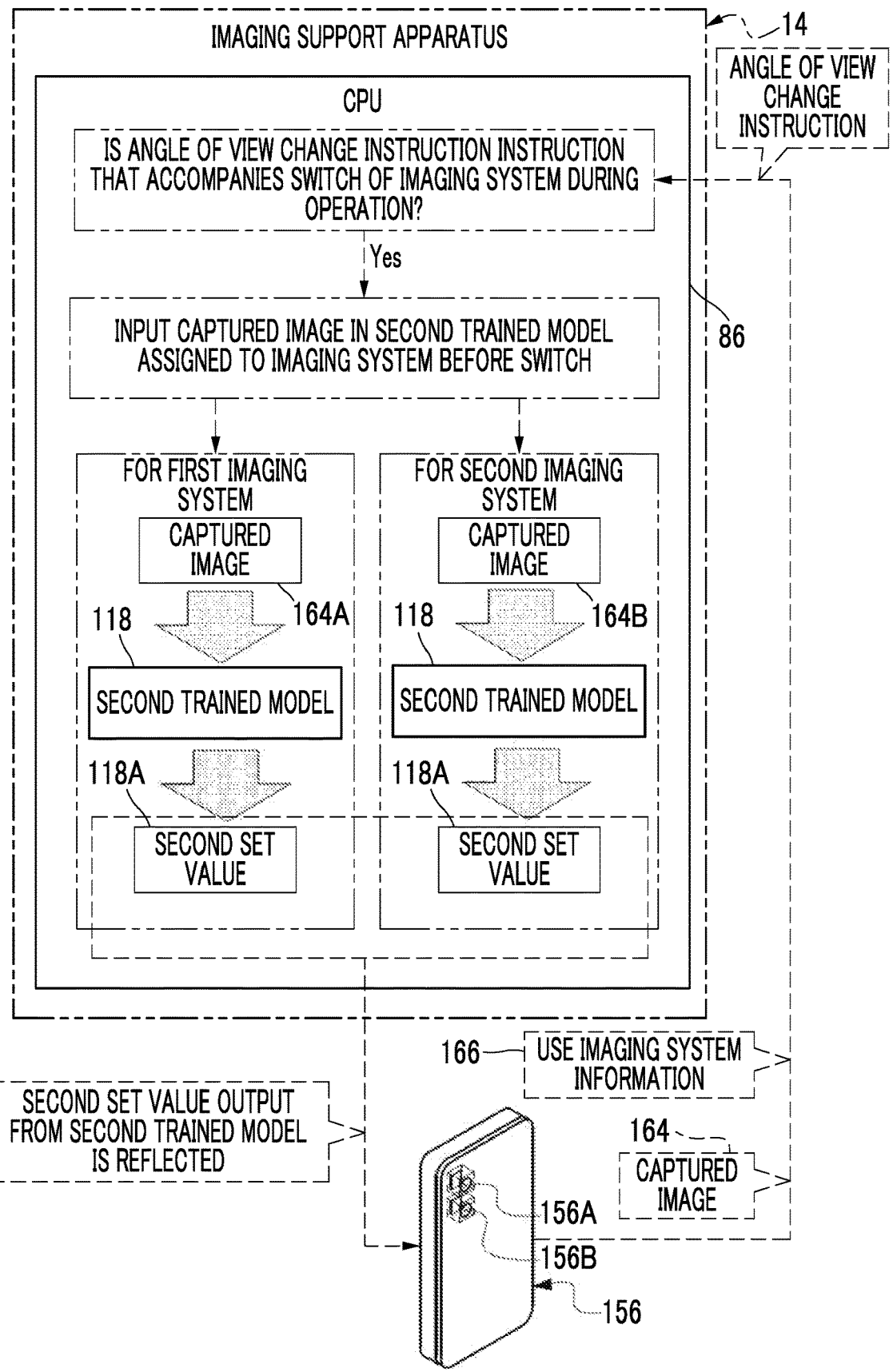
FIG. 43 is a block diagram showing an example of the content of the processing performed by the CPU of the imaging support apparatus.

Therefore, as an example shown in FIG. 43, the CPU 86 of the imaging support apparatus 14 receives the step-less instruction (hereinafter, referred to as an "angle of view change instruction") received by the touch panel 162 of the smart device 156 as an instruction to change the angle of view. Thereafter, in a case where the received angle of view change instruction is an instruction that accompanies a switch of the imaging system during the operation, the CPU 86 continues to use the second trained model 118 assigned to the imaging system before the switch, in the imaging system after the switch. As a result, even in a case where one of the first imaging system 156A or the second imaging system 156B is switched to the other, it is possible to avoid hunting due to the difference between the second trained models 118 at a timing not intended by the user or the like.

The smart device 156 is an example of the "imaging apparatus" according to the present disclosed technology, and the first imaging system 156A and the second imaging system 156B are examples of the "plurality of imaging systems" according to the present disclosed technology.

By the way, at the timing when the smart device 156 is activated (hereinafter, also referred to as an "activation timing"), in a case where the imaging system that is frequently used by the user or the like is activated among the first imaging system 156A and the second imaging system 156B, it is possible to start the imaging quickly without switching the imaging system.

Figure 44:
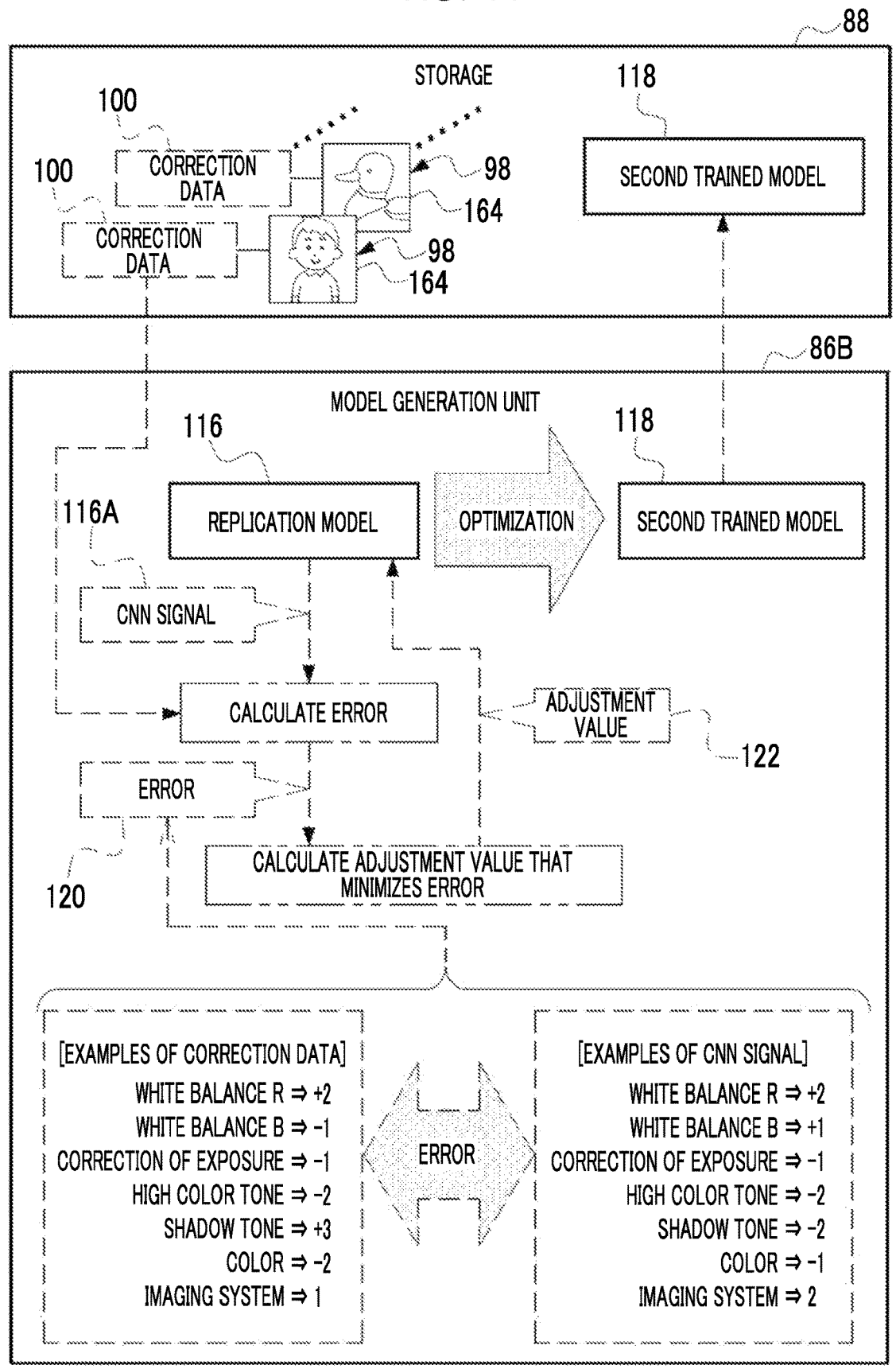
FIG. 44 is a conceptual diagram showing an example of the content of the processing of the model generation unit.

Therefore, as an example shown in FIG. 44, information related to the imaging system may be included in the various set values 102 used as the correction data 100, as the set value. The information related to the imaging system refers to, for example, information related to the imaging system selected in a case where the captured image 75 is acquired by the smart device 156 (for example, information that enables the specification of the imaging system). As described above, by including the information related to the imaging system in the correction data 100, the model generation unit 86B is capable of making the replication model 116 learn the tendency of the imaging system that is frequently used in the smart device 156. The replication model 116 is optimized by training the tendency of the imaging system that is frequently used in the smart device 156, and the second trained model 118 is generated.

Figure 45:
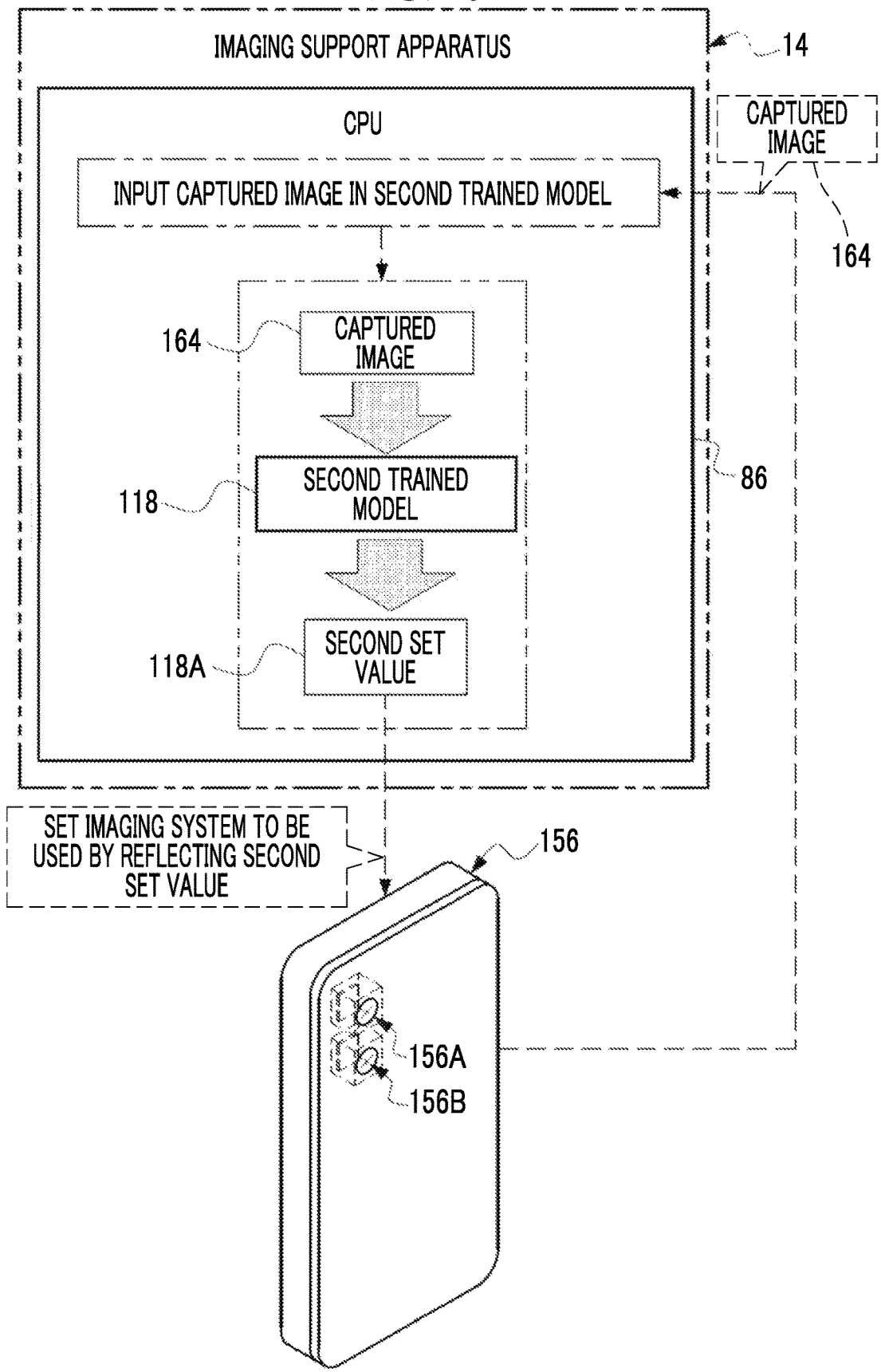
FIG. 45 is a block diagram showing an example of the content of the processing performed by the CPU of the imaging support apparatus.

As an example shown in FIG. 45, the CPU 86 inputs the captured image 164, which is obtained by selectively captured by the first imaging system 156A and the second imaging system 156B of the smart device 156, to the second trained model 118, which is obtained by optimizing the replication model 116 by training the tendency of the imaging system that is frequently used in the smart device 156 for a certain imaging scene. The second trained model 118 outputs the second set value 118A in a case where the captured image 164 is input. By reflecting the second set value 118A output from the second trained model 118 on the control related to the imaging performed by the smart device 156, the CPU 86 sets the imaging system to be used at an activation timing of the smart device 156 and causes the smart device 156 to selectively use the first imaging system 156A and the second imaging system 156B at the activation timing of the smart device 156. As a result, the imaging system that is intended by the user or the like can be quickly used at the activation timing of the smart device 156 as compared with the case of using an imaging system randomly selected from the first imaging system 156A and the second imaging system 156B at the activation timing of the smart device 156.

Figure 46:
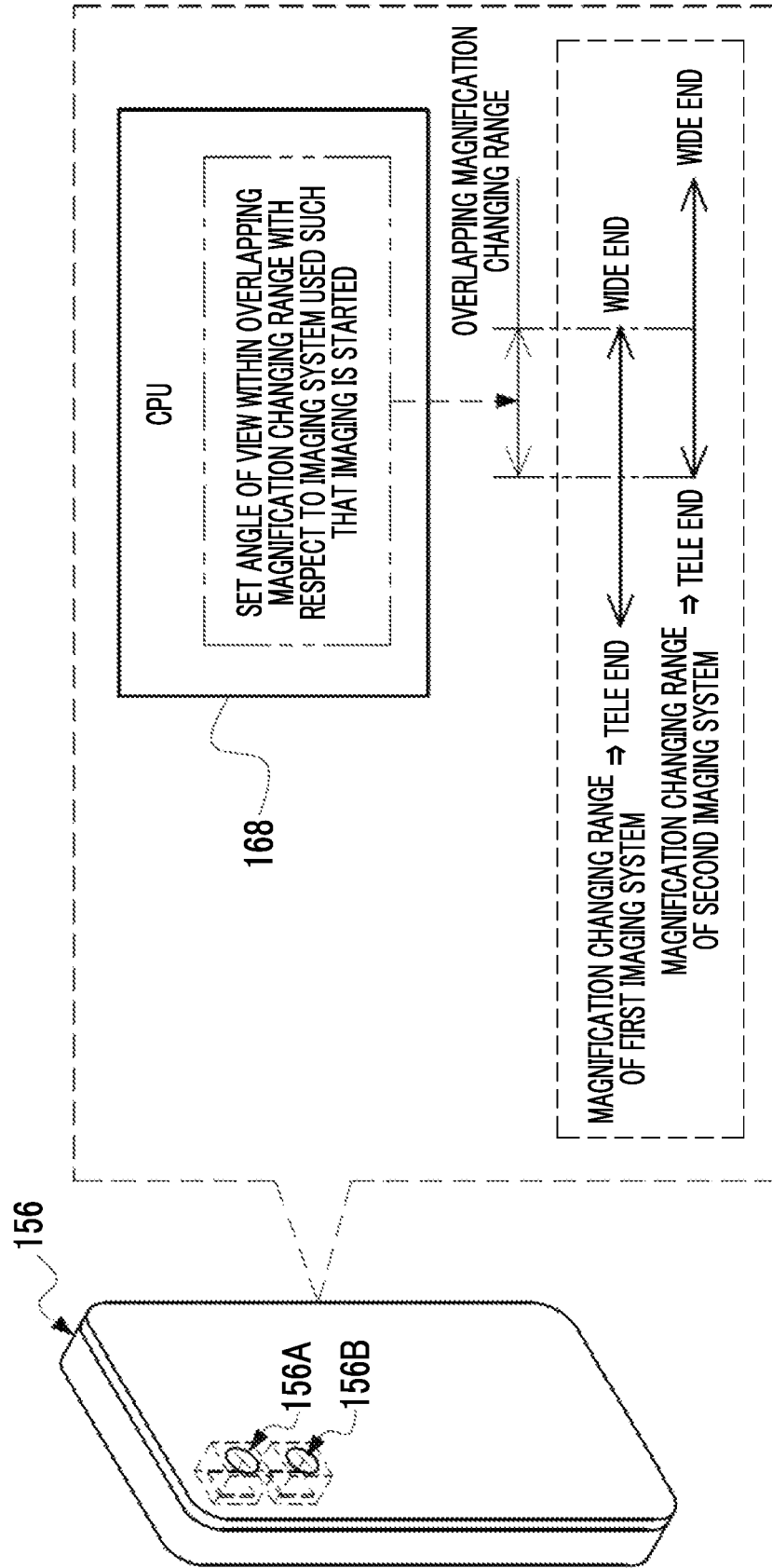
FIG. 46 is a block diagram showing an example of the content of processing performed by a CPU of the smart device.

In a case where the output of the second trained model 118, which is obtained by performing the learning processing with the information including the information related to the imaging system as the correction data 100, is reflected on the control related to the imaging performed by the smart device 156, as an example shown in FIG. 46, the CPU 168 of the smart device 156 sets a position of the angle of view used at the activation timing of the smart device 156 within the overlapping magnification changing range (for example, the center of the overlapping magnification changing range) with respect to the imaging system used at the activation timing of the smart device 156 such that the imaging is started at the angle of view within the overlapping magnification changing range.

The information related to the imaging system included in the correction data 100 may be information that includes history information of the angle of view change instruction. In a case where the second trained model 118 is generated by performing the learning processing by using the teacher data 98 that includes the correction data 100 configured in this way, by reflecting the output of the second trained model 118 on the control related to the imaging performed by the smart device 156, the CPU 168 of the smart device 156 is capable of setting the position of the angle of view to a position frequently used within the magnification changing range.

Although two imaging systems of the first imaging system 155A and the second imaging system 155B are exemplified in the examples shown in FIGS. 37 and 38, and two imaging systems of the first imaging system 156A and the second imaging system 156B are exemplified in the example shown in FIG. 39, the present disclosed technology is not limited to this, and three or more imaging systems may be used. Further, the devices equipped with the plurality of imaging systems need not be limited to smart devices 155 and 156, for example, it may be an imaging apparatus (for example, a surveillance camera) that captures each of a plurality of wavelength band lights with different imaging systems.

In the above embodiment, although an example of the embodiment in which the CPU 86 performs the specific processing based on the first set value 106A and the second set value 118A has been described, the present disclosed technology is not limited to this. For example, the CPU 86 may perform the specific processing based on the degree of difference between the first trained model 106 and the second trained model 118. For example, the CPU 86 performs the specific processing in a case where the degree of difference between the first trained model 106 and the second trained model 118 is equal to or greater than a default degree of difference. The default degree of difference may be a fixed value or may be a variable value that is changed according to the instruction, which is provided to the imaging support apparatus 14 by the user or the like, and/or various conditions.

Further, each of the first trained model 106 and the second trained model 118 may be a model having an input layer, a plurality of interlayers, and an output layer, and the CPU 86 may perform the specific processing based on the degree of difference of at least one layer (for example, at least one designated layer) between the first trained model 106 and the second trained model 118. In this case, at least one layer may be, for example, the plurality of interlayers and the output layer, may be all of the plurality of interlayers, may be a part of the layer among the plurality of interlayers (for example, at least one designated layer), or may be the output layer.

Figure 47:
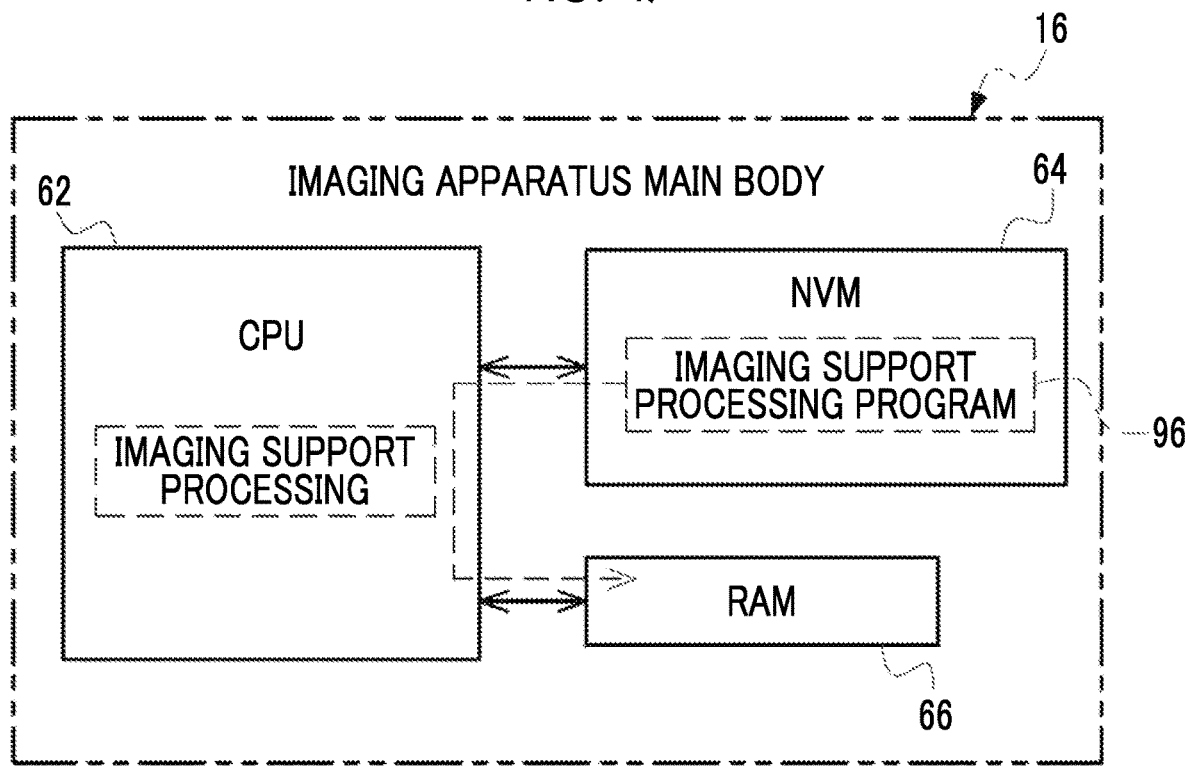
FIG. 47 is a block diagram showing an example of a configuration of an imaging apparatus main body in a case where the function of the imaging support apparatus is assigned to the imaging apparatus.

In the above embodiment, although an example of the embodiment in which the imaging apparatus 12 and the imaging support apparatus 14 are separated has been described, the present disclosed technology is not limited to this, and the imaging apparatus 12 and the imaging support apparatus 14 may be integrated. In this case, for example, as shown in FIG. 47, an imaging support processing program 96 may be stored in the NVM 64 of the imaging apparatus main body 16, and the CPU 62 may execute the imaging support processing program 96.

Further, as described above, in a case where the imaging apparatus 12 is to be responsible for the function of the imaging support apparatus 14, at least one other CPU, at least one GPU, and/or at least one TPU may be used instead of the CPU 62 or together with the CPU 62.

In the above embodiment, although an example of the embodiment in which the imaging support processing program 96 is stored in the storage 88 has been described, the present disclosed technology is not limited to this. For example, the imaging support processing program 96 may be stored in a portable non-temporary storage medium such as an SSD or a USB memory. The imaging support processing program 96 stored in the non-temporary storage medium is installed in a computer 82 of the imaging support apparatus 14. The CPU 86 executes the imaging support processing according to the imaging support processing program 96.

Further, the imaging support processing program 96 may be stored in the storage device such as another computer or a server device connected to the imaging support apparatus 14 via the network 34, the imaging support processing program 96 may be downloaded in response to the request of the imaging support apparatus 14, and the imaging support processing program 96 may be installed in the computer 82.

It is not necessary to store all of the imaging support processing programs 96 in the storage device such as another computer or a server device connected to the imaging support apparatus 14, or the storage 88, and a part of the imaging support processing program 96 may be stored.

Further, although the imaging apparatus 12 shown in FIG. 2 has a built-in controller 44, the present disclosed technology is not limited to this, for example, the controller 44 may be provided outside the imaging apparatus 12.

In the above embodiment, although the computer 82 is exemplified, the present disclosed technology is not limited to this, and a device including an ASIC, FPGA, and/or PLD may be applied instead of the computer 82. Further, instead of the computer 82, a combination of a hardware configuration and a software configuration may be used.

As a hardware resource for executing the imaging support processing described in the above embodiment, the following various processors can be used. Examples of the processor include software, that is, a CPU, which is a general-purpose processor that functions as a hardware resource for executing the imaging support processing by executing a program. Further, examples of the processor include a dedicated electric circuit, which is a processor having a circuit configuration specially designed for executing specific processing such as FPGA, PLD, or ASIC. A memory is built-in or connected to any processor, and each processor executes the imaging support processing by using the memory.

The hardware resource for executing the imaging support processing may be configured with one of these various processors or may be configured with a combination (for example, a combination of a plurality of FPGAs or a combination of a CPU and an FPGA) of two or more processors of the same type or different types. Further, the hardware resource for executing the imaging support processing may be one processor.

As an example of configuring with one processor, first, one processor is configured with a combination of one or more CPUs and software, and there is an embodiment in which this processor functions as a hardware resource for executing the imaging support processing. Secondly, as typified by SoC, there is an embodiment in which a processor that implements the functions of the entire system including a plurality of hardware resources for executing the imaging support processing with one IC chip is used. As described above, the imaging support processing is implemented by using one or more of the above-mentioned various processors as a hardware resource.

Further, as the hardware-like structure of these various processors, more specifically, an electric circuit in which circuit elements such as semiconductor elements are combined can be used. Further, the above-mentioned imaging support processing is only an example. Therefore, it goes without saying that unnecessary steps may be deleted, new steps may be added, or the processing order may be changed within a range that does not deviate from the purpose.

The contents described above and the contents shown in the illustration are detailed explanations of the parts related to the present disclosed technology and are only an example of the present disclosed technology. For example, the description related to the configuration, function, action, and effect described above is an example related to the configuration, function, action, and effect of a portion according to the present disclosed technology. Therefore, it goes without saying that unnecessary parts may be deleted, new elements may be added, or replacements may be made to the contents described above and the contents shown in the illustration, within the range that does not deviate from the purpose of the present disclosed technology. Further, in order to avoid complications and facilitate understanding of the parts of the present disclosed technology, in the contents described above and the contents shown in the illustration, the descriptions related to the common technical knowledge or the like that do not require special explanation in order to enable the implementation of the present disclosed technology are omitted.

In the present specification, "A and/or B" is synonymous with "at least one of A or B". That is, "A and/or B" means that it may be only A, it may be only B, or it may be a combination of A and B. Further, in the present specification, in a case where three or more matters are connected and expressed by "and/or", the same concept as "A and/or B" is applied.

All documents, patent applications, and technical standards described in the present specification are incorporated in the present specification by reference to the same extent in a case where it is specifically and individually described that the individual documents, the patent applications, and the technical standards are incorporated by reference.

What is claimed is:

1. An imaging support apparatus comprising:
a processor; and
a memory connected to or built into the processor,
wherein the memory stores a first trained model,
the first trained model is a trained model used for control related to imaging performed by an imaging apparatus, and
the processor is configured to
generate a second trained model used for the control by performing learning processing in which a first image, which is acquired by being captured by the imaging apparatus, and a set value, which is applied to the imaging apparatus in a case where the first image is acquired, are used as teacher data, and
perform specific processing based on a first set value, which is output from the first trained model in a case where a second image is input to the first trained model, and a second set value, which is output from the second trained model in a case where the second image is input to the second trained model, and
wherein the type of the first set value and the type of the second set value are the same, and
the learning processing is performed in a case where the number of the first images reaches a first threshold.

2. The imaging support apparatus according to claim 1, wherein the second image is stored in the memory.

3. The imaging support apparatus according to claim 1, wherein the teacher data is data that includes a plurality of images, which are acquired by being captured by the imaging apparatus during a period from specific time until the condition is satisfied, and a plurality of set values, which are related to the plurality of images and applied to the imaging apparatus.

4. The imaging support apparatus according to claim 1, wherein the processor is configured to perform the specific processing based on the first set value and the second set value in a case where the condition is satisfied.

5. The imaging support apparatus according to claim 1, wherein the processor is configured to perform the specific processing in a case where a degree of difference between the first set value and the second set value is equal to or greater than a second threshold value.

6. The imaging support apparatus according to claim 1, wherein the processor is configured to perform predetermined processing under a condition that the number of the first images reaches a third threshold value.

7. The imaging support apparatus according to claim 1, wherein the processor is configured to perform predetermined processing in a case where the number of the first images, which are acquired by performing the imaging under a first environment and used as the teacher data, is equal to or greater than a fourth threshold value and the number of the first images, which are obtained by performing the imaging under a second environment different from the first environment and used as the teacher data, is equal to or less than a fifth threshold value.

8. The imaging support apparatus according to claim 1, wherein the imaging apparatus is a lens-interchangeable imaging apparatus, and
the processor is configured to generate a plurality of the second trained models by performing the learning processing for each type of interchangeable lens used in the imaging related to the first image.

9. The imaging support apparatus according to claim 8, wherein the processor is configured to, in a case where the interchangeable lens is attached to the imaging apparatus, perform processing of using a second trained model generated by using an image, which is acquired by being captured by the imaging apparatus where the interchangeable lens is attached, in the learning processing as the first image among the plurality of second trained model.

10. The imaging support apparatus according to claim 1, wherein the imaging apparatus includes a plurality of imaging systems, and
the processor is configured to generate a plurality of the second trained models by performing the learning processing for each of the imaging systems used in the imaging related to the first image.

11. The imaging support apparatus according to claim 10, wherein the processor is configured to, in a case where an imaging system used in the imaging is selected from the plurality of imaging systems, perform processing of using a second trained model generated by using an image, which is acquired by being captured by the imaging apparatus using the selected imaging system, in the learning processing as the first image among the plurality of second trained model.

12. The imaging support apparatus according to claim 11, wherein the processor is configured to
receive an instruction of a switch of the plurality of imaging systems in a step-less manner, and
continue to use the second trained model, which is assigned to the imaging system before the switch, in the imaging system after the switch, in a case where the instruction is received.

13. The imaging support apparatus according to claim 11, wherein the processor is configured to
use a scene, which is used in a case where the first image is acquired by the imaging apparatus, and information, which is related to the selected imaging system, in the learning processing as the set values, and cause the imaging apparatus to selectively use the plurality of imaging systems at an activation timing of the imaging apparatus based on the second set value.

14. The imaging support apparatus according to claim 1, wherein the specific processing is processing that includes first processing of reflecting the second set value on the control.

15. The imaging support apparatus according to claim 1, wherein the specific processing is processing that includes second processing of storing the second trained model in a default storage device.

16. The imaging support apparatus according to claim 1, wherein the specific processing is processing that includes third processing of reflecting an output of a trained model, which is selected according to the instruction received by the processor among the first trained model and the second trained model, on the control.

17. The imaging support apparatus according to claim 1, wherein the specific processing is processing that includes fourth processing of outputting first data for displaying a fourth image corresponding to an image obtained by applying a first output result, which is output from the first trained model by inputting a third image to the first trained model, to the third image, and a sixth image corresponding to an image obtained by applying a second output result, which is output from the second trained model by inputting a fifth image to the second trained model, to the fifth image, on a first display.

18. The imaging support apparatus according to claim 17, wherein the first data includes data for displaying the fourth image and the sixth image on the first display in a distinguishable manner.

19. The imaging support apparatus according to claim 17, wherein the first data includes data for displaying the fourth image and first trained model specification information, which enables specification of the first trained model, on the first display in a state of being associated with each other, and for displaying the sixth image and second trained model specification information, which enables specification of the second trained model, on the first display in a state of being associated with each other.

20. The imaging support apparatus according to claim 17, wherein the fourth processing is processing that includes processing of reflecting an output of the first trained model on the control in a case where the fourth image is selected according to the instruction received by the processor among the fourth image and the sixth image displayed on the first display, and reflecting an output of the second trained model on the control in a case where the sixth image is selected.

21. The imaging support apparatus according to claim 1, wherein the specific processing is processing that includes fifth processing of outputting second data for displaying time specification information, which enables specification of time when the second trained model is generated, on a second display.

22. The imaging support apparatus according to claim 21, wherein the second data includes data for displaying the time specification information on the second display in a state of being associated with a seventh image obtained in a case where an output of the second trained model is reflected.

23. The imaging support apparatus according to claim 1, wherein the specific processing is processing that includes sixth processing of associating time specification information, which enables specification of time when the second trained model is generated, with the second trained model.

24. The imaging support apparatus according to claim 1, wherein the specific processing is processing that includes seventh processing of reflecting an output of the second trained model on the control at a predetermined timing.

25. The imaging support apparatus according to claim 24, wherein the predetermined timing is a timing when the imaging apparatus is activated, a timing when the number of captured images acquired by being captured by the imaging apparatus is equal to or greater than a sixth threshold value, a timing when charging of the imaging apparatus is started, a timing when an operation mode of the imaging apparatus transitions from a playback mode to a setting mode, or a timing when rating is performed on the captured images in the playback mode.

26. The imaging support apparatus according to claim 1, wherein the specific processing is processing that includes eighth processing of, in a case where the second trained model is applied to a different apparatus that is an imaging apparatus different from the imaging apparatus, correcting at least one of data input to the second trained model or the output from the second trained model, based on characteristics of the imaging apparatus and characteristics of the different apparatus.

27. The imaging support apparatus according to claim 26, wherein image sensor information, which includes at least one of characteristic information indicating characteristics of each of different image sensors involved in the second trained model or individual difference information indicating an individual difference between the different image sensors, is appended to the second trained model, and
the processor is configured to specify the characteristics of the imaging apparatus and the characteristics of the different apparatus by using the image sensor information.

28. The imaging support apparatus according to claim 1, wherein the specific processing is processing that includes ninth processing of outputting third data for displaying a first processed image corresponding to an image obtained by applying a third output result, which is output from the second trained model by inputting an eighth image to the second trained model, to the eighth image, and an unprocessed image obtained without applying the third output result to the eighth image, on a third display.

29. The imaging support apparatus according to claim 1, wherein the specific processing is processing that includes tenth processing of outputting fourth data for displaying a brightness adjusted image obtained by applying a fourth output result, which is output from the second trained model by inputting a ninth image to the second trained model, to the ninth image and adjusting brightness, and an unprocessed image obtained without applying the fourth output result to the ninth image, on a fourth display.

30. The imaging support apparatus according to claim 1, wherein first appended information, which is appended to a third processed image obtained by being captured with the output of the second trained model reflected on the control, is added to the third processed image, and
the specific processing is processing that includes eleventh processing of including information, which enables specification of the second trained model, in the first appended information.

31. The imaging support apparatus according to claim 1, wherein second appended information, which is appended to a fourth processed image obtained by being captured with the output of the first trained model reflected on the control, is added to the fourth processed image, and the specific processing is processing that includes twelfth processing of including information, which enables specification of the first trained model, in the second appended information.

32. The imaging support apparatus according to claim 1, wherein the set value is at least one of a set value related to white balance used in the imaging, a set value related to exposure used in the imaging, a set value related to focus used in the imaging, a set value related to saturation used in the imaging, or a set value related to gradation used in the imaging.

33. The imaging support apparatus according to claim 1, wherein:
the second trained model is obtained by performing learning processing on a replication model that is obtained by replicating the first trained model, and
the specific processing is performed based on a degree of difference between the first set value and the second set value.

34. An imaging support apparatus comprising:
a processor; and
a memory connected to or built into the processor,
wherein the memory stores a first trained model,
the first trained model is a trained model used for control related to imaging performed by an imaging apparatus, and
the processor is configured to
generate a second trained model used for the control by performing learning processing in which a first image, which is acquired by being captured by the imaging apparatus, and a set value, which is applied to the imaging apparatus in a case where the first image is acquired, are used as teacher data, and
perform specific processing based on a degree of difference between the first trained model and the second trained model,
the first trained model outputs a first set value in a case in which a second image is input,
the second trained model outputs a second set value in a case in which the second image is input, and
the type of the first set value and the type of the second set value are the same, and
wherein the learning processing is performed in a case where the number of the first images reaches a first threshold.

35. The imaging support apparatus according to claim 34, wherein the second trained model is obtained by performing learning processing on the a replication model that is obtained by replicating the first trained model.

36. An imaging apparatus comprising:
a processor;
a memory connected to or built into the processor; and
an imaging apparatus main body,
wherein the memory stores a first trained model,
the first trained model is a trained model used for control related to imaging performed by the imaging apparatus main body, and
the processor is configured to
generate a second trained model used for the control by performing learning processing in which a first image, which is acquired by being captured by the imaging apparatus main body, and a set value, which is applied to the imaging apparatus main body in a case where the first image is acquired, are used as teacher data, and
perform specific processing based on a first set value, which is output from the first trained model in a case where a second image is input to the first trained model, and a second set value, which is output from the second trained model in a case where the second image is input to the second trained model, and
wherein the type of the first set value and the type of the second set value are the same, and
wherein the learning processing is performed in a case where the number of the first images reaches a first threshold.

37. The imaging apparatus according to claim 36, wherein:
the second trained model is obtained by performing learning processing on a replication model that is obtained by replicating the first trained model, and
the specific processing is performed based on a degree of difference between the first set value and the second set value.

38. An imaging support method comprising:
generating a second trained model used for control related to imaging performed by an imaging apparatus, by performing learning processing in which a first image, which is acquired by being captured by the imaging apparatus, and a set value, which is applied to the imaging apparatus in a case where the first image is acquired, are used as teacher data; and
performing specific processing based on a first set value, which is output from a first trained model in a case where a second image is input to the first trained model, and a second set value, which is output from the second trained model in a case where the second image is input to the second trained model,
wherein the type of the first set value and the type of the second set value are the same, and
wherein the learning processing is performed in a case where the number of the first images reaches a first threshold.

39. The imaging support method according to claim 38, wherein:
the second trained model is obtained by performing learning processing on a replication model that is obtained by replicating the first trained model, and
the specific processing is performed based on a degree of difference between the first set value and the second set value.

40. A non-transitory computer-readable storage medium storing a program executable by a computer to perform a process comprising:
generating a second trained model used for control related to imaging performed by an imaging apparatus, by performing learning processing in which a first image, which is acquired by being captured by the imaging apparatus, and a set value, which is applied to the imaging apparatus in a case where the first image is acquired, are used as teacher data; and
performing specific processing based on a first set value, which is output from a first trained model in a case where a second image is input to the first trained model, and a second set value, which is output from the second trained model in a case where the second image is input to the second trained model, wherein the type of the first set value and the type of the second set value are the same, and wherein the learning processing is performed in a case where the number of the first images reaches a first threshold.

41. The non-transitory computer-readable storage medium according to claim 40, wherein:

the second trained model is obtained by performing learning processing on a replication model that is obtained by replicating the first trained model, and the specific processing is performed based on a degree of difference between the first set value and the second set value.

\* \* \* \* \*